United States Patent
Aimuta et al.

(10) Patent No.: US 8,115,479 B2
(45) Date of Patent: Feb. 14, 2012

(54) ROTATION-ANGLE-DETECTING APPARATUS, ROTATING MACHINE, AND ROTATION-ANGLE-DETECTING METHOD

(75) Inventors: Kyohei Aimuta, Fukaya (JP); Osamu Shimoe, Kumagaya (JP); Masahiro Mita, Fukaya (JP)

(73) Assignee: Hitachi Metals, Ltd., Tokyo (JP)

( * ) Notice: Subject to any disclaimer, the term of this patent is extended or adjusted under 35 U.S.C. 154(b) by 707 days.

(21) Appl. No.: 12/302,232

(22) PCT Filed: Nov. 20, 2007

(86) PCT No.: PCT/JP2007/072439
§ 371 (c)(1),
(2), (4) Date: Nov. 24, 2008

(87) PCT Pub. No.: WO2008/062778
PCT Pub. Date: May 29, 2008

(65) Prior Publication Data
US 2009/0206827 A1 Aug. 20, 2009

(30) Foreign Application Priority Data

Nov. 21, 2006 (JP) ................ 2006-314673
Dec. 19, 2006 (JP) ................ 2006-341218
Feb. 19, 2007 (JP) ................ 2007-038317
May 17, 2007 (JP) ................ 2007-131645

(51) Int. Cl.
*G01B 7/30* (2006.01)
*G01R 33/02* (2006.01)

(52) U.S. Cl. ............ 324/207.25; 324/252; 324/260

(58) Field of Classification Search ............ 324/207.25, 324/252, 260
See application file for complete search history.

(56) References Cited

U.S. PATENT DOCUMENTS
4,791,366 A 12/1988 Suzuki et al.

2003/0102860 A1 6/2003 Haji-Sheikh et al.

FOREIGN PATENT DOCUMENTS

| EP | 1 503 184 A2 | 2/2005 |
|---|---|---|
| JP | 61-142782 A | 6/1986 |
| JP | 62-76607 U | 5/1987 |
| JP | 2000-78809 A | 3/2000 |
| JP | 2001-343206 A | 12/2001 |
| JP | 2002-257590 A | 9/2002 |
| JP | 2002-303536 A | 10/2002 |
| JP | 2003-75108 A | 3/2003 |
| JP | 2005-49097 A | 2/2005 |

(Continued)

*Primary Examiner* — Reena Aurora
(74) *Attorney, Agent, or Firm* — Sughrue Mion, PLLC

(57) ABSTRACT

A rotation-angle-detecting apparatus comprising a magnet rotor having 4 or more magnetic poles on the surface, and sensor device for detecting magnetic flux from the magnet rotor, and an electronic circuit for outputting a signal representing the rotation angle of the magnet rotor using pluralities of signals obtained from the sensor device, the sensor device having pluralities of spin-valve, giant-magnetoresistive devices for outputting two or more different phase signals from a rotating magnetic field near the rotating magnet, each spin-valve, giant-magnetoresistive device having a pinned layer and a free layer, the magnetization direction of the pinned layer being fixed, and the magnetization direction of the free layer rotating depending on a magnetic field direction, pluralities of the spin-valve, giant-magnetoresistive devices comprising a first spin-valve, giant-magnetoresistive device having a reference magnetic-field-sensing direction, and a second spin-valve, giant-magnetoresistive device having a magnetic-field-sensing direction different from that of the first spin-valve, giant-magnetoresistive device.

13 Claims, 61 Drawing Sheets

FOREIGN PATENT DOCUMENTS

| | | |
|---|---|---|
| JP | 2005-512093 A | 4/2005 |
| JP | 2006-10346 A | 1/2006 |
| JP | 2006-23179 A | 1/2006 |
| JP | 2006-208025 A | 8/2006 |
| JP | 2006-208255 A | 8/2006 |
| JP | 2007-40850 A | 2/2007 |

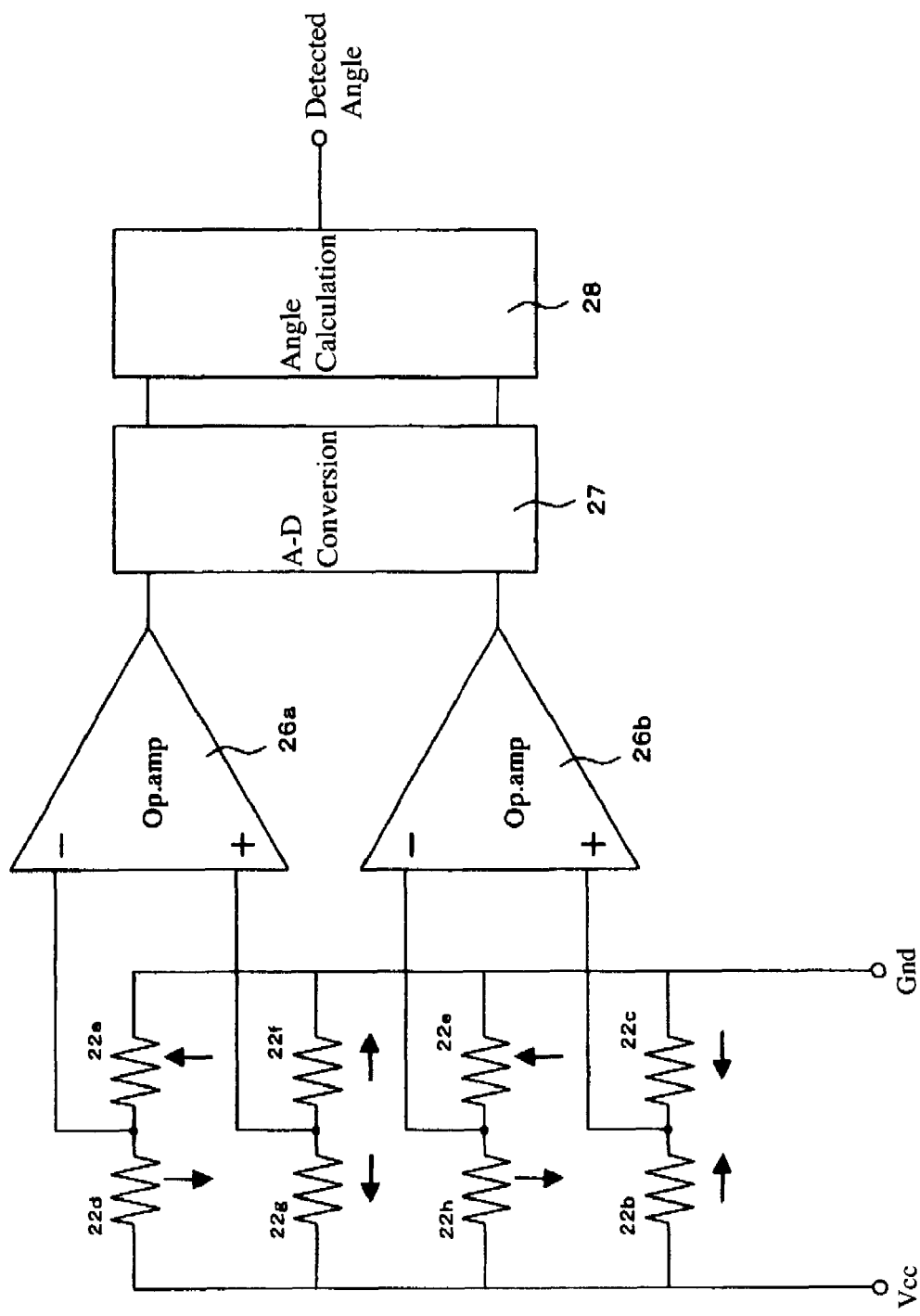

A-A Cross Section

A-A Cross Section

A-A Cross Section

Fig. 37

| Point | Optimum Magnetic Flux Density Amplitude Ratio $K_{eff}$ $B_{\perp eff0}/B_{\parallel eff0}$ | Minimum Error Angle (°) $\varphi_{best}$ | $\chi_{best}$ | Amplitude Ratio Range $K_{eff}$ Permitting 1°-Error $B_{\perp eff0}/B_{\parallel eff0}$ | Angle Ratio (°) Permitting 1°-Error $\varphi_{min}$ | $\varphi_{max}$ | $\chi_{min}$ | $\chi_{max}$ | Amplitude Ratio Range $K_{eff}$ Permitting 2°-Error $B_{\perp eff0}/B_{\parallel eff0}$ | Angle Ratio (°) Permitting 2°-Error $\varphi_{min}$ | $\varphi_{max}$ | $\chi_{min}$ | $\chi_{max}$ |
|---|---|---|---|---|---|---|---|---|---|---|---|---|---|
| 1 | 1.0 | 0.0 | -60.0 | 0.96-1.04 | -0.8 | 0.7 | -58.8 | -61.1 | 0.93-1.08 | -1.6 | 1.5 | -57.6 | -62.2 |
| 2 | | 0.0 | 60.0 | | -0.7 | 0.8 | 58.8 | 61.1 | | -1.5 | 1.6 | 57.6 | 62.2 |
| 3 | | 35.3 | 0.0 | | 34.5 | 35.9 | -1.3 | 1.5 | | 33.8 | 36.6 | -2.7 | 3.1 |
| 4 | | 20.9 | 90.0 | | 20.0 | 21.8 | 88.7 | 91.2 | | 19.2 | 22.8 | 87.4 | 92.4 |
| 5 | | 69.1 | 90.0 | | 68.2 | 70.0 | 87.0 | 93.5 | | 67.1 | 70.8 | 84.2 | 97.7 |
| 6 | | 90.0 | 180.0 | | 87.9 | 96.2 | 165.0 | 195.0 | | 81.4 | 98.7 | 158.6 | 201.2 |

Mechanical Angle $\theta_m$ (°)

A-A Cross Section

A-A Cross Section

A-A Cross Section

A-A Cross Section

ROTATION-ANGLE-DETECTING APPARATUS, ROTATING MACHINE, AND ROTATION-ANGLE-DETECTING METHOD

CROSS REFERENCE TO RELATED APPLICATION

This application is a National Stage of International Application No. PCT/JP2007/72439 filed Nov. 20, 2007, claiming priority based on Japanese Patent Application No. 2006-314673, filed Nov. 21, 2006, Japanese Patent Application No. 2006-341218 filed Dec. 19, 2006, Japanese Patent Application No. 2007-038317 filed Feb. 19, 2007 and Japanese Patent Application No. 2007-131645 filed May 17, 2007, the contents of all of which are incorporated herein by reference in their entirety.

FIELD OF THE INVENTION

The present invention relates to an apparatus for detecting the rotation angle of a rotation shaft, etc., a rotating machine, and a method for detecting a rotation angle.

BACKGROUND OF THE INVENTION

JP 2003-075108 A discloses a rotation angle sensor comprising a rotating disc-shaped magnet, and pluralities of magnetic sensors arranged near the periphery of the magnet on a plane substantially perpendicular to the rotation centerline of the magnet for detecting a magnetic field to supply an output corresponding to the rotation angle of the magnet. It shows in FIG. 4 a rotation angle sensor comprising a two-pole, disc-shaped, magnet supported by a rotation shaft, and magnetic sensors A and B disposed around the periphery of the magnet. The magnetic sensors A and B are Hall elements for detecting the intensity of a magnetic field to calculate the rotation angle. The magnetic sensors A and B are arranged such that a mechanical angle between a straight line passing the center O of the disc-shaped magnet and the center of the magnetic sensor A and a straight line passing the center O and the center of the magnetic sensor B is about 90°. The mechanical angle is 360° per one round of a disc. These magnetic sensors A and B are located at positions deviated from the magnet in the rotation axis direction. JP 2003-075108 A also shows in FIG. 6 a rotation angle sensor comprising magnetic sensors A and B inclined from the rotation axis.

However, because the output of a Hall element drastically decreases when the distance between the Hall element and a rotating magnet surface (spacing) increases, the Hall element is so vulnerable to spacing variation that it cannot easily detect the rotation angle with high accuracy. Further, because ambient temperature change leads to large variation of output due to the change of magnet characteristics (change of magnetic flux), it cannot detect the rotation angle stably.

The magnetic sensors A and B (Hall elements) are not magnetic sensors detecting the change of a magnetic flux direction. Namely, when a Hall element is inclined from the magnetic flux direction, it detects only a magnetic flux component perpendicular to a plane of the Hall element, thereby providing a smaller output. To increase a magnetic flux that each magnetic sensor receives, the magnetic sensors A and B (Hall elements) are deviated from the rotating magnet in the rotation axis direction or inclined from the rotation axis of the rotating magnet. To detect the change of the magnetic flux direction, the amplitudes of pluralities of varied outputs should be corrected by an external circuit, resulting in a complicated structure.

To obtain a higher-accuracy output, JP 2003-075108 A discloses a method of averaging outputs from pluralities of magnetic sensors arranged at one position. This method is a signal-treating method adjusting output amplitudes by a circuit, but this reference fails to disclose a method of suppressing the deformation of the output. It also describes that an MR element may be used in place of the Hall element as a magnetic sensor. An MR sensor comprising an MR element (so-called AMR element) is a magnetic sensor for obtaining a 2-period waveform output per one period of an electrical angle, giving two angles at a predetermined output Vo, thus failing to determine an absolute angle.

JP 2000-078809 A discloses a servomotor comprising a rotor having a permanent magnet, and an encoder for detecting the rotation position of the rotor. The permanent magnet has two-pole anisotropy, and the encoder comprises a magnetic sensor for detecting a magnetic field generated from the rotor (leak magnetic flux of a permanent magnet). This reference describes that four magnetic sensors are arranged with an interval of 90° by mechanical angle in a circumferential direction, and a differential signal is obtained between magnetic sensors opposing at 180° to cancel the rotation bias of the rotor, if any, thereby obtaining an absolute position signal with high accuracy. However, the magnetic sensor in the servomotor described in JP 2000-078809 A is not a spin valve type.

JP 2001-343206 A discloses a rotation-angle-detecting apparatus comprising a detection magnet having many magnetic poles on an end surface and a circumferential surface. Specifically, the apparatus comprises a vertical, disc-shaped detection magnet concentric with a rotation shaft, and the detection magnet is concentrically provided on one surface with for instance, 3 pairs (6 poles) of magnetic poles with an equal interval. The detection magnet is also provided on a circumferential surface with, for instance, 48 pairs (96 poles) of magnetic poles with an equal interval. A detection plate is rotatably arranged in parallel with the detection magnet on one surface side thereof with a proper gap. The detection plate is provided with two magnetic detection elements for detecting the magnetic poles at positions along the circumferential surface of the detection magnet, with phase difference of ¼ of the electrical angle defined by 48 pairs of magnetic poles (360°/48/4 by mechanical angle). The detection plate is also provided with three magnetic detection elements for detecting the magnetic poles at positions along one surface of the detection magnet, with phase difference of ⅓ of the electrical angle defined by 3 pairs of magnetic poles (360°/3/3 by mechanical angle). The magnetic detection elements are Hall elements or MR elements. However, the magnetic detection elements in the rotation-angle-detecting apparatus described in JP 2001-343206 A are not of a spin valve type.

JU 62-076607 A (FIG. 1) discloses an apparatus for detecting the rotation angle of a rotating magnet using a ferromagnetic sensor to which a sine-wave signal SW is applied, and a ferromagnetic sensor to which a cosine-wave signal CW is applied. However, the rotation-angle-detecting apparatus of JU 62-076607 A is large and complicated because it needs a signal generator for applying SW and CW to the ferromagnetic sensors. Also, the graph of FIG. 6 indicates that the apparatus comprises a magnetic sensor providing a two-period waveform output per one period of an electrical angle. Because a predetermined output Vo corresponds to two angles, an absolute angle cannot be determined. This ferromagnetic sensor is an MR sensor utilizing a magnetic resistor effect of a ferromagnetic metal. As is clear from the thin-film pattern of FIG. 7, the MR sensor has shape anisotropy in a longitudinal direction. Accordingly, there is unevenness depending on an angle between a magnetization direction and an anisotropy direction when the magnetization rotates, failing to achieve smooth rotation. Thus, an output waveform is deformed, making it difficult to detect the rotation angle accurately.

JP 2002-303536 A (FIGS. 1 and 2) discloses a rotation angle detection sensor comprising sensor substrates opposing each other on the end surface of a two-pole, disc-shaped magnet attached to an end of a rotation shaft. JP 2002-303536 A shows in FIG. 3 that a sensor substrate comprising four GMR elements has a center on a centerline (rotation axis) of the rotation shaft. This GMR element is a spin-valve, giant-magnetoresistive device having a pinned magnetic layer. Because the rotation-angle-detecting sensor of JP 2002-303536 A comprises one sensor substrate having a center on an extension of a center axis of the rotation shaft, the magnet is supported by the rotation shaft in a cantilever manner. Accordingly, this technology cannot be applied to a both-end-support structure having a shaft penetrating a magnet. Also, because the rotation of the magnet is easily deviated, it is difficult to detect the rotation angle accurately. High accuracy of the rotation center (suppression of the variation of magnet rotation) needs a large apparatus.

JP 2006-010346 A (FIG. 4) discloses a magnetic-detection-type position sensor for detecting magnetic flux change caused by the rotation of a magnet attached to a rotating member with a magnetoresistive device to measure the amount of movement of an external movable member. As shown in FIG. 3 of JP 2006-010346 A, however, the deviation of the magnetoresistive device in a direction shown by the arrow L from the center axis of the magnet due to errors in assembling and machining increases the angle error of an output, resulting in difficulty in the accurate detection of the rotation angle.

JP 2006-208025 A (FIGS. 1 and 5) discloses a magnetic sensor comprising a signal magnet whose one rotation corresponds to one period, magnetoresistive devices providing a cosine wave output and a sine wave output with phase difference of a ¼ period, and a bias magnet. In the magnetic sensor described in JP 2006-208025 A, the bias magnet is attached to an MR element to detect the absolute angle. However, the output amplitude of the magnetic sensor varies depending on a ratio of a magnetic field generated by the bias magnet to that generated by the magnet rotor. When the magnet rotor generates a large magnetic field, the output of the magnetic sensor is inverted, resulting in large deformation of the output. Also, when the ratio $B_{sig}/B_{bias}$ of the magnetic field ($B_{sig}$) of the magnet rotor to the magnetic field ($B_{bias}$) of the bias magnet exceeds 0.7, a sinusoidal output cannot easily be obtained, resulting in a deformed output. When the magnet rotor generates a small magnetic field, the magnetic sensor provides a small output. With such tendency, the positional deviation of the magnet rotor in a rotation axis direction provides the output with amplitude variations and deformation, making it difficult to detect the rotation angle with high accuracy.

In addition, the existence of the bias magnet makes it difficult to miniaturize the sensor device. JP 2006-208025 A describes in the paragraph [0029] that the magnetoresistive device is not restricted to a magnetoresistive device (MR element) utilizing an AMR effect, but may be a magnetoresistive device utilizing a GMR effect. However, because the invention described in JP 2006-208025 A is to obtain a one-period output per one rotation of the signal magnet by using the bias magnet, the magnetoresistive device utilizing a GMR effect is not a spin-valve, giant-magnetoresistive device, but a laminated giant-magnetoresistive device, which has a laminate structure with the same function as that of the MR element except for having a larger magnetic resistance change ratio than the MR element. When the bias magnet is used, the laminated giant-magnetoresistive device has the same problem as that of the MR element as described above.

JP 61-142782 A (FIG. 1) discloses a position-detecting apparatus comprising a magnetic recording medium and a ferromagnetic magnetoresistive device opposing the magnetic recording medium, an angle between a pattern surface of the ferromagnetic magnetoresistive device and a longitudinal direction of the pattern being 1-45°. JP 61-142782 A describes that the application of a bias magnetic field to an MR element along its axis of easy magnetization provides a position-detecting apparatus with suppressed instability of a detection output and free from the position shift of an output peak. However, as is clear from FIG. 2 in JP 61-142782 A, a signal representing a resistance change ratio cannot be obtained in a certain angle range near a center between an N pole and an S pole, so that it cannot be used as an absolute angle sensor.

JP 2007-40850 A (FIG. 5) discloses a rotation angle sensor comprising a magnetic sensor arranged in a space above a ring magnet, the magnetic sensor having two magnetoelectric conversion devices for sensing magnetic flux density components Bx and By in parallel with the surface magnet and perpendicular to each other. At the position of the magnetism sensor, the components Bx and By changing with the rotation of the magnet have the same amplitude in an absolute value. FIG. 5 of JP 2007-40850 A indicates that the magnetism sensor detects two axial components Bx and By in parallel with the magnet surface, but it fails to teach the detection of a Z-axis component Bz of the magnetic flux density. Thus, the sensors 12X and 12Y are identified as Hall elements. In order that two sensors are three-dimensionally cross each other as shown in FIG. 5 of JP 2007-40850 A, they should have notches for mating. However, when a magnetosensitive surface of a Hall element as one sensor is at a space position, a notch of the other sensor is at that space position, resulting in deviation. Namely, the rotation angle sensor described in JP 2007-40850 A does not simultaneously detect Bx, By and Bz with one magnetosensitive surface on a substrate. When a sensor is arranged inside a periphery of the magnet, the sensor would come into contact with the magnet if the rotation axis were deviated. On the other hand, when the sensor is arranged outside the magnet with distance, its output decreases drastically because it is a Hall element.

A driving motor mounted on a hybrid vehicle is provided with a resolver for detecting the rotation angle of its rotation axis, to conduct control by changing current for driving the motor and current recovered from the motor. The resolver has a shape similar to the motor, having a yoke having coils wound around a portion on the side of the rotation axis and a portion on the stationary (casing) side. Using the function of the opposing yokes like a transformer, position information about the yoke on the rotation axis side is obtained and converted to the rotation angle. Having the yoke and the coils, however, the resolver is large, heavy and expensive with complicated winding. Accordingly, demand is mounting for small, lightweight sensors capable of detecting the rotation angle with high accuracy, but the above conventional apparatuses are not sufficiently accurate.

OBJECTS OF THE INVENTION

Accordingly, an object of the present invention is to provide a rotation-angle-detecting apparatus with high rotation-angle-detecting accuracy, and a rotating machine.

DISCLOSURE OF THE INVENTION

As a result of intense research in view of the above object, the inventors have found that by detecting the direction of a magnetic field by a sensor device comprising spin-valve, giant-magnetoresistive devices when a magnet rotor is rotated, the rotation angle of the magnet rotor can be measured with high accuracy. The present invention has been completed based on such finding.

First Rotation-Angle-Detecting Apparatus

The first rotation-angle-detecting apparatus of the present invention comprises a magnet rotor having 4 or more magnetic poles on the surface, a sensor device for detecting magnetic flux from the magnet rotor, and an electronic circuit for outputting a signal representing the rotation angle of the magnet rotor using pluralities of signals obtained from the sensor device;

the sensor device comprising pluralities of spin-valve, giant-magnetoresistive devices for sensing a rotating magnetic field near the rotating magnet to output two or more different phase signals, each spin-valve, giant-magnetoresistive device having a pinned layer and a free layer, the magnetization direction of the pinned layer being fixed, and the magnetization direction of the free layer rotating depending on a magnetic field direction; and the pluralities of spin-valve, giant-magnetoresistive devices comprising a first spin-valve, giant-magnetoresistive device having a reference magnetic-field-sensing direction, and a second spin-valve, giant-magnetoresistive device having a magnetic-field-sensing direction different from that of the first spin-valve, giant-magnetoresistive device.

The outputting of a rotation angle signal corresponding to the rotation angle means conducting arctangent calculation. Specifically, it is a treatment of digitally conducting the arctangent calculation.

When the magnet rotor is rotated, the spin-valve, giant-magnetoresistive devices are not mechanically rotated, but the magnetization directions of free layers in the spin-valve, giant-magnetoresistive devices are magnetically rotated.

The rotation period of the magnetization direction of the free layer is 1/N times (N is an integer of 2 or more) of the rotation period of the magnet rotor, resulting in high resolution. The rotation-angle-detecting apparatus is preferably mounted to a rotating machine.

Second Rotation-Angle-Detecting Apparatus

The second rotation-angle-detecting apparatus of the present invention comprises a magnet rotor having 4 or more magnetic poles on the surface, and first and second sensor devices for detecting the direction of magnetic flux from the magnet rotor;

the first sensor device containing sensor bridges X01 and Y01, in which the magnetization directions of pinned layers are perpendicular to each other;

the second sensor device containing sensor bridges X02 and Y02, in which the magnetization directions of pinned layers are perpendicular to each other;

each sensor bridge X01, Y01, X02, Y02 being a full bridge of spin-valve, giant-magnetoresistive devices each having a pinned layer and a free layer, the magnetization direction of the pinned layer being fixed, and the magnetization direction of the free layer rotating depending on a magnetic field direction;

the magnetization directions of pinned layers in adjacent spin-valve, giant-magnetoresistive devices in the full bridge being antiparallel; and voltage being applied to the full bridges to obtain differential outputs each corresponding to an angle between the magnetization direction of the pinned layer and the magnetization direction of the free layer, and an angle signal being obtained based on the differential outputs.

The four spin-valve, giant-magnetoresistive devices correspond to four elements constituting an electric full bridge circuit. The differential output is obtained from two outputs at the connecting points of a full bridge by an operational amplifier.

It is preferable to obtain a first rotation angle signal (cosine signal) from angle information independently detected by the sensor bridges X01 and Y02, and a second rotation angle signal (sine signal), which delays 90° by electrical angle from the first rotation angle signal, from angle information independently detected by the sensor bridges Y01 and X02. The sine signal has a waveform whose one wavelength corresponds to an electrical angle of 360°. Specifically, it is a waveform that can be divided by a Fourier series expansion to a fundamental wave (ideal sine wave) and harmonics causing a rotation angle error. The cosine signal is a waveform that can be divided by a Fourier series expansion to a fundamental wave (ideal cosine wave) and harmonics.

The magnet rotor preferably has two or more pairs of magnetic poles. A pair of poles are an N pole and an adjacent S pole. For instance, when magnetized to have 12 poles as shown in FIG. 5, the magnet rotor has 6 pairs of poles. Each sensor device contains two sensor bridges, in which the magnetization directions of pinned layers are perpendicular to each other.

The term "near the magnet rotor" means that the distance between the magnet rotor and the sensor device is set to meet the condition that a free layer in the spin-valve, giant-magnetoresistive device rotates when the magnet rotor is rotated. Because elements are arranged with inclination of 90° in sensor bridges in one sensor device, the rotation angle can be measured accurately even if the sensor devices are not positioned with phase difference of 90°.

The rotation-angle-detecting apparatus preferably comprises a first sensor device for outputting two pieces of angle information; a second sensor device for outputting two pieces of angle information; a first synthesizer for synthesizing one output signal 01 from the first sensor device and one output signal 02 from the second sensor device to provide a first sinusoidal output signal which contains less harmonics than the output signals 01 and 02; a second synthesizer for synthesizing the other output signal 03 from the first sensor device and the other output signal 04 from the second sensor device to provide a second sinusoidal output signal which contains less harmonics than the output signals 03 and 04, the second sinusoidal output signal having phase difference of 90° relative to the first sinusoidal output signal; and an arctangent calculator to which the first sinusoidal output signal and the second sinusoidal output signal are input to provide an output signal representing the rotation angle of the magnet rotor.

The term "arctangent calculation" means to determine the value of $\theta$ meeting the relation of $\tan \theta = y/x$ from the first sinusoidal output signal x and the second sinusoidal output signal y. To improve rotation angle detection accuracy, the rotation-angle-detecting apparatus preferably comprises a means for inverting at least one of signals output from the first and second sensor devices before treatment. The inversion of three signals is included as equivalence to the inversion of one signal.

Because a half-bridge makes a signal half, a full bridge is preferable. When spin-valve, giant-magnetoresistive devices are used in one side of the bridge while electric resistors are used in the other side, an unnecessary component (signal component not necessary for obtaining accurate rotation angle) increases due to asymmetry. Accordingly, a full bridge constituted by four spin-valve, giant-magnetoresistive devices is used.

Each sensor bridge Y01, Y02 has a magnetic-field-sensing direction aligned with the rotational direction of the magnet rotor. The rotation-angle-detecting apparatus comprises a signal-processing means for differentially amplifying angle information detected by the sensor bridge X01 and an inverted signal obtained from angle information detected by the sensor bridge Y02 to provide a first rotation angle signal (cosine signal), and differentially amplifying angle information independently detected by the sensor bridges Y01 and X02 to provide a second rotation angle signal (sine signal), which delays from the first rotation angle signal by 90° by electrical angle.

The rotation-angle-detecting apparatus has a circuit structure comprising (a) separate differential amplifiers to which outputs from the sensor bridges X01 and Y02 are input, and a signal-processing means to which the outputs of the differential amplifiers are input, to output a first rotation angle signal (cosine signal), and (b) separate differential amplifiers to which outputs from the sensor bridges Y01 and X02 are input, and a signal-processing means to which the outputs of the differential amplifiers are input, to output a second rotation angle signal (sine signal), the output of the sensor bridge Y02 being inverted to opposite polarity to that of the sensor bridges X01, X02 and $\overline{Y01}$ before input to the differential amplifiers.

When the output of the sensor bridge Y02 is not inverted to opposite polarity, the voltage applied to the sensor bridge Y02 preferably has opposite polarity to that applied to the sensor bridges X01, X02 and $\overline{Y01}$.

When the magnetization directions of pinned layers in the sensor bridges Y01 and Y02 are opposite the rotational direction of the magnet rotor, their output signals increase. The apparatus preferably comprises a signal-processing means for providing a first rotation angle signal (cosine signal) by the differential amplification of angle information independently detected by the sensor bridges X01 and Y02, and a second rotation angle signal (sine signal), which delays by 90° by electrical angle from the first rotation angle signal, by the differential amplification of angle information independently detected by the sensor bridges Y01 and X02.

A first rotation angle signal (cosine signal) obtained by the differential amplification of angle information detected by the sensor bridge X01 and an angle signal obtained by inverting angle information detected by the sensor bridge Y02, and a second rotation angle signal (sine signal) obtained by the differential amplification of angle information independently detected by the sensor bridges Y01 and X02, which delays by 90° by electrical angle from the first rotation angle signal are preferably subjected to analog-digital conversion. Instead, only a digital signal obtained from the signal Y02 may be inverted.

It is preferable that outputs from the sensor bridges X01 and Y02 are input to separate differential amplifiers, whose outputs are input to a signal-processing means comprising an addition circuit for obtaining a first rotation angle signal (cosine signal), and that outputs from the sensor bridges Y01 and X02 are input to separate differential amplifiers, whose outputs are input to a signal-processing means comprising an addition circuit for obtaining a second rotation angle signal (sine signal).

The apparatus preferably comprises an analog-digital converter for converting the first rotation angle signal (cosine signal) and the second rotation angle signal (sine signal) to digital signals, and an angle calculator for calculating an angle from the digital signals.

The first sensor device and the second sensor device are preferably separate from each other by substantially $90 \pm 180n°$ (n is an integer) by electrical angle with respect to the magnet rotor. The first sensor device and the second sensor device are more preferably separate from each other by substantially 90° by electrical angle with respect to the magnet rotor.

When the magnet rotor has N pairs of magnetic poles, an angle between the first sensor device and the second sensor device is preferably represented by $\pm 90 + 180N°$ by electrical angle.

The apparatus preferably comprises a first sensor device group comprising the first and second sensor devices, and a second sensor device group comprising other sensor devices each having the same structure as that of the sensor device in the first sensor device group, the relative arrangement of the other sensor devices being the same as in the first sensor device group; and the first sensor device group and the second sensor device group being separate from each other by $180n°$ by electrical angle, wherein n is an integer.

Signals from the sensor bridges X01, Y01, X02 and Y02 are preferably input to separate differential amplifiers to obtain four signals, which are calculated to output an error detection signal.

Signals from the sensor bridges X01, Y01, X02 and Y02 are preferably input to separate differential amplifiers to obtain four signals, which are averaged to obtain a fifth signal, which is compared with a predetermined DC voltage to determine their difference, based on which an error detection signal is output. The absolute value of the difference is preferably about ⅛ or less of the amplitudes of the original four signals to permit deviation when their waveforms are deformed.

Third Rotation-Angle-Detecting Apparatus

The third rotation-angle-detecting apparatus of the present invention comprises a magnet rotor having 2 or more magnetic poles on the surface, and a sensor device for detecting the direction of magnetic flux from the magnet rotor, the distance between the center of the sensor device and the rotation axis of the magnet rotor being larger than the radius of the magnet rotor;

the sensor device containing sensor bridges X01 and Y01, in which the magnetization directions of pinned layers are perpendicular to each other;

each sensor bridge X01, Y01 being a bridge circuit of spin-valve, giant-magnetoresistive devices each having a pinned layer and a free layer, the magnetization direction of the pinned layer being fixed, and the magnetization direction of the free layer rotating depending on a magnetic field direction;

the magnetization directions of pinned layers in electrically adjacent spin-valve, giant-magnetoresistive devices in the sensor bridges X01 and Y01 being antiparallel; and voltage being applied to the sensor bridges X01 and Y01 to obtain outputs each corresponding to an angle between the magnetization direction of the pinned layer and the magnetization direction of the free layer, and an angle signal being obtained based on the outputs.

The thickness t of the magnet corresponds to the size of the magnet in a rotation axis direction. The center of the sensor device is a center of the spin-valve, giant-magnetoresistive device, or when the sensor device comprises pluralities of spin-valve, giant-magnetoresistive devices, it is a thickness center point at substantially the same distance from the spin-valve, giant-magnetoresistive devices. Because the spin-valve, giant-magnetoresistive device is sufficiently thinner than the magnet rotor, the above center may be regarded as existing on a substrate on which the spin-valve, giant-magnetoresistive device is formed. Namely, the center of the sensor device may be regarded as existing on the sensor surface.

Fourth Rotation-Angle-Detecting Apparatus

The fourth rotation-angle-detecting apparatus of the present invention comprises a magnet rotor having 2 or more magnetic poles on the surface, and first and second sensor devices for detecting the direction of magnetic flux from the magnet rotor;

the distance between the center of the first sensor device and the rotation axis of the magnet rotor being larger than the radius of the magnet rotor;

the distance between the center of the second sensor device and the rotation axis of the magnet rotor being larger than the radius of the magnet rotor;

the first sensor device containing sensor bridges X01 and Y01, in which the magnetization directions of pinned layers are perpendicular to each other;

the second sensor device containing sensor bridges X02 and Y02, in which the magnetization directions of pinned layers are perpendicular to each other;

each sensor bridge X01, Y01, X02, Y02 being a bridge circuit of spin-valve, giant-magnetoresistive devices each having a pinned layer and a free layer, the magnetization direction of the pinned layer being fixed, and the magnetization direction of the free layer rotating depending on a magnetic field direction;

the magnetization directions of pinned layers in electrically adjacent spin-valve, giant-magnetoresistive devices in the sensor bridges X01, Y01, X02 and Y02 being antiparallel; and voltage being applied to the sensor bridges X01, Y01, X02 and Y02 to obtain outputs each corresponding to an angle between the magnetization direction of the pinned layer and the magnetization direction of the free layer, and an angle signal being obtained based on the outputs.

A plane including the magnetization direction of the pinned layer in each sensor bridge X0, Y01, X02, Y02 is preferably inclined from the rotation axis of the magnet rotor.

The plane including the magnetization direction of the pinned layer in each sensor bridge X01, Y01, and the plane including the magnetization direction of the pinned layer in each sensor bridge X02, Y02 are called "sensor surfaces." The definition of $\chi$ will be given below.

The centers of the first and second sensor devices are preferably separate from a plane passing the thickness center position of the magnet rotor and perpendicular to the rotation axis in the rotation axis direction of the magnet rotor.

Two or four spin-valve, giant-magnetoresistive devices are used, each of them corresponding to an element constituting an electric half- or full-bridge circuit.

In the third and fourth rotation-angle-detecting apparatuses, it is preferable to obtain a first rotation angle signal (cosine signal) based on angle information independently detected by the sensor bridges X01 and Y02, and a second rotation angle signal (sine signal), which delays 90° by electrical angle from the first rotation angle signal, based on angle information independently detected by the sensor bridges Y01 and X02.

The magnet rotor preferably has 2 or more magnetic poles. 2 magnetic poles correspond to one N pole and one S pole adjacent thereto (called "one-pair-pole"). Each sensor device comprises two sensor bridges, in which the magnetization directions of pinned layers in elements are perpendicular to each other. In a state of "near the magnet rotor," a distance from the magnet rotor to the sensor device is set such that when the magnet rotor rotates, a free layer in a spin-valve, giant-magnetoresistive device (element) rotates. Particularly when two sensor devices are used, elements constituting sensor bridges in one sensor device are arranged with angle difference of 90°, the rotation angle can be measured accurately even if the sensor devices do not have phase difference of 90°.

Because a half-bridge circuit generates a half-amplitude signal, a full-bridge circuit is preferable. When the bridge circuit comprises one side constituted by spin-valve, giant-magnetoresistive devices and the other side constituted by simple electric resistors, an unnecessary component (a signal component unnecessary for obtaining an accurate rotation angle) increases because of asymmetry. Accordingly, four elements constituting the full-bridge circuit are spin-valve, giant-magnetoresistive devices.

Each of the third and fourth rotation-angle-detecting apparatuses preferably comprises an analog-digital converter for converting the first rotation angle signal (cosine signal) and the second rotation angle signal (sine signal) to digital signals, and an angle calculator for calculating an angle signal from the digital signals.

The first sensor device and the second sensor device are preferably separate from each other by substantially 90±180n°, wherein n is an integer, by electrical angle with respect to the magnet rotor. The first sensor device and the second sensor device are more preferably separate from each other by substantially 90° by electrical angle with respect to the magnet rotor.

When the magnet rotor has N pairs of magnetic poles, an angle between the first sensor device and the second sensor device is preferably represented by ±90+180N° by electrical angle.

The apparatus preferably comprises a first sensor device group comprising the first and second sensor devices; and a second sensor device group comprising other sensor devices each having the same structure as that of the sensor device in the first sensor device group, the relative arrangement of the other sensor devices being the same as in the first sensor device group; and the first sensor device group and the second sensor device group being separate from each other by 180n° by electrical angle, wherein n is an integer.

Signals from the sensor bridges X01, Y01, X02 and Y02 are preferably input to separate differential amplifiers to obtain four signals, which are calculated to output an error detection signal.

Signals from the sensor bridges X01, Y01, X02 and Y02 are preferably input to separate differential amplifiers to obtain four signals, which are averaged to obtain a fifth signal, which is compared with a predetermined DC voltage to determine their difference, based on which an error detection signal is output. The absolute value of the difference is preferably about ⅛ or less of the amplitudes of the original four signals to permit deviation when their waveforms are deformed.

Fifth Rotation-Angle-Detecting Apparatus

The fifth rotation-angle-detecting apparatus of the present invention comprises a magnet rotor having two magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction; and the sensor device being arranged relative to the magnet rotor to cause the magnetic flux to cross the magnetosensitive surface, such that magnetic flux density components perpendicular to each other on the magnetosensitive surface have the same amplitude.

The same amplitude means that the amplitude ratio $K_{eff}=B\perp_{eff0}/B_{//eff0}$ of effective magnetic flux density components perpendicular to each other is 1. $K_{eff}$ is specifically 0.93-1.08, more desirably 0.96-1.04, ideally 1.0.

The two-pole magnet need only have one N pole and one S pole, in a shape of disc, ring, rectangle, etc. The two-pole magnet is magnetized in a direction perpendicular to the rotation axis of the magnet rotor. The rotation axis corresponds to a centerline of an object whose rotation angle is measured, such as a rotor or a rotation shaft.

Sixth Rotation-Angle-Detecting Apparatus

The sixth rotation-angle-detecting apparatus of the present invention comprises a magnet rotor having two magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction; and the sensor device being arranged relative to the magnet rotor, such that the amplitude ratio ($K_{eff}=B\perp_{eff0}/B_{//eff0}$) of effective magnetic flux density components perpendicular to each other on the magnetosensitive surface is 1 at a position meeting the condition of a space magnetic flux density amplitude ratio $K_0=B\perp_0/B_{//0}\neq 1$.

Seventh Rotation-Angle-Detecting Apparatus

The seventh rotation-angle-detecting apparatus of the present invention comprises a magnet rotor having two magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction;

the sensor device being arranged, such that $\phi$ and $\chi$ are in a range that:
(a) $\phi$ is $-1.6°$ to $1.5°$, and $\chi$ is $-57.6°$ to $-62.2°$,
(b) $\phi$ is $-1.5°$ to $1.6°$, and $\chi$ is $57.6°$ to $62.2°$,
(c) $\phi$ is $33.8°$ to $36.6°$, and $\chi$ is $2.7°$ to $3.1°$,
(d) $\phi$ is $19.2°$ to $22.8°$, and $\chi$ is $87.4°$ to $92.4°$,
(e) $\phi$ is $67.1°$ to $70.8°$, and $\chi$ is $84.2°$ to $97.7°$, or
(f) $\phi$ is $81.4°$ to $98.7°$, and $\chi$ is $158.6°$ to $201.2°$,
wherein $\phi$ is a sensor arrangement angle between a line connecting the thickness center point of the magnet rotor and the center of the magnetosensitive surface of the sensor device, and a plane passing the thickness center point of the magnet rotor and perpendicular to the rotation axis, and $\chi$ is a sensor inclination angle between a plane passing the thickness center point of the magnet rotor and perpendicular to the rotation axis and the magnetosensitive surface;

the sensor device containing sensor bridges A01 and B01, in which the magnetization directions of pinned layers are perpendicular to each other;

each sensor bridge A01, B01 being a bridge circuit of the spin-valve, giant-magnetoresistive devices;

the magnetization directions of pinned layers in electrically adjacent spin-valve, giant-magnetoresistive devices in the bridge circuit being antiparallel; and voltage being applied to the sensor bridges A01 and B01 to obtain outputs each corresponding to an angle between the magnetization direction of the pinned layer and the magnetization direction of the free layer, and an angle signal being obtained based on the outputs.

The rotation-angle-detecting apparatus comprising the two magnetic poles can measure an absolute angle in one rotation of the magnet rotor. Accordingly, it is suitable for mechanical rotation measurement (measurement of the mechanical angle). On the other hand, the rotation-angle-detecting apparatus comprising a magnet rotor having 4 or more magnetic poles as described later has angle-detecting resolution N times as much as in the case of the 2-pole magnet rotor.

In the rotation-angle-detecting apparatus comprising a rotatably supported magnet rotor, a both-end-supported-type magnet rotor suffers less rotation axis deviation, resulting in rotation angle detection with higher accuracy, than a cantilever-type magnet rotor (having a rotation shaft extending therefrom only on one side) does. Further, the both-end-supported-type magnet rotor makes the detection apparatus smaller.

Eighth Rotation-Angle-Detecting Apparatus

The eighth rotation-angle-detecting apparatus of the present invention comprises a magnet rotor having 4 or more magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction; and the sensor device being arranged relative to the magnet rotor to cause the magnetic flux to cross the magnetosensitive surface, such that magnetic flux density components perpendicular to each other on the magnetosensitive surface have the same amplitude.

The magnet rotor having 4 or more magnetic poles need only have at least two N poles and at least two S poles. For instance, it may be a magnet rotor having 4 or more magnetic poles on the circumferential surface, or a magnet rotor having many two-pole magnet segments integrally arranged in a circumferential direction.

Ninth Rotation-Angle-Detecting apparatus

The ninth rotation-angle-detecting apparatus of the present invention comprises a magnet rotor having 4 or more magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction; and the sensor device being arranged relative to the magnet rotor, such that the amplitude ratio ($K_{eff}=B\perp_{eff0}/B_{//eff0}$) of effective magnetic flux density components perpendicular to each other on the magnetosensitive surface is 1 at a position meeting the condition of a space magnetic flux density amplitude ratio $K_0=B\perp_0/B_{//0}\neq 1$.

Tenth Rotation-Angle-Detecting Apparatus

The tenth rotation-angle-detecting apparatus of the present invention comprises a magnet rotor having 4 or more magnetic poles, and a sensor device for detecting the direction of magnetic flux from the magnet rotor;

the sensor device having a magnetosensitive surface comprising pluralities of spin-valve, giant-magnetoresistive devices each having a pinned layer and a free layer, the magnetization direction of the pinned layer being fixed, and the magnetization direction of the free layer rotating depending on a magnetic field direction;

the sensor device being arranged such that $\phi$ and $\chi$ are in a range of $z \ne 0$, $\chi = 0$, and $\phi = 4.5°$ to $25°$, or in a range of $z = 0$, $\phi = 0$, and $\chi = 40°$ to $60°$, wherein $\phi$ is a sensor arrangement angle between a line connecting the thickness center point of the magnet rotor and the center of the magnetosensitive surface of the sensor device, and a plane passing the thickness center point of the magnet rotor and perpendicular to the rotation axis, and $\chi$ is a sensor inclination angle between a plane passing the thickness center point of the magnet rotor and perpendicular to the rotation axis and the magnetosensitive surface;

the sensor device containing sensor bridges A01 and B01, in which the magnetization directions of pinned layers are perpendicular to each other;

each sensor bridge A01, B01 being a bridge circuit of the spin-valve, giant-magnetoresistive devices;

the magnetization directions of pinned layers in electrically adjacent spin-valve, giant-magnetoresistive devices in the bridge circuit being antiparallel; and voltage being applied to the sensor bridges A01 and B01 to obtain outputs each corresponding to an angle between the magnetization direction of the pinned layer and the magnetization direction of the free layer, and an angle signal being obtained based on the outputs.

It is preferable that the distance between the center of the magnetosensitive surface of the sensor device and the rotation axis of the magnet rotor is larger than the radius of the magnet rotor; that the magnetosensitive surface is inclined from the rotation axis of the magnet rotor; that the sensor device contains sensor bridges A01 and B01, in which the magnetization directions of pinned layers are perpendicular to each other; that each sensor bridge A01, B01 is a bridge circuit of the spin-valve, giant-magnetoresistive devices; that the magnetization directions of pinned layers in electrically adjacent spin-valve, giant-magnetoresistive devices in each bridge circuit are antiparallel; and that voltage is applied to the sensor bridges A01 and B01 to obtain outputs each corresponding to an angle between the magnetization direction of the pinned layer and the magnetization direction of the free layer, an angle signal being obtained based on the outputs.

It is preferable that the distance between the center of the magnetosensitive surface of the sensor device and the rotation axis of the magnet rotor is larger than the radius of the magnet rotor; that the center of the magnetosensitive surface of the sensor device is separate from a plane passing the thickness center point of the magnet rotor and perpendicular to the rotation axis in the rotation axis direction of the magnet rotor; that the sensor device contains sensor bridges A01 and B01, in which the magnetization directions of pinned layers are perpendicular to each other; that each sensor bridge A01, B01 is a bridge circuit of the spin-valve, giant-magnetoresistive devices; that the magnetization directions of pinned layers in electrically adjacent spin-valve, giant-magnetoresistive devices in each bridge circuit are antiparallel; and that voltage is applied to the sensor bridges A01 and B01 to obtain outputs each corresponding to an angle between the magnetization direction of the pinned layer and the magnetization direction of the free layer, an angle signal being obtained based on the outputs.

It is preferable that the distance between the center of the magnetosensitive surface of the sensor device and the rotation axis of the magnet rotor is equal to or less than the radius of the magnet rotor; that the magnetosensitive surface is inclined from the rotation axis of the magnet rotor; that the sensor device contains sensor bridges A01 and B01, in which the magnetization directions of pinned layers are perpendicular to each other; that each sensor bridge A01, B01 is a bridge circuit of the spin-valve, giant-magnetoresistive devices; that the magnetization directions of pinned layers in electrically adjacent spin-valve, giant-magnetoresistive devices in each bridge circuit are antiparallel; and that voltage is applied to the sensor bridges A01 and B01 to obtain outputs each corresponding to an angle between the magnetization direction of the pinned layer and the magnetization direction of the free layer, an angle signal being obtained based on the outputs.

It is preferable that the distance between the center of the magnetosensitive surface of the sensor device and the rotation axis of the magnet rotor is equal to or less than the radius of the magnet rotor and larger than 0; that the center of the magnetosensitive surface of the sensor device is separate from a plane passing the thickness center point of the magnet rotor and perpendicular to the rotation axis in the rotation axis direction of the magnet rotor; that the sensor device sensor contains bridges A01 and B01, in which the magnetization directions of pinned layers are perpendicular to each other; that each sensor bridge A01, B01 is a bridge circuit of the spin-valve, giant-magnetoresistive devices; that the magnetization directions of pinned layers in electrically adjacent spin-valve, giant-magnetoresistive devices in each bridge circuit are antiparallel; and that voltage is applied to the sensor bridges A01 and B01 to obtain outputs each corresponding to an angle between the magnetization direction of the pinned layer and the magnetization direction of the free layer, an angle signal being obtained based on the outputs.

The center of the magnetosensitive surface of the sensor device is a thickness center point substantially equally distant from pluralities of spin-valve, giant-magnetoresistive devices. Because the spin-valve, giant-magnetoresistive device is sufficiently thinner than the magnet rotor, the center may be regarded as existing on a substrate on which the spin-valve, giant-magnetoresistive devices are formed.

Two or four spin-valve, giant-magnetoresistive devices are used, each corresponding to an element constituting an electric half- or full-bridge circuit. To obtain a high output, it is preferable to use four spin-valve, giant-magnetoresistive devices.

The apparatus preferably comprises an analog-digital converter for converting a signal (cosine signal) from the sensor bridge A01 and a signal (sine signal) from the sensor bridge B01 to digital signals, and an angle calculator for calculating an angle signal from the digital signals.

At least one sensor device different from the above sensor device can be arranged near the magnet rotor, so that signals obtained from them are synthesized and calculated to obtain a rotation angle signal.

Rotating Machine

The rotating machine of the present invention comprises any one of the above rotation-angle-detecting apparatuses. Specific examples of the rotating machine include electric generators and motors. The above rotation-angle-detecting apparatuses are preferably used in driving motors for hybrid vehicles for weight reduction.

Rotation-Angle-Detecting Method

The rotation-angle-detecting method of the present invention uses a rotation-angle-detecting apparatus comprising a magnet rotor having 4 or more magnetic poles on the surface, a sensor device for detecting the direction of magnetic flux from the magnet rotor, and an electronic circuit for outputting a signal representing the rotation angle of the magnet rotor using pluralities of signals obtained from the sensor device, detecting a rotating magnetic field near the rotating magnet by the sensor device to generate two or more different phase signals, synthesizing the phase signals to two signals by the electronic circuit, and subjecting the two signals to a treatment including arctangent calculation to output the signal representing the rotation angle of the magnet rotor.

The electronic circuit preferably conducts a treatment including arc tangent calculation. Preferably, the arc tangent calculation is digitally conducted.

BRIEF DESCRIPTION OF THE DRAWINGS

FIG. 3 is a view showing one example of circuits used in the rotation-angle-detecting apparatus of Example 1.

FIG. 22(*b*) is a cross-sectional view taken along the line A-A in FIG. 22(*a*).

FIG. 22(*c*) is a graph showing the sensor output of the rotation-angle-detecting apparatus of FIG. 22(*a*).

FIG. 22(*d*) is a graph showing the sensor output of the rotation-angle-detecting apparatus of FIG. 22(*a*).

FIG. 22(*e*) is a graph showing angles detected by the rotation-angle-detecting apparatus of FIG. 22(*a*) and their errors.

FIG. 22(*f*) is a graph showing angles detected by the rotation-angle-detecting apparatus of FIG. 22(*a*) and their errors in an enlarged manner.

FIG. 23(*b*) is a graph showing the dependence of the $B_\theta/B_r$ and preferred inclination angle $\chi$ of the magnet rotor on distance.

FIG. 24(*b*) is a cross-sectional view taken along the line A-A in FIG. 24(*a*).

FIG. 24(*c*) is a graph showing the sensor output of the rotation-angle-detecting apparatus of FIG. 24(*a*).

FIG. 24(*d*) is a graph showing the sensor output of the rotation-angle-detecting apparatus of FIG. 24(*a*).

FIG. 24(*e*) is a graph showing angles detected by the rotation-angle-detecting apparatus of FIG. 24(*a*) and their errors.

FIG. 24(*f*) is a graph showing angles detected by the rotation-angle-detecting apparatus of FIG. 24(*a*) and their errors in an enlarged manner.

FIG. 25(*b*) is a schematic view showing a still further example of the rotation-angle-detecting apparatuses of Example 3.

FIG. 27(*b*) is a graph showing the dependence of the output of the sensor bridge of the present invention on a circumferential distance.

FIG. 27(*c*) is a graph showing the dependence of the output of a Hall IC on a radial distance.

FIG. 27(*d*) is a graph showing the dependence of the output of a Hall IC on a circumferential distance.

FIG. 27(*e*) is a graph showing the dependence of the output voltage of a sensor device and a Hall IC on a distance from the rotor surface.

FIG. 27(*f*) is a graph showing the sensor bridge output characteristics of the sensor device relative to a magnetic flux density.

FIG. 30(*b*) is a cross-sectional view taken along the line A-A in FIG. 30(*a*).

FIG. 31(*b*) is a schematic side view showing a further example of the rotation-angle-detecting apparatuses of Example 4, a portion below the chain line being a partial cross-sectional view showing a magnet rotor.

FIG. 33(*b*) is a schematic side view showing one example of the rotation-angle-detecting apparatuses of Example 5.

FIG. 33(*c*) is a graph showing the sensor output of the rotation-angle-detecting apparatus of FIG. 33(*a*).

FIG. 33(*d*) is a graph showing angles detected by the rotation-angle-detecting apparatus of FIG. 33(*a*) and their errors.

FIG. 34(*b*) is a schematic side view showing a further example of the rotation-angle-detecting apparatuses of Example 5.

FIG. 34(*c*) is a graph showing the sensor output of the rotation-angle-detecting apparatus of FIG. 34(*a*).

FIG. 34(*d*) is a graph showing angles detected by the rotation-angle-detecting apparatus of FIG. 34(*a*) and their errors.

FIG. 36(*b*) is a graph showing the ranges of a sensor arrangement angle $\phi$ and a sensor inclination angle $\chi$, which provide an angle error of within 1°.

FIG. 36(*c*) is a graph showing the ranges of a sensor arrangement angle $\phi$ and an optimum sensor inclination angle $\chi$, which provide an angle error of within 2°.

FIG. 37 is a Table showing relations among angle errors, effective magnetic flux density amplitude ratios $K_{eff}$, optimum sensor inclination angles $\chi$, and optimum sensor arrangement angles $\phi$ given in FIGS. 36(*a*) to 36(*c*).

FIG. 38(*b*) is a schematic side view showing a further example of the rotation-angle-detecting apparatuses of Example 7.

FIG. 38(*c*) is a graph showing the sensor output of the rotation-angle-detecting apparatus of FIG. 38(*a*).

FIG. 38(*d*) is a graph showing angles detected by the rotation-angle-detecting apparatus of FIG. 38(*a*) and their errors.

Figure 1A:
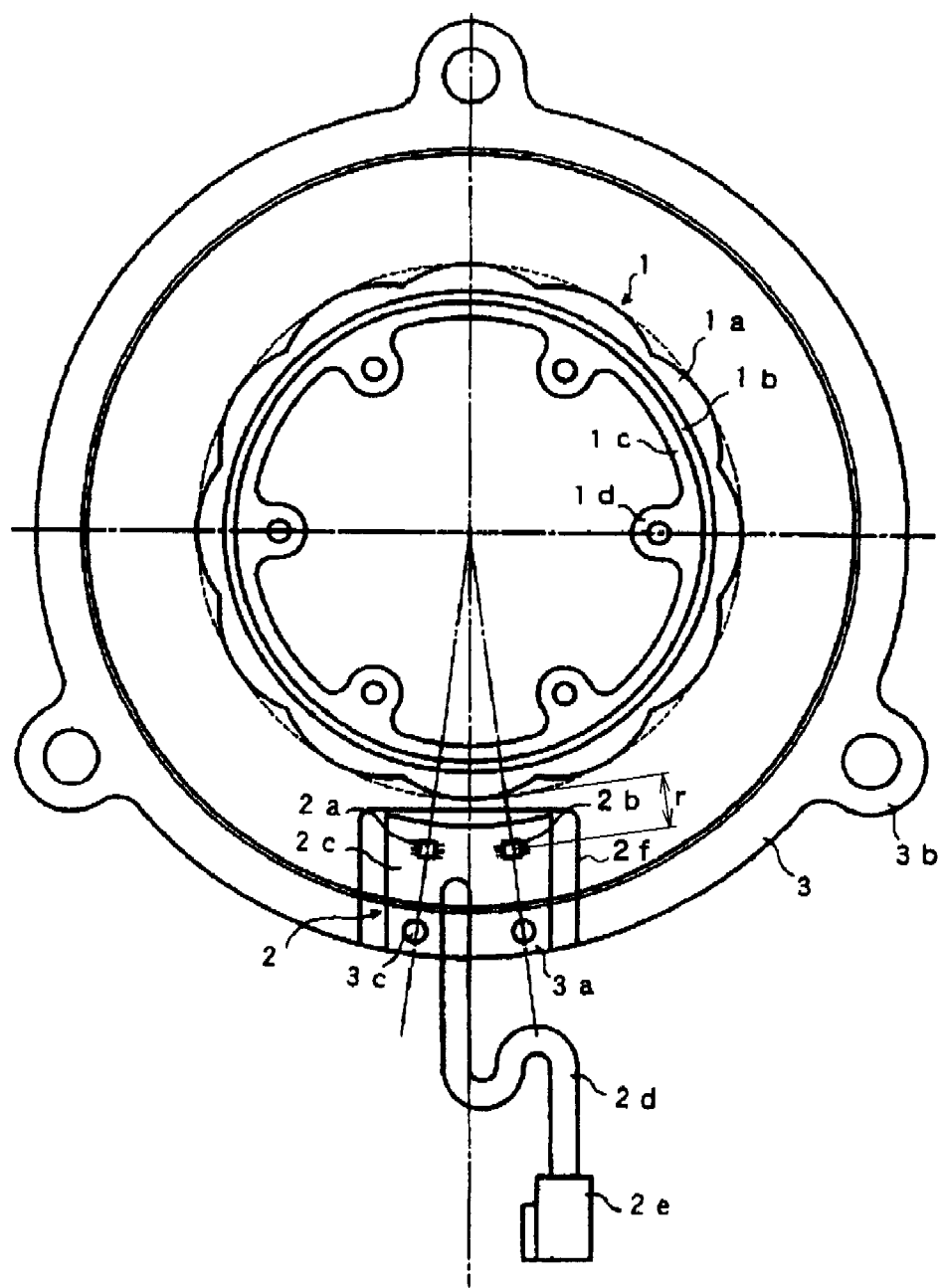
FIG. 1(a) is a schematic front view showing one example of the rotation-angle-detecting apparatuses of the present invention.

DESCRIPTION OF THE BEST MODE OF THE INVENTION (1) Principle of Rotation Angle Detection In a magnet rotor having 2N poles, wherein N is a natural number, in a rotation direction, the principle of detecting an angle according to the present invention will be explained. This magnet rotor has N pairs of magnetic poles with N axes of symmetry. A mechanical angle $\theta_m$ at a certain reference angle is expressed by the formula (1) of an electrical angle $\theta_{e1}$. Particularly in the case of two poles (N=1), the mechanical angle is expressed by the formula (2), meaning that it is equal to the electrical angle.

$$\theta_m = (2n\pi + \theta_{e1})/N \qquad (1), \text{and}$$

$$\theta_m = \theta_{e1} \qquad (2).$$

For simplicity, it is assumed that the magnet rotor has an infinite longitudinal length, meaning that a magnetic field is uniformly distributed in a longitudinal direction. When a magnetic field generated from the magnet rotor is expressed by a space vector that is a function of a measurement position (r, θ), the radial component $H_r$ and circumferential component $H_\theta$ of the magnetic field are approximated to the formulae (3-1) and (3-2), respectively.

$$H_r(r,\theta) \approx A_1 \cos\theta_{e1} + A_3 \cos 3\theta_{e1} + A_5 \cos 5\theta_{e1} + \qquad (3\text{-}1), \text{and}$$

$$H_\theta(r,\theta) \approx A_1 \sin\theta_{e1} + A_3 \sin 3\theta_{e1} + A_5 \sin 5\theta_{e1} + \qquad (3\text{-}2).$$

In a case where a fundamental wave $A_1$ is not zero, the formulae (3-1) and (3-2) can be simplified to the formulae (4-1) and (4-2):

$$H_r(r,\theta) \approx A_1 \cos\theta_{e1} \qquad (4\text{-}1), \text{and}$$

$$H_\theta(r,\theta) \approx A_1 \sin\theta_{e1} \qquad (4\text{-}2),$$

when r is large enough, and when third harmonics or higher are smaller than the fundamental wave $A_1$.

This means that when the magnet rotor moves by an angle $\theta_m$ relative to a measurement point, the direction of a magnetic field changes by $\theta_{e1}$. Thus, the detection of the direction of a magnetic field enables the measurement of the rotation angle of a magnet rotor regardless of magnetic field intensity.

(2) Spin-Valve, Giant-Magnetoresistive Device

An element for a magnetic sensor utilizing the above principle is a spin-valve, giant-magnetoresistive device. A magnetoresistive device having resistance changing by sensing a magnetic field is usually used to detect an anisotropic magnetic field one-dimensionally. Paying attention to resistance change when the element is placed in a rotating magnetic field, the overall sensor system of the present invention is constituted. The present invention uses elements undergoing resistance change according to cos α or −cos α, wherein α is an angle between the magnetization direction of a pinned layer and the magnetization direction of a free layer, in a rotating magnetic field, or their pairs. Using an element outputting voltage in the form of cos α when DC voltage is applied, $R_{res}$ is output as shown in the formula (5), wherein δ represents a resistance change ratio.

$$R_{res} = \Delta R_{res} + R_{res0} = R_{res0}(1 + \delta\cos\alpha) \qquad (5), \text{and}$$

$$\Delta R_{res} = R_{res0}\delta\cos\alpha.$$

When a spin-valve, giant-magnetoresistive device is used, the magnetization direction of a pinned layer is determined by a production process and not changed by an external magnetic field. Because the magnetization direction of a free layer is aligned with the external magnetic field, the resistance change depends only on the direction of the external magnetic field, thereby enabling an operation not depending on the absolute value of the magnetic field. Because the spin-valve, giant-magnetoresistive device provides an output depending on an angle between a magnetic field direction and a magnetic-field-sensing direction, a one-period output is obtained per a one-period electrical angle. Thus, the absolute angle can be determined by arctangent calculation. Also, the magnetization of the free layer smoothly rotates depending on magnetic flux applied from the magnet rotor. It is thus suitable as an element used in the present invention. The arctangent calculation is to determine the value of $\theta_m$ meeting the relation of $\tan \theta_m = y/x$, from a first sinusoidal output signal x (for instance, a signal obtained from a sensor bridge A01), and a second sinusoidal output signal y (for instance, a signal obtained from a sensor bridge B01).

Figure 9A:
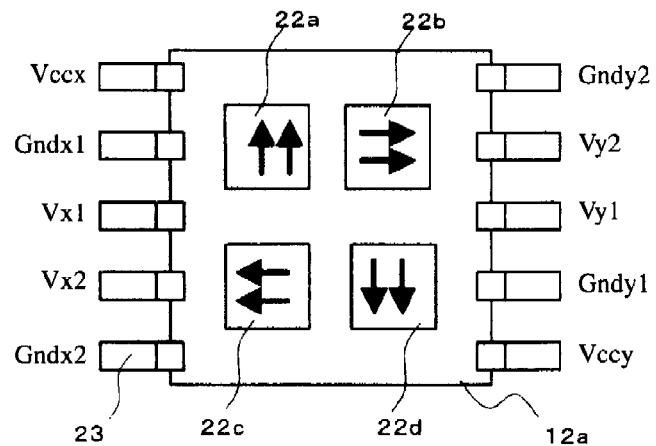
FIG. 9(a) is a schematic view showing the arrangement of elements in a sensor device used in the rotation-angle-detecting apparatus of Example 2.
Figure 9B:
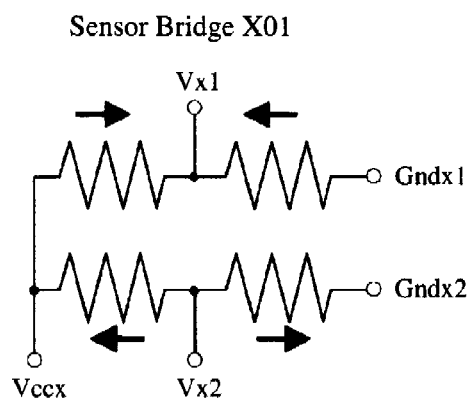
FIG. 9(b) is circuit diagram showing the connection of elements having pinned layers magnetized in X and −X directions to terminals in a bridge circuit in the sensor device of FIG. 9(a).
Figure 9C:
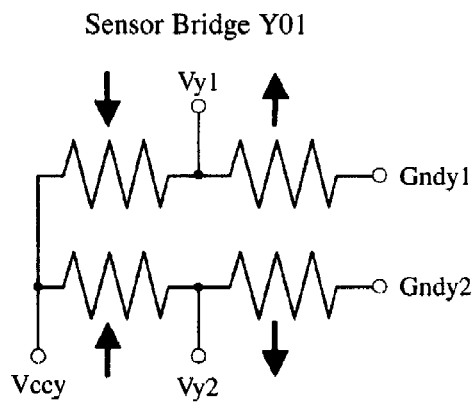
FIG. 9(c) is circuit diagram showing the connection of elements having pinned layers magnetized in Y and −Y directions to terminals in a bridge circuit in the sensor device of FIG. 9(a).
Figure 33A:
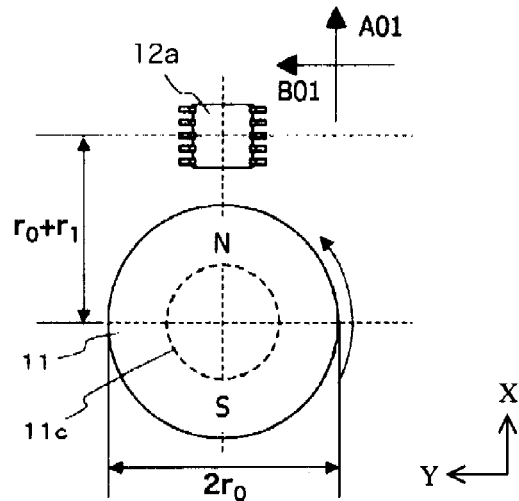
FIG. 33(*a*) is a schematic front view showing one example of the rotation-angle-detecting apparatuses of Example 5.
Figure 33B:
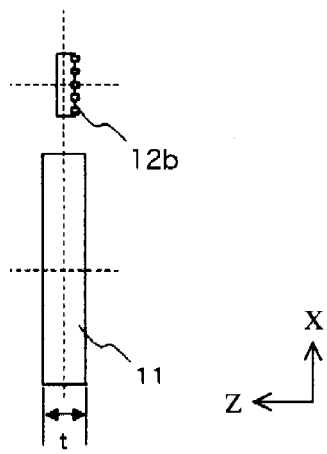

Although the above explanation is based on the assumption that $H_r$ and $H_\theta$ have the same amplitude, their amplitudes are not equal when the magnet rotor has a limited axial size (thickness). An angle calculation method with different amplitudes will be explained below. As shown in FIGS. 33(a) and 33(b), when a sensor device is located near a circumferential surface of a permanent magnet disposed at the origin, the optimum arrangement of the sensor device can be determined as follows. In a coordinate system (X, Y, Z) whose origin is located at the center of the magnet rotor, a sensor device 12a containing bridge-connected spin-valve, giant-magnetoresistive devices, whose pinned layers have parallel or antiparallel magnetization directions as shown in FIGS. 9(a) to 9(c), is arranged at a position $(X_s, Y_s, Z_s)$. $Y_s=0$, $X_s=r_0+r_1$, and $Z_s=0$, in FIGS. 33(a) and 33(b). The magnetization direction of a pinned layer in the sensor bridge A01 is in parallel with the X-axis, while the magnetization direction of a pinned layer in the sensor bridge B01 is in parallel with the Y-axis (tangent direction of the magnet rotation). Magnetic flux components $B_X$, $B_Y$ and $B_Z$ in X, Y and Z directions when the magnet rotor is rotated by $\theta_m$ are represented by the formulae (6-1), (6-2) and (6-3), wherein $\phi$ is a sensor arrangement angle between the X-Y plane and a line connecting the origin of the magnet to the center of the sensor device. The magnet rotor is approximated to one magnetic moment m.

$$B_X = [m/(4\pi R^3)] \cos \theta_m (2 \cos^2 \phi - \sin^2 \phi) \quad (6\text{-}1),$$

$$B_Y = [-m/(4\pi R^3)] \sin \theta_m \quad (6\text{-}2) \text{ and,}$$

$$B_Z = [m/(4\pi R^3)] \cos \theta_m (3 \cos \phi \cdot \sin \phi) \quad (6\text{-}3).$$

With $B_Y$ expressed by $B_{//}$, and the remaining components perpendicular to the Y-axis expressed by $B\perp$, the formulae (7-1) and (7-2) are obtained.

$$B_{//} = [-m/(4\pi R^3)] \sin \theta_m \quad (7\text{-}1)$$
$$= B_{//0} \sin \theta_m,$$
and
$$B_\perp = [m/(4\pi R^3)] \cos \theta_m [(2\cos^2 \varphi - \sin^2 \varphi) + (3\cos \varphi \cdot \sin \varphi)] \quad (7\text{-}2)$$
$$= B_{\perp 0} \cos \theta_m.$$

$B_{//0}$ is an amplitude of $B_{//}$, and $B\perp_0$ is an amplitude of $B\perp$. A space magnetic flux density amplitude ratio $K_0$, a ratio of these amplitudes, is represented by the formula (8):

$$K_0 = B\perp_0/B_{//0} \quad (8).$$

When $Z_s=0$, $B_Z=0$, so that both $B_{//}$ and $B\perp$ exist in the X-Y plane. When $Z_s \neq 0$, namely when a sensor device is placed at a certain sensor arrangement angle $\phi$ (except for 90°), the center of the sensor device receives a rotating magnetic field in a plane inclined by from the X-Y plane (called "$\epsilon$ plane"), which has a space magnetic flux density amplitude ratio $K_0$.

In the structure described in JP 2002-303536 A, in which a sensor substrate is opposing an end surface of a two-pole, disc-shaped magnet disposed at the end of a rotation shaft, the space magnetic flux density amplitude ratio $K_0$ is obtained by using $\phi=90°$ in the formula (7-1) and the formula (7-2), resulting in $K_0=1$. Accordingly, sensor bridges receive magnetic fluxes having the same amplitude and phase difference of 90°. As a result, the outputs of the sensor bridges have a sine or cosine waveform without deformation, thereby making an angle signal after the arctangent calculation free from error.

Figure 33C:
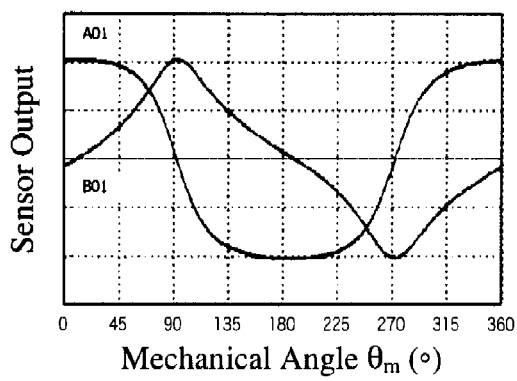
Figure 33D:
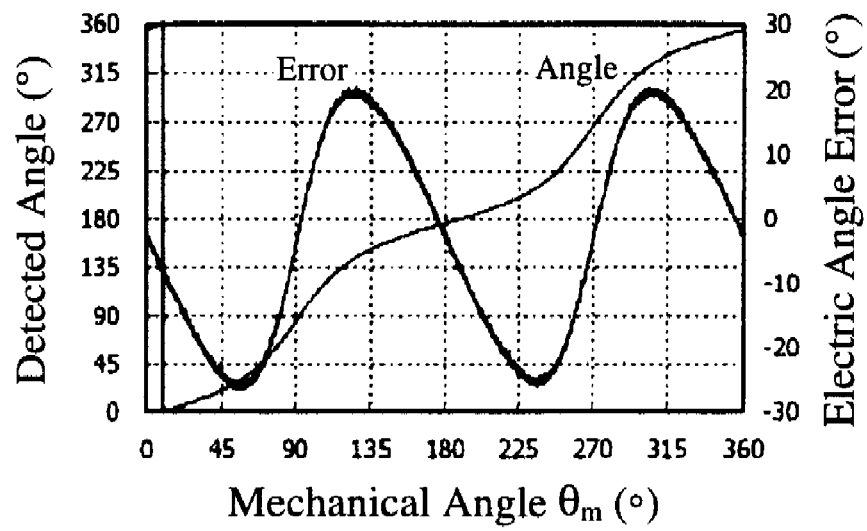

When $\phi=0°$ as shown in FIGS. 33(a) and 33(b), the sensor device receives magnetic flux having phase difference of 90° at a space magnetic flux density amplitude ratio $K_0=B\perp_0/B_{//0}=2$. Accordingly, a sensor output does not have a sine waveform, but the output of the sensor bridge A01 has a substantially trapezoidal waveform, and the output of the sensor bridge B01 has a substantially triangular waveform, as shown in FIG. 33(c). As a result, as extremely large error as ±20° is generated as shown in FIG. 33(d). When the sensor device is inclined by $\chi$ around the magnetization direction of the pinned layer in the sensor bridge B01, the spin-valve, giant-magnetoresistive device in the sensor device effectively receives a Y-direction magnetic flux density component $B_{//eff}$ and a magnetic flux density component $B\perp_{eff}$ perpendicular thereto at an effective magnetic flux density amplitude ratio $K_{eff}$, which are represented by the formulae (9-1), (9-2) and (9-3), wherein $B_{//eff0}$ is an amplitude of $B_{//eff}$, and $B\perp_{eff0}$ is an amplitude of $B\perp_{eff}$.

$$B\perp_{eff} = B\perp_0 \cos \theta_m \cdot \cos(\chi-\epsilon) = B\perp_{eff0} \cos \theta_m \quad (9\text{-}1),$$

$$B_{//eff} = B_{//eff0} \sin \theta_m = B_{//} \quad (9\text{-}2) \text{ and,}$$

$$K_{eff} = B\perp_{eff0}/B_{//eff0} = K_0 \cos(\chi-\epsilon) \quad (9\text{-}3).$$

The amplitude ratio of perpendicular effective magnetic flux density components $K_{eff} = B\perp_{eff0}/B_{//eff0}$ is preferably 1. Namely, the perpendicular effective magnetic flux densities preferably have the same amplitude. $K_{eff}$ is preferably 0.93-1.08, more preferably 0.96-1.04, ideally 1.0.

When the $\chi$ is the optimum sensor inclination angle $\chi_{best}$, which is obtained at $K_{eff}=1.0$ in the formula (9-3), no angle error is generated even when the magnetization direction of a pinned layer in the sensor device rotates on a magnetosensitive surface. This is due to the fact that if the magnetization directions of pinned layers in spin-valve, giant-magnetoresistive devices were perpendicular to each other to provide a pair of orthogonal sensor bridges as shown in FIGS. 9(a) to 9(c), the rotation of the magnetization direction of a pinned layer in a magnetosensitive surface would only cause the output phase of a sensor bridge to proceed or delay relative to $\theta_m$, exerting no influence on the amplitude and accuracy of the output. Thus, the spin-valve, giant-magnetoresistive device detects the direction of magnetic flux having three components Bx, By and Bz.

Although the magnet rotor is approximated to a magnetic moment m here, a flat, disc-shaped magnet which is thin in a rotation axis direction is actually used, resulting in a space magnetic flux density amplitude ratio $K_0$ changing depending on the demagnetization coefficient of the magnet rotor and the mounting position of the sensor device. However, when the distance between the sensor device and the magnet rotor surface is several mm, the magnet rotor can be approximated to a magnetic moment m.

As described above, in the case of a two-pole magnet, it is possible to determine by analysis approximated to a magnetic moment m the optimum sensor arrangement angle $\phi_{best}$ and the optimum sensor inclination angle $\chi_{best}$, at which the effective magnetic flux density amplitude ratio $K_{eff}$ is 1. When a magnetization pattern is complicated as in a multi-pole ring magnet, however, analysis using a magnetic moment m is difficult. In such a case, a rotation-angle-detecting apparatus with minimum angle error can be obtained by determining a space magnetic flux density amplitude ratio $K_0$ from a magnetic flux density component at any point by a magnetic field analysis such as a finite element method, and inclining a sensor device by $\chi$ from a X-Y plane such that an effective magnetic flux density amplitude ratio $K_{eff}$ is 1.

The sensor bridge used herein is an electric bridge circuit of four elements (spin-valve, giant-magnetoresistive devices). The sensor device comprises two sensor bridges. A structure in which a magnet rotor is opposing the sensor device is called "rotation-angle-detecting apparatus (unit)." A unit comprising pluralities of sensor devices that can be attached to the rotation-angle-detecting apparatus is called "module."

The present invention will be explained in more detail referring to Examples below without intention of restricting the present invention thereto.

EXAMPLE 1

Figure 1B:
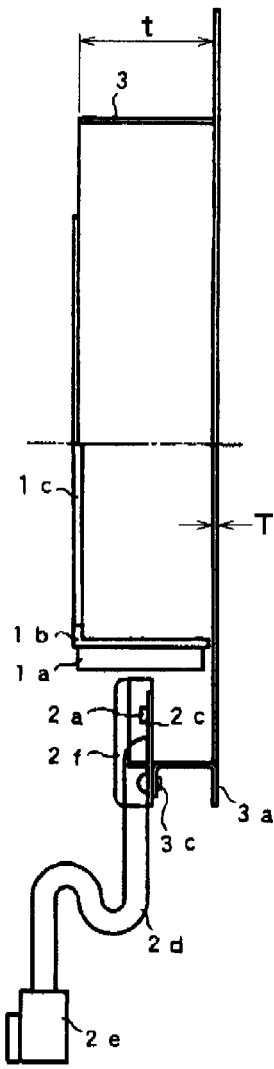
FIG. 1(b) is a schematic side view showing one example of the rotation-angle-detecting apparatuses of the present invention, a portion below the chain line being a partial cross-sectional view showing a magnet rotor.

As shown in FIGS. 1(a) and 1(b), the first rotation-angle-detecting apparatus of the present invention comprises a magnet rotor 1, a magnetic sensor means 2 arranged outside a periphery of the magnetic rotor, and a housing 3 supporting the magnetic sensor means 2. The magnet rotor 1 comprises a ring-shaped permanent magnet 1a having a periphery in a shape formed by connecting pluralities of arcs, a soft-magnetic ring 1b integrally formed on an inner surface of the ring-shaped permanent magnet, and a non-magnetic, ring-shaped adaptor 1c supporting the soft-magnetic ring. The magnetic sensor means 2 comprises a planar circuit board 2c having a concaved surface facing the magnet rotor 1, a pair of sensor devices 2a, 2b fixed onto the circuit board 2c, a cable 2d and a connector 2e for electrically connecting the sensor devices and the circuit board 2c to a control circuit, and a non-magnetic cover 2f sealing the sensor devices. Each sensor device 2a, 2b has two laminated, spin-valve, giant-magnetoresistive devices (not shown) to detect the rotation angle of the ring-shaped permanent magnet 1a. The housing 3 is provided with a U-shaped angle 3a and bolts 3c for fixing the circuit board 2c such that the sensor devices 2a, 2b are opposing the magnet rotor 1 with a predetermined gap. The details of the magnetic sensor means 2 will be explained later.

The housing 3 provided with the magnetic sensor means 2 was fixed to a cutting machine body with bolting holes 3b, and the magnet rotor 1 was concentrically fixed to a rotatable shaft of the cutting machine with bolting holes id. The cutting machine is omitted in FIGS. 1(a) and 1(b). As shown in FIG. 1(a), when the rotatable shaft of the cutting machine was rotated with the magnet rotor 1 opposing the magnetic sensor means 2, the rotation angle was detected with high accuracy.

Figure 2A:
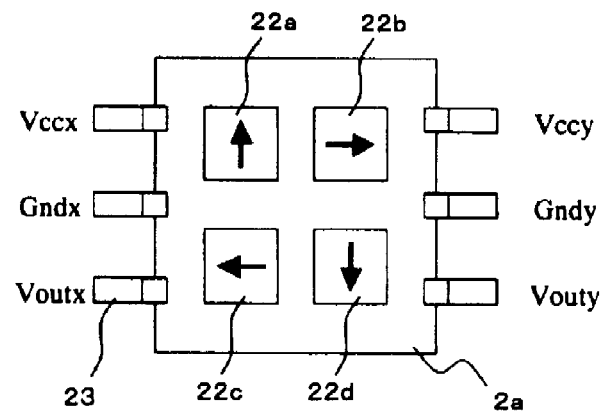
FIG. 2(a) is a schematic view showing the arrangement of sensor elements in a sensor device used in the rotation-angle-detecting apparatus of Example 1.
Figure 2B:
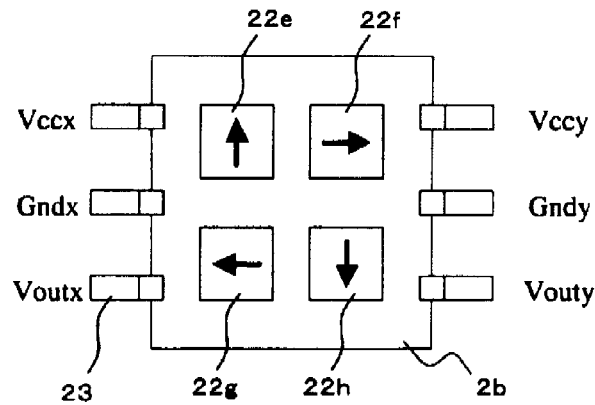
FIG. 2(b) is a schematic view showing the arrangement of sensor elements in another sensor device used in the rotation-angle-detecting apparatus of Example 1.

The magnet rotor 1 comprised a ring-shaped, molded, permanent magnet 1a made of NdFeB magnet powder and a binder, a molded, soft-magnetic ring 1b made of soft iron powder and a binder, and an S45C-made adaptor 1c for fixing the soft-magnetic ring to the rotatable shaft. The magnet rotor 1 was magnetized to have 12 poles (namely 6 pairs of poles) on the circumferential surface. A mechanical angle (an angle between a pair of poles) of 60° corresponds to an electrical angle of 360°. As shown in FIGS. 2(a) and 2(b), each sensor device 2a, 2b had four spin valve elements for constituting two half-bridge circuits, and six terminals 23 formed from a non-magnetic leadframe, and was molded with a resin material. The sensor devices 2a and 2b were fixed to the circuit board 2c such that they had a mechanical angle of 15° (electrical angle of 90°) relative to the rotation axis of the magnet rotor 1. The sensor devices 2a, 2b connected to the control circuit via the cable 2d with a connector 2e constituted a circuit shown in FIG. 3. The housing 3 and the U-shaped angle 3a were made of non-magnetic SUS316.

A circumscribed circle (shown by dotted line) of the magnet rotor 1 had a radius of 40 mm, a distance r between the circumscribed circle (shown by dotted line) of the magnet rotor 1 and a center of the sensor device was 3.5 mm, the magnet rotor 1 had a thickness t of 25 mm, and the housing 3 had a thickness T of 2 mm. The housing 3 was formed from a 2-mm-thick plate by punching and drawing. Even when the distance r increased to 10 mm, no problem occurred. Also, even when the magnet rotor 1 had a thickness t of 5 mm, no problem occurred.

Figure 2C:
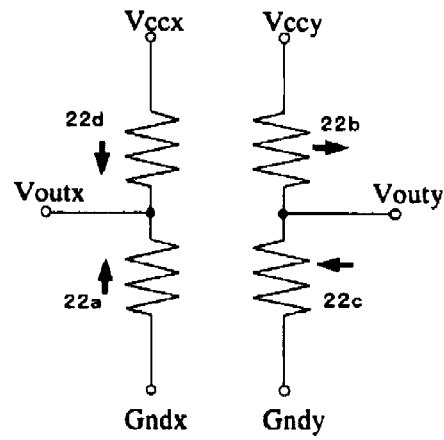
FIG. 2(c) is a circuit diagram showing the connection of sensor elements to terminals in the sensor device of FIG. 2(a).
Figure 2D:
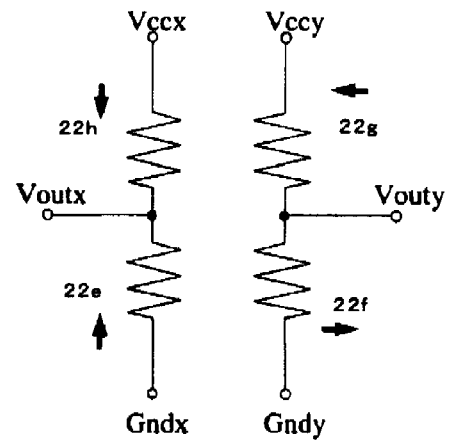
FIG. 2(d) is a circuit diagram showing the connection of sensor elements to terminals in the sensor device of FIG. 2(b).

As shown in FIGS. 2(a) and 2(b), each sensor device 2a, 2b comprises four spin-valve, giant-magnetoresistive devices 22a, 22b, 22c, 22d (22e, 22f, 22g, 22h) as sensor elements, and six terminals 23 formed from a leadframe in a molding. Each spin-valve, giant-magnetoresistive device is fixed such that the magnetization direction of a pinned layer is oriented along the depicted thick arrow. The thick arrow of each spin-valve, giant-magnetoresistive device 22a, 22e is oriented to a center of the magnet rotor. FIGS. 2(c) and 2(d) are views each showing a circuit in which four spin-valve, giant-magnetoresistive devices (depicted as electric resistors) are connected to terminals in each sensor device 2a, 2b. In the sensor device 2a, as shown in FIG. 2(c), constant voltage Vccx was applied to the series-connected, spin-valve, giant-magnetoresistive devices 22a and 22d to output Voutx from their connecting point, and constant voltage Vccy was applied to the series-connected, spin-valve, giant-magnetoresistive devices 22b and 22c to output Vouty from their connecting point. Gndx and Gndy are grounds (ground potential). The sensor device 2b was similarly constituted as shown in FIG. 2(d).

FIG. 3 schematically shows a circuit used in the rotation-angle-detecting apparatus. Four half-bridge circuits were parallel-connected, with their constant voltage terminals connected to Vcc and their ground terminals connected to Gnd. The spin-valve, giant-magnetoresistive devices 22a, 22b, 22c, 22d correspond to the sensor device 2a shown in FIG. 2(a), and the spin-valve, giant-magnetoresistive devices 22e, 22f, 22g, 22h correspond to the sensor device 2b shown in FIG. 2(b). Each thick arrow shows the magnetization direction of a pinned layer in each spin-valve, giant-magnetoresistive device. An output from a connecting point of the spin-valve, giant-magnetoresistive devices 22d, 22a and an output from a connecting point of the spin-valve, giant-magnetoresistive device 22g, 22f were amplified by a first operational amplifier, and an output from a connecting point of the spin-valve, giant-magnetoresistive devices 22h, 22e and an output from a connecting point of the spin-valve, giant-magnetoresistive devices 22b, 22c were amplified by a second operational amplifier. An output of the first operational amplifier and an output of the second operational amplifier were input to an A-D converter 27, both outputs from which were input to an angle calculator 28, which output a detection angle. As shown in FIGS. 1(a) and 1(b), because the sensor device 2a and the sensor device 2b are arranged at circumferentially different positions by an mechanical angle $\phi$, they have a phase difference of an electrical angle $\theta$ ($\phi$=15° and $\theta$=90° for 12 poles). While one sensor device receives a magnetic flux in a circumferential direction of the magnet rotor, the other sensor device receives magnetic flux with delay of $\theta$. Such multi-polar arrangement made $\phi$ smaller relative to $\theta$, so that the sensor devices were contained in a narrow region to make the apparatus smaller.

The above spin-valve, giant-magnetoresistive device detects an angle between a magnetic-field-sensing direction and the direction of a magnetic field at each position. A bridge structure in this Example is a combination of a spin-valve, giant-magnetoresistive device having a magnetic-field-sensing direction along the circumferential direction of the magnet rotor, and a spin-valve, giant-magnetoresistive device having a magnetic-field-sensing direction along the radial direction of the magnet rotor, which are arranged at positions separate from each other by 90° by electrical angle as described above. Accordingly, as compared with a bridge structure comprising spin-valve, giant-magnetoresistive devices arranged at the same position, the bridge structure of this Example provided output signals closer to an ideal sine waveform with their strains cancelled. The rotation-angle-detecting apparatus of Example 1 had rotation angle accuracy within ±5° by mechanical angle.

The maximum angle-detecting error expressed by a mechanical angle becomes smaller, as the number of magnetic poles increases. Taking for example a two-pole magnet rotor and a 12-pole magnet rotor with the same rotation angle error expressed by an electrical angle, the rotation angle error expressed by a mechanical angle of the latter is as small as 1/6 of that of the former. Accordingly, the use of a multi-pole magnet rotor can reduce a detection error.

Figure 4:
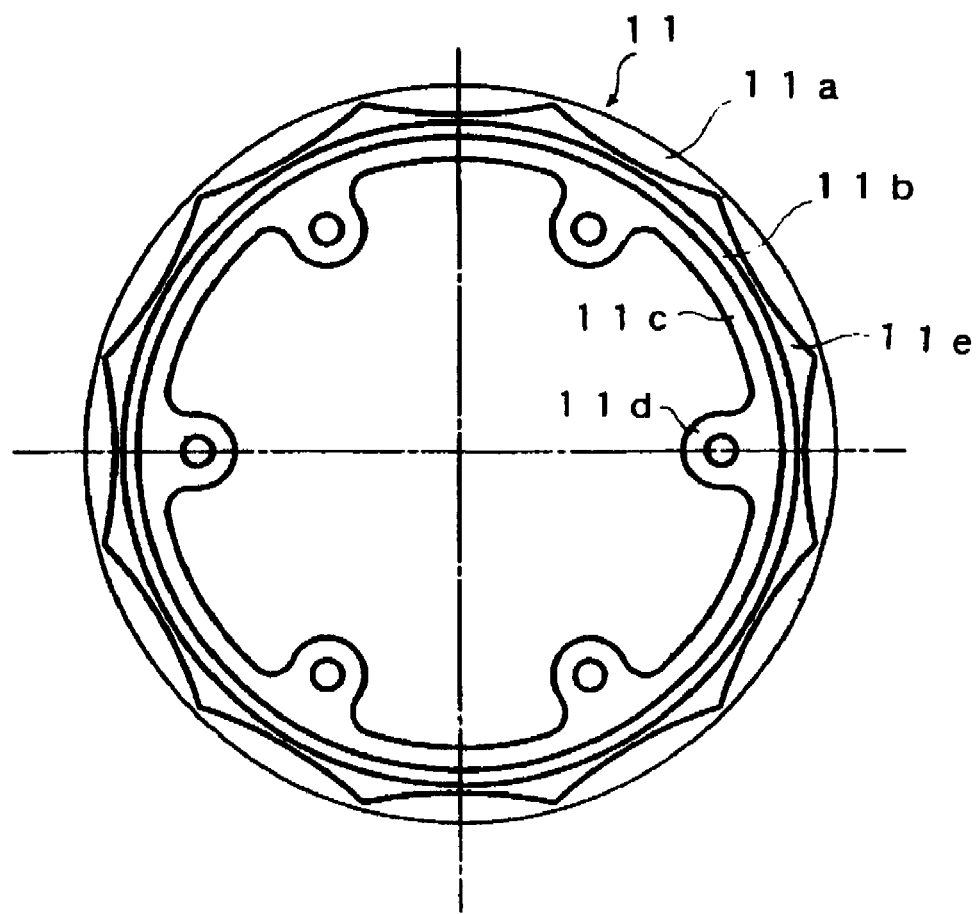
FIG. 4 is a schematic front view showing another example of magnet rotors used in the rotation-angle-detecting apparatus of the present invention.

FIG. 4 shows another example of magnet rotors used in the rotation-angle-detecting apparatus of the present invention. A magnet rotor 11 comprises ring-shaped permanent magnet 11a having a circular outer surface and an inner surface in a shape formed by connecting pluralities of arcs, a yoke 11e integrally formed on the inner surface of the ring-shaped permanent magnet 11a, a circular soft-magnetic ring 11b integrally formed on the inner surface of the yoke 11e, and a non-magnetic, ring-shaped adaptor 11c (having bolting holes 11d) for supporting the soft-magnetic ring 11b. With an inner surface bulging or projecting in a lens shape at each magnetic pole to have a thickness gradient, a magnetic flux density distribution on the circumferential surface of the magnet rotor 11 has a waveform close to an ideal sine wave. Because the rotation-angle-detecting apparatus of the present invention comprises magnetic sensors (a pair of closely arranged sensors) having bridges of spin-valve, giant-magnetoresistive devices at positions close to the magnet rotor, the rotation angle of the ring-shaped permanent magnet could be detected with high accuracy even if it had a shape shown in FIG. 4.

Figure 5:
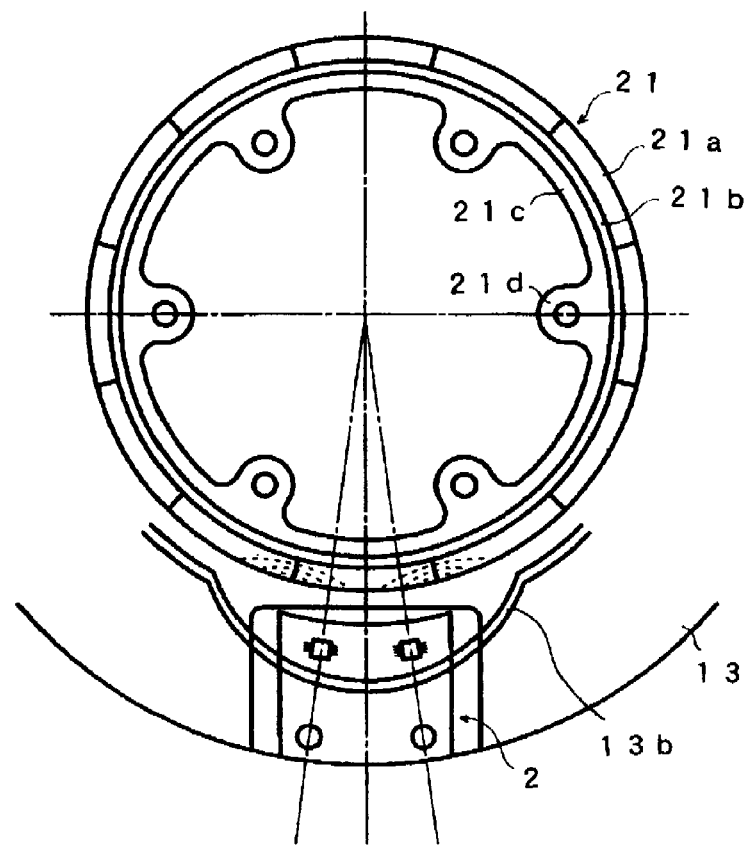
FIG. 5 is a schematic front view showing a further example of magnet rotors used in the rotation-angle-detecting apparatus of the present invention.

FIG. 5 shows a further example of magnet rotors used in the rotation-angle-detecting apparatus of the present invention. The magnet rotor 21 comprises pluralities of segment magnets 21a bonded onto a circumferential surface of a circular soft-magnetic ring 21b with an adhesive, and a non-magnetic, ring-shaped adaptor 21c (having bolting holes 21d) for supporting the soft-magnetic ring 21b. The magnetic sensor means 2 has the same structure as shown in FIGS. 1(a) and 1(b). However, a housing 13 (partially shown) has a smaller inner diameter in a region not close to the magnetic sensor means 2 than that of the housing 3 shown in FIGS. 1(a) and 1(b). A thin iron plate 13b (S45C) is fixed to an inner surface of the housing 13. The thin iron plate 13b prevents magnetic disturbance from outside, thereby reducing harmonics in a magnetic flux from the magnet rotor.

Figure 6:
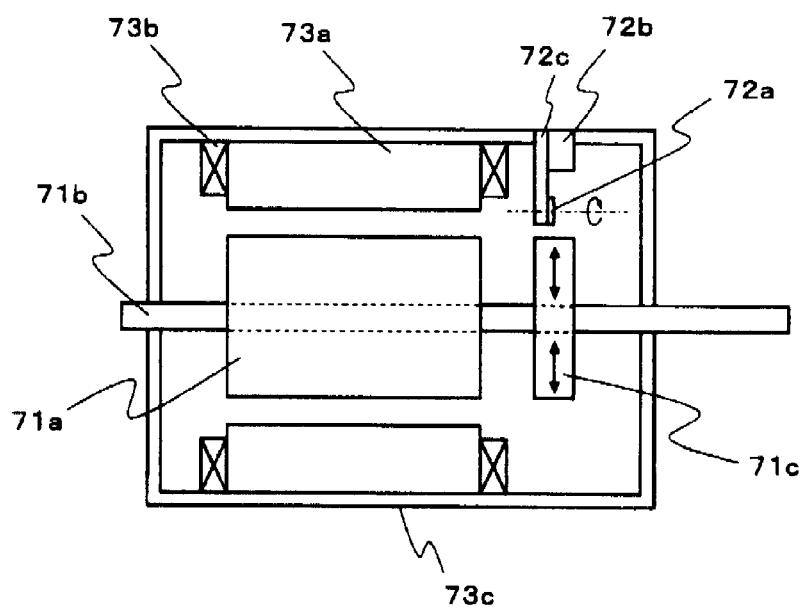
FIG. 6 is a schematic cross-sectional view showing one example of the rotating machines of the present invention.

The rotating machine of the present invention is shown in FIG. 6. This rotating machine is a motor comprising a permanent magnet rotor 71a having a center shaft 71b, and a stator 73a having a stator coil 73b and fixed to an inner surface of a frame 73c. The shaft 71b is rotatably supported by the frame 73c with a bearing (not shown). The magnet rotor 71c is mounted to the shaft 71b, and a sensor device 72a is mounted to a support 72c attached to the frame 73c. The rotating magnetic field of the magnet rotor 71c is detected by the sensor device 72a, whose output is treated by a calculation circuit 72b to output the rotation angle of the magnet rotor 71c. When the magnet rotor 71c rotates in this rotating machine, the magnetization direction of a free layer magnetically rotates in the spin-valve, giant-magnetoresistive device in the sensor device 72a. The electric shaft of the magnetization direction of the free layer is shown by a chain line in the figure.

The other rotating machines of the present invention are shown in FIGS. 7(a) to 7(d). These rotating machines are modifications of the rotating machine shown in FIG. 6. Reference numerals are omitted on the same members, and the same reference numerals show the same members. The rotating machine shown in FIG. 7(a) comprises a support 72f in place of the support 72c in the rotating machine shown in FIG. 6, to have a sensor device 72e mounted to an end surface of the support 72f. A magnet rotor 71c is opposing a plane in which the magnetization direction of the free layer in the spin-valve, giant-magnetoresistive device magnetically rotates. The rotating machine shown in FIG. 7(b) comprises a magnet rotor 71d provided with pluralities of poles in a direction parallel with the shaft 71b in place of the magnet rotor 71c, with a sensor device 72g mounted to a support 72h to detect a magnetic field on an end surface of a magnet rotor 71d, the output of the magnet rotor 71d being treated by a calculation circuit 72i to output the rotation angle of the magnet rotor. The rotating machine shown in FIG. 7(c) comprises a rotor 71e obtained by longitudinally elongating the permanent magnet rotor 71a in place of the magnet rotor 71c, with a sensor device 72j mounted to a support 72k to detect a magnetic field on a circumferential surface of the rotor 71e, the output of the sensor device 72j being treated by a calculation circuit 72i to output the rotation angle of the magnet rotor. The rotating machine shown in FIG. 7(d) comprises the rotor 71e shown in FIG. 7(c) in place of the rotor 71a and the magnet rotor 71c in FIG. 7(a).

Figure 7A:
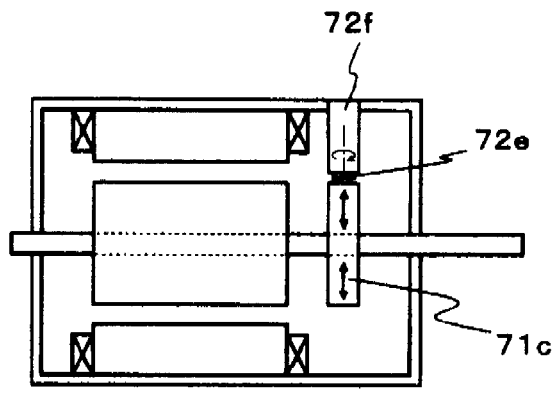
FIG. 7(a) is a schematic cross-sectional view showing another example of the rotating machines of the present invention.
Figure 7B:
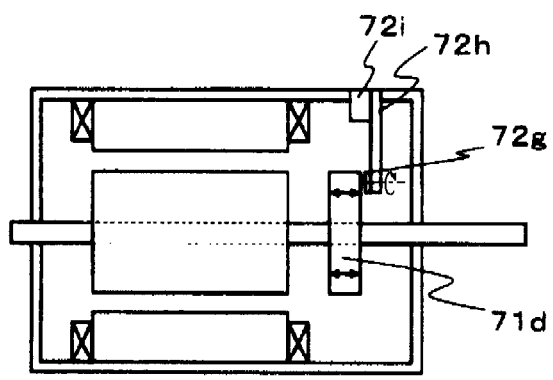
FIG. 7(b) is a schematic cross-sectional view showing a further example of the rotating machines of the present invention.
Figure 7C:
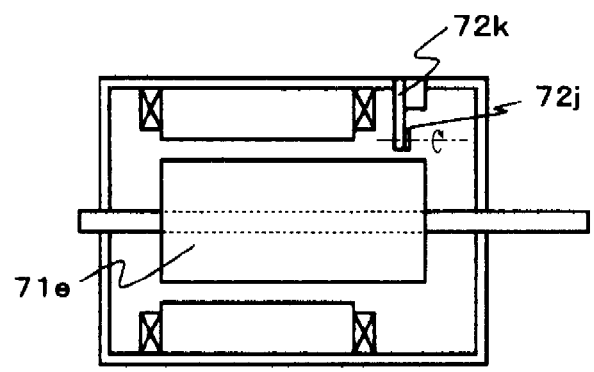
FIG. 7(c) is a schematic cross-sectional view showing a still further example of the rotating machines of the present invention.
Figure 7D:
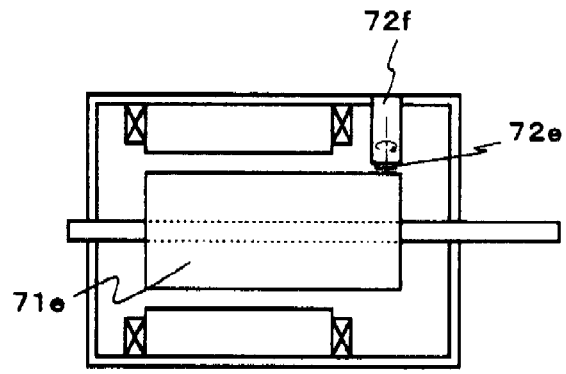
FIG. 7(d) is a schematic cross-sectional view showing a still further example of the rotating machines of the present invention.
Figure 8A:
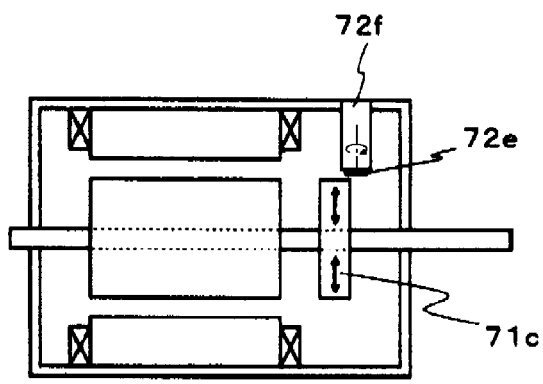
FIG. 8(a) is a schematic cross-sectional view showing a still further example of the rotating machines of the present invention.
Figure 8B:
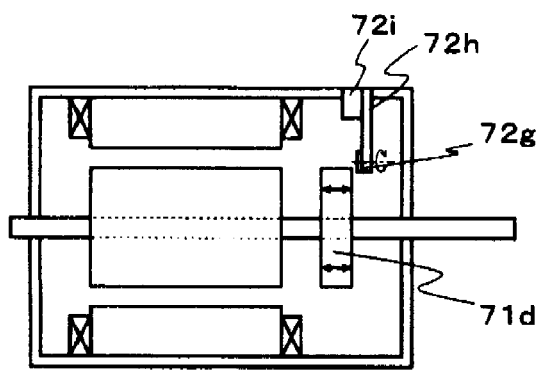
FIG. 8(b) is a schematic cross-sectional view showing a still further example of the rotating machines of the present invention.
Figure 8C:
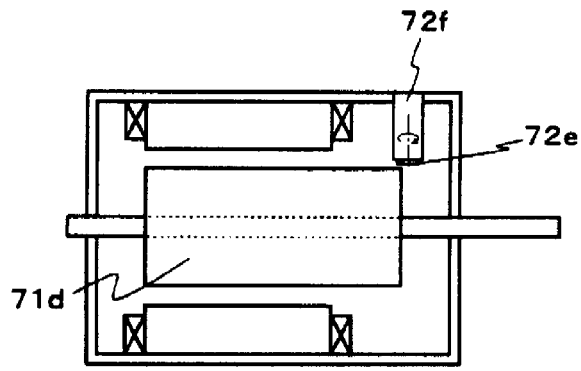
FIG. 8(c) is a schematic cross-sectional view showing a still further example of the rotating machines of the present invention.

FIGS. 8(a), 8(b) and 8(c) show still further examples of the rotating machines of the present invention, which are modifications of the rotating machines shown in FIGS. 7(a) to 7(d). In each rotating machine shown in FIGS. 7(a), 7(b) and 7(d), a magnetic field applied to the sensor device is not a rotating magnetic field even if the magnet rotor or the rotor is mechanically rotated, resulting in limited rotation in the magnetization direction of the free layer of the spin-valve, giant-magnetoresistive device. The magnetization direction is inclined from the chain line as a center, but its rotation is smaller than one turn. Thus, the length and position of a support in each rotating machine shown in FIGS. 7(a), 7(b) and 7(d) is changed as shown in FIGS. 8(a), 8(b) and 8(c). As a result, when the magnet rotor or the rotor mechanically rotates, a rotating magnetic field component perpendicular to the chain line is applied to the sensor device, so that the magnetization direction of the free layer in the spin-valve, giant-magnetoresistive device rotates.

Although the present invention is applied to the rotating machines in the above Example, it is also applicable to position-detecting apparatuses for detecting relative linear movement, such as those for linear motors.

EXAMPLE 2

The second rotation-angle-detecting apparatus of the present invention was produced like the first rotation-angle-detecting apparatus of Example 1, except that the sensor devices 2a, 2b shown in FIGS. 2(a) to 2(d) were changed to resin-molded sensor devices 12a, 12b comprising eight spin-valve, giant-magnetoresistive devices for constituting two full bridge circuits, and 10 terminals 23 formed from a non-magnetic leadframe as shown in FIGS. 9(a) to 9 (f). Even when the distance r shown in FIGS. 1(a) and 1(b) was increased to 10 mm, the apparatus could be used without any trouble. Even when the magnet rotor 1 had a thickness t of 5 mm, there was no trouble, either.

As shown in FIG. 9(a), one sensor device 12a comprises 8 spin-valve, giant-magnetoresistive devices, each of which has a pinned layer whose magnetization direction is oriented in an X, Y, −X, or −Y direction. A thick arrow in the figure represents a magnetization direction of the pinned layer in one element. Four pairs of elements were formed on a substrate, such that the pinned layers in each pair had the same magnetization direction. Among these eight elements, elements having pinned layers magnetized in X and −X directions were connected as shown in FIG. 9(b) to constitute a sensor bridge X01. Similarly, elements having pinned layers magnetized in Y and −Y directions were connected as shown in FIG. 9(c) to constitute a sensor bridge Y01. The X direction and the −X direction are in an antiparallel relation, the Y direction and the −Y direction are in an antiparallel relation, and the X and −X directions are perpendicular to the Y and −Y directions.

Figure 9D:
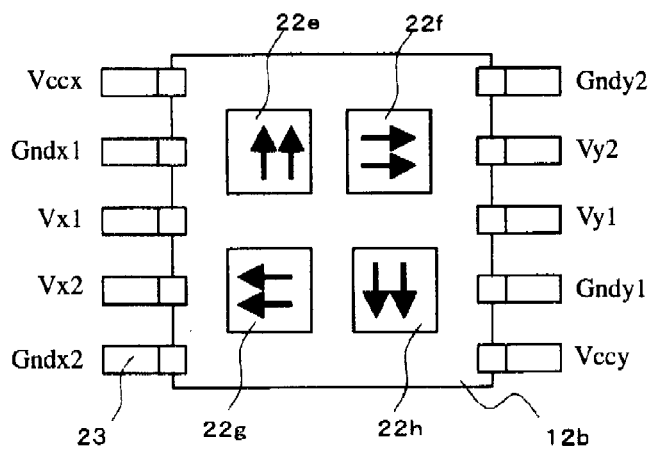
FIG. 9(d) is a schematic view showing the arrangement of elements in another sensor device used in the rotation-angle-detecting apparatus of Example 2.
Figure 9E:
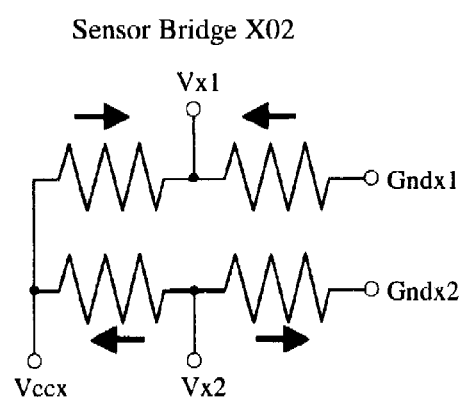
FIG. 9(e) is circuit diagram showing the connection of elements having pinned layers magnetized in X and −X directions to terminals in a bridge circuit in the sensor device of FIG. 9(d).
Figure 9F:
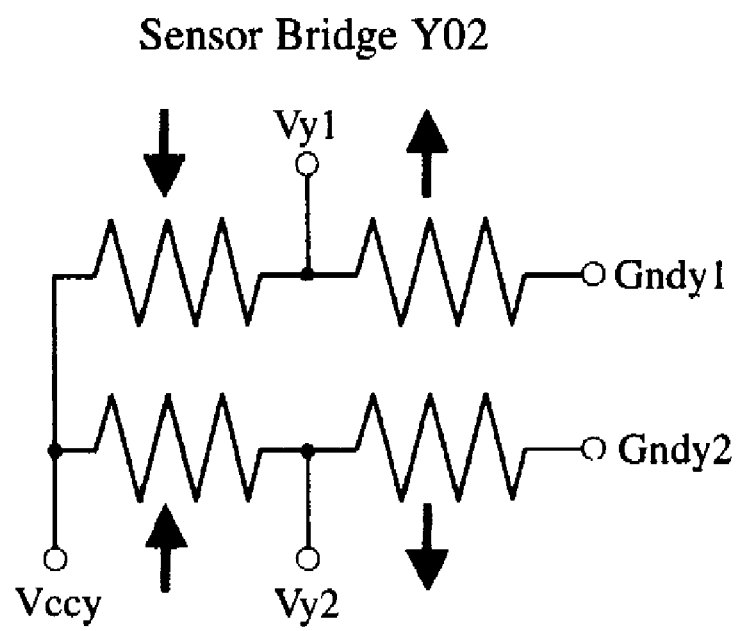
FIG. 9(f) is circuit diagram showing the connection of elements having pinned layers magnetized in Y and −Y directions to terminals in a bridge circuit in the sensor device of FIG. 9(d).

As shown in FIG. 9(d), another sensor device 12b also contains 8 spin-valve, giant-magnetoresistive devices having pinned layers each magnetized in an X, Y, −X, or −Y direction. The elements having pinned layers magnetized in X and −X directions were connected as shown in FIG. 9(e) to constitute a sensor bridge X02, and the elements having pinned layers magnetized in Y and −Y directions were connected as shown in FIG. 9(f) to constitute a sensor bridge Y02. The sensor devices were arranged in the rotation-angle-detecting apparatus, such that the pinned layers in the sensor bridge X01 had a magnetization direction along the radius of the magnet rotor, that the pinned layers in the sensor bridge Y01 had a magnetization direction along the circumference (rotation direction) of the magnet rotor, that the pinned layers in the sensor bridge X02 had a magnetization direction along the radius of the magnet rotor, and that the pinned layers in the sensor bridge Y02 had a magnetization direction along the rotational direction of the magnet rotor.

The two spin-valve, giant-magnetoresistive devices 22a, 22b, 22c and 22d shown in FIG. 9(a) were connected as shown in FIGS. 9(b) and 9(c) and connected to 10 terminals 23 formed from a leadframe, and integrally resin-molded to form a sensor device 12a. The spin-valve, giant-magnetoresistive devices 22a and 22d were arranged such that their thick arrows were in radial directions of the magnet rotor in FIGS. 1(a) and 1(b). In the bridge circuit shown in FIG. 9(b), a constant DC voltage Vccx is applied to output Vx1 and Vx2 from the connecting points. Gndx1, Gndx2, Gndy1 and Gndy2 are grounds (ground potential). Although FIG. 9(a) uses four pairs of elements formed on separate substrates, each pair having pinned layers with the same magnetization direction, 8 elements may be formed on one substrate, or 8 elements each formed on a substrate may be used. Each element cut out of a wafer having pinned layers magnetized in the same direction may be arranged as shown in FIG. 9(a), and connected to constitute a bridge. Using spin-valve, giant-magnetoresistive devices with a self-pin structure, the magnetization directions of pinned layers in the element can be determined.

Because each sensor device contains two sensor bridges with pinned layers having magnetization directions perpendicular to each other, and because each element is formed by lithography or by a machine having ultra-high positioning accurate, the magnetization directions of pinned layers in the sensor bridges can be set with higher accuracy than when the sensor bridges are mounted on a printed circuit board, etc. With the magnetization directions of pinned layers perpendicular to each other, the rotation angle can be detected with high accuracy. Using the first and second sensor devices having the same specification, mounting errors that would occur when sensor devices having different specifications are used can be avoided. The sensor devices having the same specification mean those produced under the same conditions. For instance, when elements are produced by a wafer process, even elements formed on wafers in different lots may be regarded as having the same specification as long as their production conditions are the same.

Figure 10:
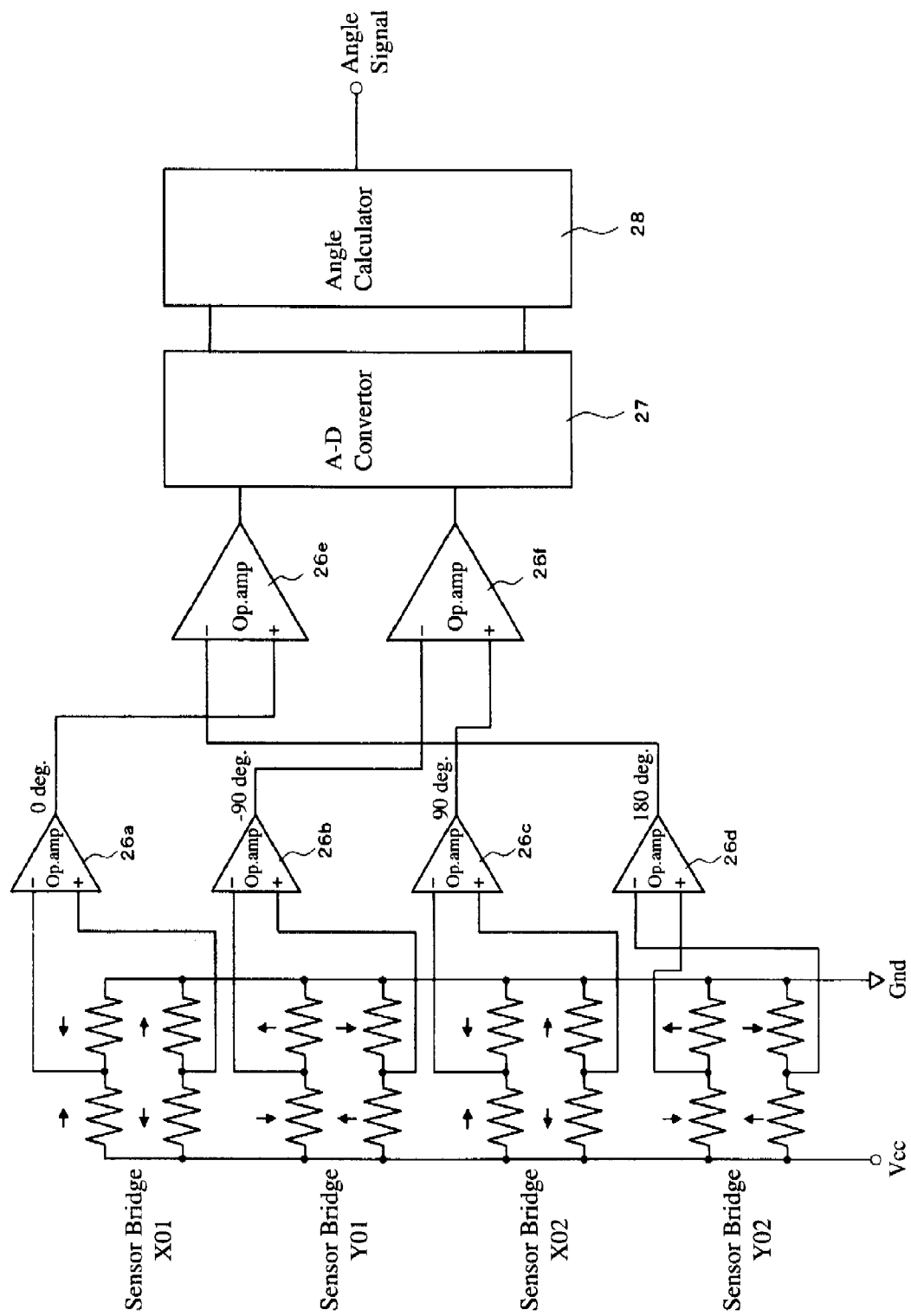
FIG. 10 is a view showing a further example of circuits used in the rotation-angle-detecting apparatus of Example 2.

When each sensor device having two bridge circuits as shown in FIGS. 9(a) to 9(f) is placed in a magnetic field from the magnet rotor, and when DC voltage is applied between Vcc and Gnd of the sensor device, a differential output can be obtained between Vx1 and Vx2, and between Vy1 and Vy2. Differential outputs from four sensor bridges X01, Y01, X02 and Y02 are amplified by differential amplifiers (operational amplifiers 26a, 26b, 26c, 26d, 26e, 26f) as shown in FIG. 10. A first rotation angle signal obtained from the amplified differential outputs from X01 and Y02, and a second rotation angle signal obtained from the amplified differential outputs from Y01 and X02 are converted from analog to digital by an A-D converter 27, and sent to an angle calculator 28, in which angle calculation is conducted to output a signal (angle signal) corresponding to an electrical angle. In this case, the first rotation angle signal and the second rotation angle signal have a phase difference of 90°. Accordingly, when the first rotation angle signal is a cosine signal, the second rotation angle signal can be regarded as a sine signal. The calculation of arctangent ($\tan^{-1}$) from these signals thus provides an angle signal in a range from 0° to 360°.

Figure 11A:
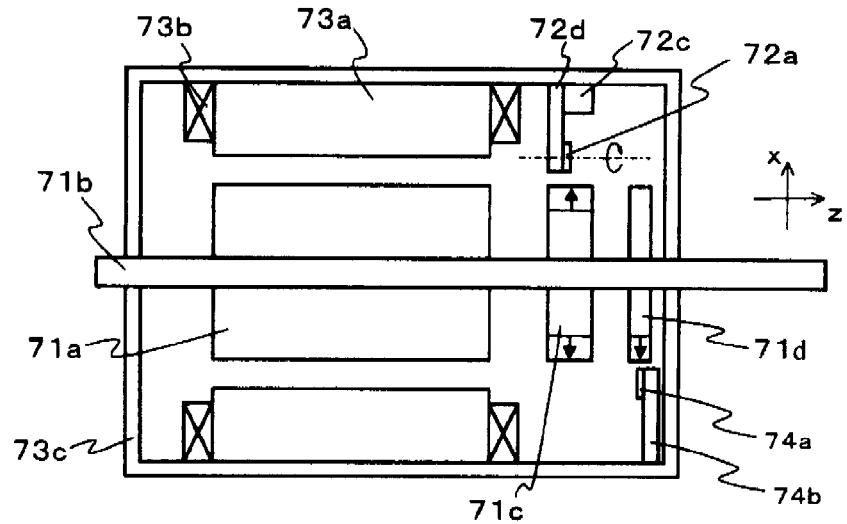
FIG. 11(a) is a schematic cross-sectional view showing the rotating machine of the present invention in Example 2.
Figure 11B:
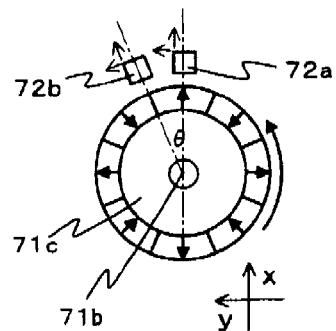
FIG. 11(b) is a partial enlarged view showing a rotation-angle-detecting apparatus in the rotating machine of the present invention in Example 2.
Figure 11C:
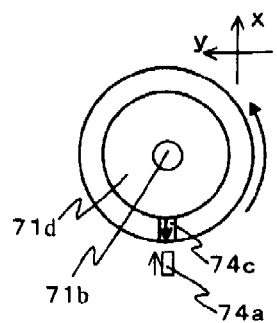
FIG. 11(c) is a partial enlarged view showing another rotation-angle-detecting apparatus in the rotating machine of the present invention in Example 2.

FIG. 11(a) shows a rotating machine comprising the rotation-angle-detecting apparatus of the present invention. This rotating machine is a motor comprising a frame 73c, a permanent magnet rotor 71a having a center shaft 71b, and a stator 73a having a stator coil 73b and fixed to an inner surface of the frame 73c. The shaft 71b is rotatably supported by the frame 73c via a bearing (not shown). A magnet rotor 71c and a magnet rotor 71d are fixed to the shaft 71b adjacently to the rotor 71a. Sensor devices 72a, 72b are attached to a support 72d fixed to the frame 73c. The direction of a magnetic flux from the magnet rotor 71c was detected by the sensor devices 72a, 72b as shown in FIG. 11(b), and its output was treated by a calculation circuit 72c to output the rotation angle of the magnet rotor 71c. Also supplied to the calculation circuit 72c was a Z signal obtained by detecting a magnet 74c disposed in the magnet rotor 71d shown in FIG. 11(c) with a sensor device 74a supported by a support 74b, which comprised only a sensor bridge X01 shown in FIG. 9(b) in the sensor device 12a shown in FIG. 9(a). The Z signal was used by the calculation circuit as a signal representing the one-rotation period of the magnet rotor. When the magnet rotor 71c rotated in this rotating machine, the magnetization direction of the free layer in each spin-valve, giant-magnetoresistive device in the sensor devices 72a, 72b magnetically rotated. The magnetic rotation axis of the magnetization direction of the free layer is shown by a chain line in the figure.

EXAMPLE 3

Figure 12A:
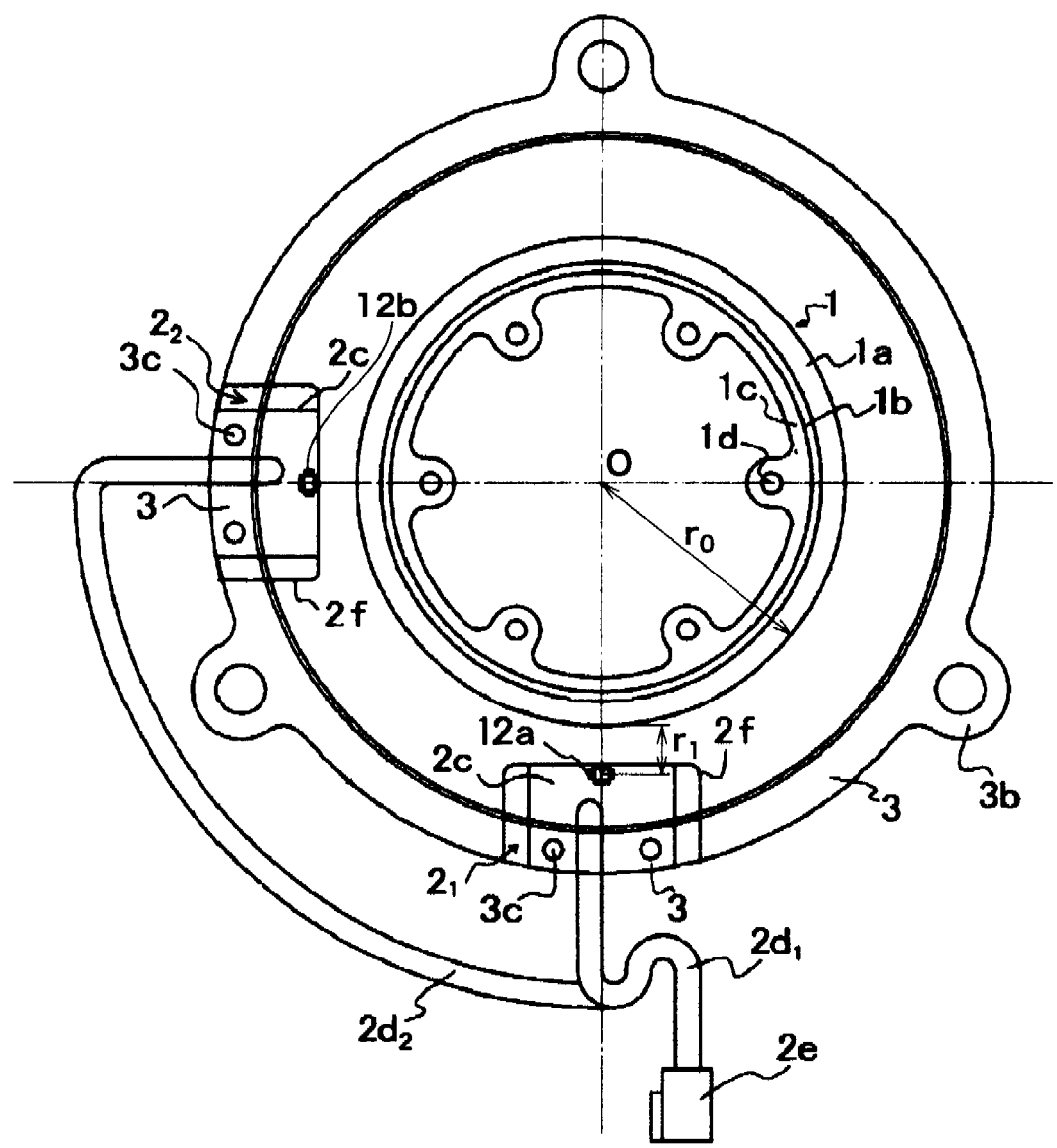
FIG. 12(a) is a schematic front view showing the rotation-angle-detecting apparatus of Example 3.
Figure 12B:
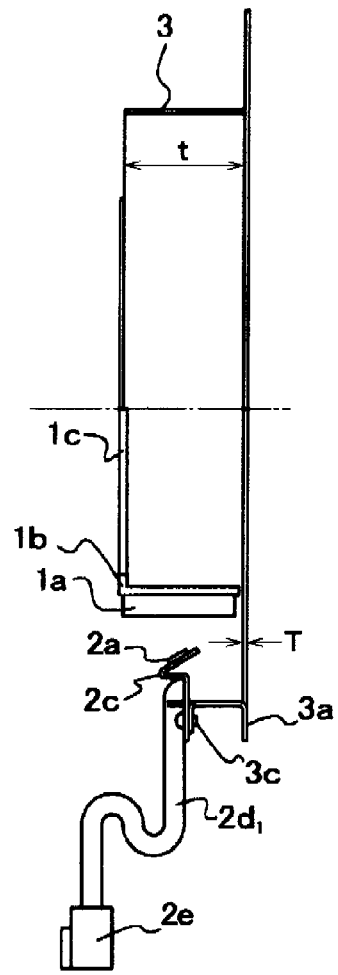
FIG. 12(b) is a schematic side view showing the rotation-angle-detecting apparatus of Example 3, a portion below the chain line being a partial cross-sectional view showing a magnet rotor.

FIGS. 12(a) and 12(b) show another example of the rotation-angle-detecting apparatuses of the present invention comprising a magnet rotor 1 having two magnetic poles on the circumferential surface, and a housing 3 to which a magnetic sensor means $2_1$ supporting a sensor device 12a and a magnetic sensor means $2_2$ supporting a sensor device 12b are fixed. A point O represents a rotation axis of the magnet rotor 1. The two sensor devices 12a, 12b are 90° separate from each other. With the sensor devices 12a, 12b each having two spin-valve, giant-magnetoresistive devices whose pinned layers have magnetization directions perpendicular to each other, the rotation angle of a ring-shaped permanent magnet 1a on the magnet rotor 1 can be detected.

The magnet rotor 1 comprises the ring-shaped permanent magnet 1a, a soft-magnetic ring 1b integrally formed on an inner surface of the ring-shaped permanent magnet, and a non-magnetic, ring-shaped adaptor 1c supporting the soft-magnetic ring. The magnetic sensor means $2_1$ comprises a planar circuit board 2c having a side surface facing the magnet rotor 1, a sensor device 12a fixed to a surface of the circuit board 2c, a cable $2d_1$ and a connector 2e for electrically connecting the sensor device and the circuit board 2c to a control circuit, and a non-magnetic cover 2f sealing the sensor device. The magnetic sensor means $2_2$ has the same circuit board structure as that of the magnetic sensor means $2_1$ (a cable $2d_2$ is connected to the connector 2e). As shown in FIG. 12 (b), the housing 3 comprises U-shaped angles 3a and bolts 3c for fixing the circuit boards 2c such that the sensor devices 12a, 12b oppose the magnet rotor 1 with a predetermined gap. The surface of the circuit board 2c to which each sensor device is fixed is inclined from a plane perpendicular to the rotation axis of the magnet rotor. The details of the sensor devices, etc. will be explained below.

The rotation-angle-detecting apparatus shown in FIGS. 12(a) and 12(b) was used, with the housing 3 supporting the magnetic sensor means $2_1$ and $2_2$ fixed to a cutting machine body with bolting holes 3b, and the magnet rotor 1 concentrically fixed to the rotatable shaft of the cutting machine with bolting holes 1d. The cutting machine is omitted in FIGS. 12(a) and 12(b). When the rotatable shaft of the cutting machine was rotated with the magnetic sensor means $2_1$ and $2_2$ opposing the magnet rotor 1 as shown in FIG. 12(a), the rotation angle was detected with high accuracy.

The magnet rotor 1 comprised a ring-shaped permanent magnet 1a formed by a sintered, permanent NdFeB magnet, a molded, soft-magnetic ring 1b made of soft iron powder and a binder, and an S45C-made adaptor 1c for attaching the soft-magnetic ring to the rotatable shaft. The sensor devices 12a, 12b were the same as those shown in FIGS. 9(a) to 9(f), which were used in Example 2. The circuit board 2c of each sensor device 12a, 12b was fixed to the housing 3, such that an angle between the sensor device 12a and the sensor device 12b relative to the rotation center O of the magnet rotor 1 was 90°. The sensor devices 12a, 12b connected to the cables $2d_1$, $2d_2$ and the connector 2e constituted the circuit shown in FIG. 10. The housing 3 and the U-shaped angles 3a were made of non-magnetic SUS316.

The magnet rotor 1 had a radius $r_0$ of 40 mm, a distance $r_1$ from the circumferential surface of the magnet rotor 1 to the center of the sensor device was 3.5 mm, the magnet rotor 1 had a thickness t of 25 mm, and the housing 3 had a thickness T of 2 mm (formed from a 2-mm-thick plate by punching and drawing). These sizes were those of the magnet per se. Even when the distance $r_1$ was increased to 10 mm, the apparatus could be used without trouble. Also, even when the magnet rotor 1 had a thickness t of 5 mm, the apparatus could be used without trouble.

Figure 13:
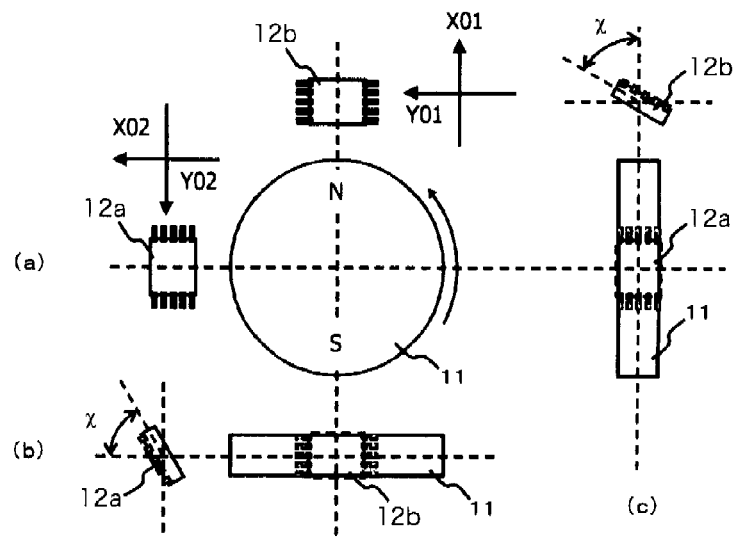
FIG. 13 is a schematic view showing one example of the rotation-angle-detecting apparatuses of Example 3.

FIG. 13 shows an example in which the ring-shaped permanent magnet 1 in FIGS. 12(a) and 12(b) was replaced by a two-pole, disc-shaped magnet 11. FIG. 13 schematically shows only the positional relations of parts. Sensor devices 12a, 12b were arranged around the disc-shaped magnet 11 with a 90° interval. A substrate surface of the sensor device 12a was inclined by an angle χ from a plane perpendicular to the center axis of the disc-shaped magnet. FIG. 13(b) is a side view showing the disc-shaped magnet and the sensor devices in a direction perpendicular to the center axis. In this figure, the sensor device 12b positioned on the rear side of the disc-shaped magnet is shown by a dotted line. FIG. 13(c) is a side view showing the apparatus in a direction 90° different from that in FIG. 13(b). In this figure, the sensor device 12a positioned on the rear side of the disc-shaped magnet 11 is shown by a dotted line. An arrow X01 represents the magnetization direction of a pinned layer in one sensor bridge in the sensor device 12b, and an arrow Y01 represents the magnetization direction of a pinned layer in the other sensor bridge in the sensor device 12b. An arrow X02 represents the magnetization direction of a pinned layer in one sensor bridge in the sensor device 12a, and an arrow Y02 represents the magnetization direction of a pinned layer in the other sensor bridge in the sensor device 12a. Because the disc-shaped magnet 11 (bonded NdFeB magnet diametrically having two magnetic poles) does not have a through-hole for a rotatable shaft, a support fixed to the disc-shaped magnet 11 is attached to an end of a rotatable shaft to use the apparatus as a rotation-angle-detecting apparatus. Although the rotation axis is likely to deviate because of no shaft in the case of FIG. 13, the arrangement of pluralities of sensor devices suppressed angle error due to the rotation axis deviation. The inclination of the sensor devices 12a, 12b by an angle X further reduced an angle-detecting error.

In this Example, the sensor device 12a, 12b to 9(c) were the same as used in Example 2. The magnetization direction of a pinned layer in the sensor bridge Y01 was along the rotational direction of the magnet rotor. The sensor bridge X01 was inclined by 60° with one axis of the magnetization direction of the pinned layer in the sensor bridge Y01 as a rotation axis. The magnetization direction of a pinned layer in the sensor bridge Y02 was along the rotational direction of the magnet rotor. The sensor bridge X02 was inclined by 60° with one axis of the magnetization direction of the pinned layer in the sensor bridge Y02 as a rotation axis. Namely, the inclination angle χ was 60°. In this case, a center of a substrate surface of the sensor device was positioned on a plane extending through a middle of the thickness of the magnet rotor perpendicularly to its rotation axis.

Inversion of Signal Y02

Figure 14:
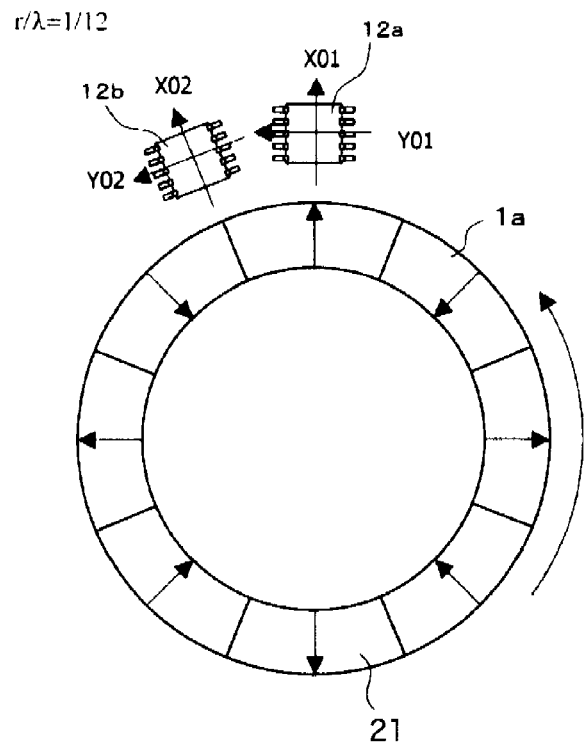
FIG. 14 is a schematic view showing a further example of the rotation-angle-detecting apparatuses of Example 3.

FIG. 14 schematically shows only a magnet rotor 21 and sensor devices 12a, 12b in a rotation-angle-detecting apparatus. A fundamental wave output of a sensor bridge X01 contained in the sensor devices 12a, 12b is expressed as $\cos \theta_{e1}$, wherein $\theta_{e1}$ is an electrical angle, as shown in the formula (10). Arrows near X01 represent the magnetization directions of pinned layers in the sensor bridge X01.

$$X01 = \cos \theta_{e1} \quad (10).$$

The other outputs, fundamental wave outputs from Y01, X02 and Y02, are expressed by the formulae (11-1) to (11-3) using an electrical angle $\theta_{e1}$.

$$Y01 = -\sin \theta_{e1} = \cos(\theta_{e1} + 90°) \quad (11\text{-}1),$$

$$X02 = \sin \theta_{e1} = \cos(\theta_{e1} - 90°) \quad (11\text{-}2), \text{ and}$$

$$Y02 = \cos \theta_{e1} \quad (11\text{-}3).$$

As shown in FIG. 10, these four output signals are amplified by differential amplifiers (operational amplifiers in this Example), and synthesized to two signals (sine and cosine signals) by downstream differential amplifiers (operational amplifiers), thereby obtaining signals with little harmonics.

Because a signal from the sensor bridge X01 and a signal from the sensor bridge Y02 (simply called "signal Y02") have the same phase, their differential amplification cancels their fundamental waves. Accordingly, the signal Y02 should be inverted by some means. The inverted signal Y02' is expressed by the formula (12).

$$Y02' = -\cos\theta_{ef} = \cos(\theta_{ef} + 180°) \qquad (12).$$

Method of Inverting Signal Y02

As shown in FIG. 10, the wiring of the output of the sensor bridge Y02 to the input of the first-stage differential amplifier was made opposite in polarity relative to the other bridges to invert the signal Y02. The inversion of the output of the sensor bridge Y02 can, of course, be conducted by other methods than shown in FIG. 10.

Importance of 2-Device, 4-Bridge Structure

As described above, to obtain a signal of a rotation angle by arctangent calculation, a sine signal and a cosine signal are necessary. Because the outputs of the sensor bridges X01 and Y01 are a cosine signal and a sine signal, only these two sensor bridges can provide a rotation angle output. However, as shown by the above formula (3), magnetic flux from the magnet rotor is not necessarily composed only of a fundamental wave, but contains harmonics. Also, when the sensor device does not have an inclination angle $\chi$ and an axis shift z, magnetic flux density in a radial direction is different from that in a rotational direction at the position of the sensor device as shown in the formulae (9-1) to (9-3), resulting in an output signal containing harmonics. Specifically, when measured near the magnet rotor, the output of a sensor device having a pinned layer with a magnetization direction along the radial direction has a trapezoidal waveform (trapezoidally deformed, sinusoidal waveform), and the output of a sensor device having a pinned layer with a magnetization direction along the rotational direction has a triangular waveform (triangularly deformed, sinusoidal waveform), with the rotation angle of the magnet rotor in an abscissa and the output of the sensor device in an ordinate. The addition of the outputs of the sensor bridges X02 and Y02 can enhance a fundamental wave while canceling harmonics. Such signal treatment can reduce angle signal errors.

When $\chi$ is 60° or −60°, a magnetic field Hx in the magnetization direction of a pinned layer in the sensor bridge X01, and a magnetic field Hy in the magnetization direction of a pinned layer in the sensor bridge Y01 are represented by the formulae (13-1) and (13-2).

$$H_x = [m/(4\pi\mu_0 R^3)] \cos\theta_m \qquad (13\text{-}1) \text{ and,}$$

$$H_y = [m/(4\pi\mu_0 R^3)] \sin \qquad (13\text{-}2).$$

The formula (9) indicates that the sensor device effectively receives magnetic fields having 90°-phase difference and the same amplitude. In this case, outputs from the sensor bridges are represented by the formulae (14-1) and (14-2).

$$V_{X01} = (\Delta R_{res}/R_{res0})\cos\theta_m \cdot V_{dc} \qquad (14\text{-}1), \text{ and}$$

$$V_{Y01} = (\Delta R_{res}/R_{res0})\sin\theta_m \cdot V_{dc} \qquad (14\text{-}2).$$

The arctangent of a ratio of these outputs provides a detected angle represented by the formula (15).

$$\text{Detected angle} = \arctan(V_{Y01}/V_{X01}) \qquad (15)$$
$$= \arctan(\sin\theta_m/\cos\theta_m)$$
$$= \theta_m.$$

With two sensor devices having perpendicular axes detecting the same magnetic field in the present invention, the angle of the magnet rotor can be detected accurately. Although the rotating magnet is regarded as a magnetic moment m here, actual magnets frequently used are flat disc magnets, which are thin in their rotation axis directions. In such a case, the flatter the disc magnet, the smaller a ratio of $|H\theta|/|Hr|$. This ratio is expressed by a function of a demagnetization coefficient. This ratio also depends on the distance. Although the inclination angle $\chi$ is used above to achieve $|Hr|=|H\theta|$, the same result can be obtained even by shifting the sensor device along a straight line passing the origin and a point (R, 0, π/2), namely, along the Z-axis direction of the rotating magnet. This is because axial shift changes an angle between the direction of magnetic flux and the rotation axis. This shift is called "axis shift z."

Values Measured by Two Sensor Devices

Figure 15A:
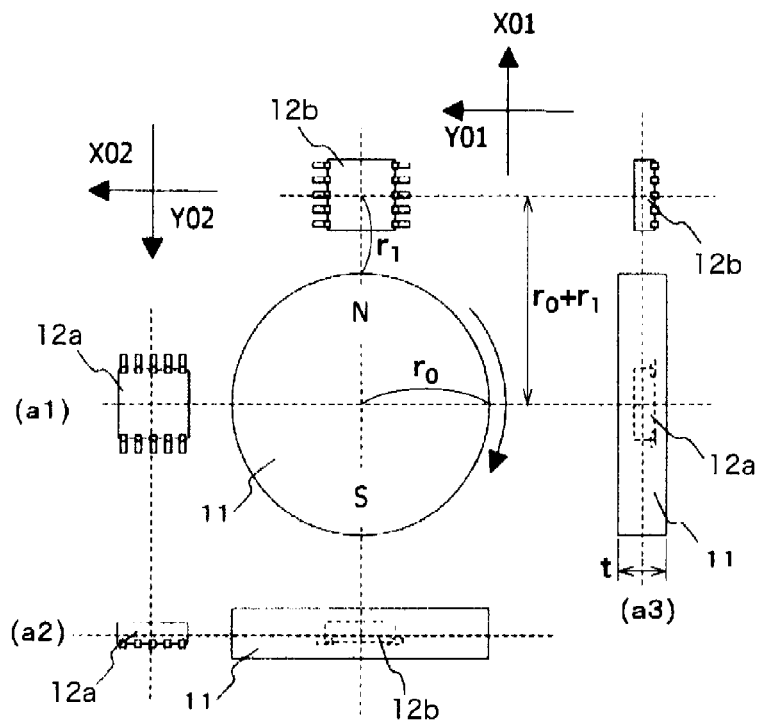
FIG. 15(a) is a schematic view showing a still further example of the rotation-angle-detecting apparatuses of Example 3.

FIG. 15(a) schematically shows a rotation-angle-detecting apparatus having first and second sensor devices 12a, 12b arranged around a two-pole magnet rotor 11. (a1) is a front view, and (a2) and (a3) are side views. The first and second sensor devices 12a, 12b are arranged at positions with 90°-phase difference under the same conditions. Used is a cylindrical coordinate system with the center of the magnet rotor 11 as an origin, and the rotation axis as a Z-axis. The magnet rotor 11 has a diameter $2r_0$ of 26 mm and a thickness t (in a rotation axis direction) of 8 mm, the distance $r_0 + r_1$ from the Z-axis to the center of the sensor device being 23 mm.

Figure 15B:
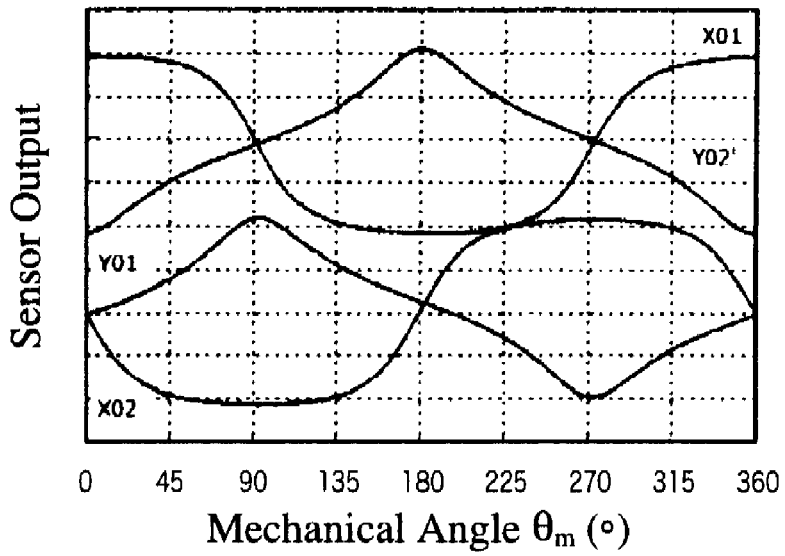
FIG. 15(b) is a graph showing the sensor output of the rotation-angle-detecting apparatus of FIG. 15(a).
Figure 15C:
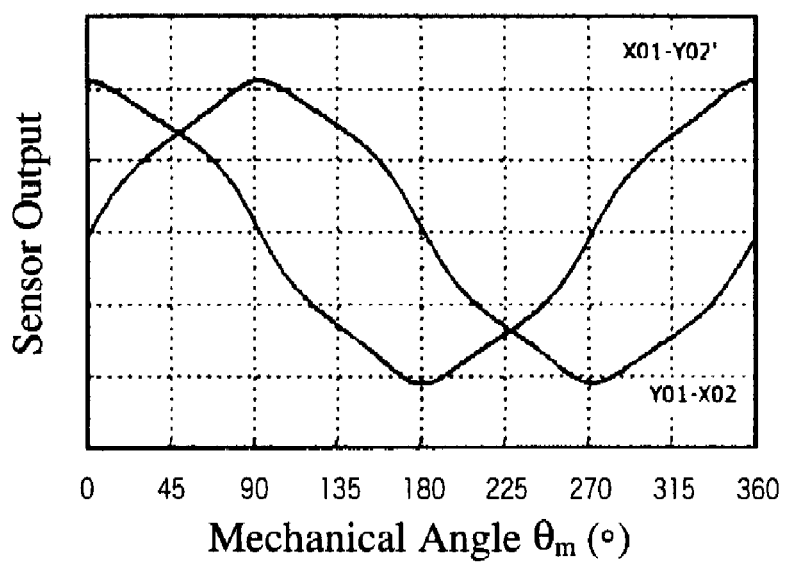
FIG. 15(c) is a graph showing the sensor output of the rotation-angle-detecting apparatus of FIG. 15(a).
Figure 15D:
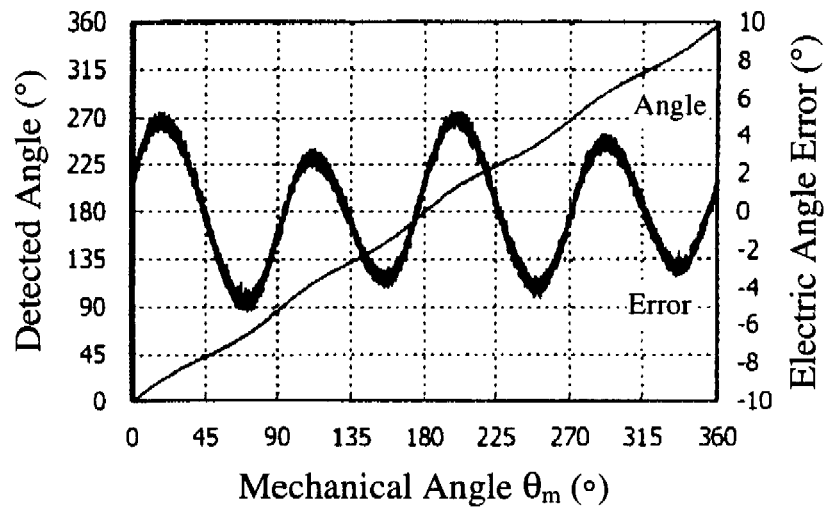
FIG. 15(d) is a graph showing angles detected by the rotation-angle-detecting apparatus of FIG. 15(a) and their errors.

To conduct waveform synthesis (differential treatment), the output of the sensor bridge Y02 was inverted to Y02'. FIGS. 15(b) to 15(d) show the outputs of the sensor bridges. As shown in FIG. 15 (b), the output of the sensor bridge X01, X02 had substantially a trapezoidal waveform, and the output of the sensor bridge Y01, Y02' had substantially a triangular waveform. As shown in FIGS. 15(c) and 15(d), the synthesis of X01 and Y02' and the synthesis of Y01 and X02 reduced harmonics drastically, resulting in an angle error as small as ±5°. However, the synthesized waveform is clearly distant from an ideal sine wave, failing to remove waveform deformation completely. This is due to the fact that the waveforms before synthesis had extremely large deformation, because of large difference in a magnetic field between the radial direction and the rotational direction.

Figure 16A:
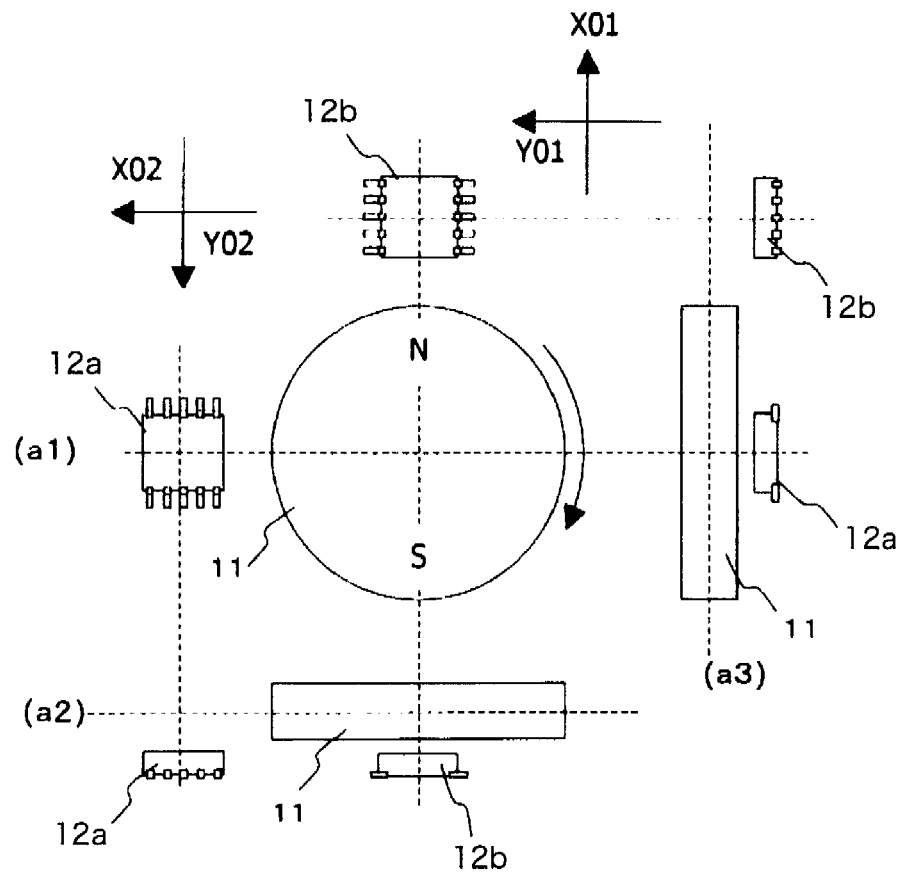
FIG. 16(a) is a schematic view showing a still further example of the rotation-angle-detecting apparatuses of Example 3.
Figure 16B:
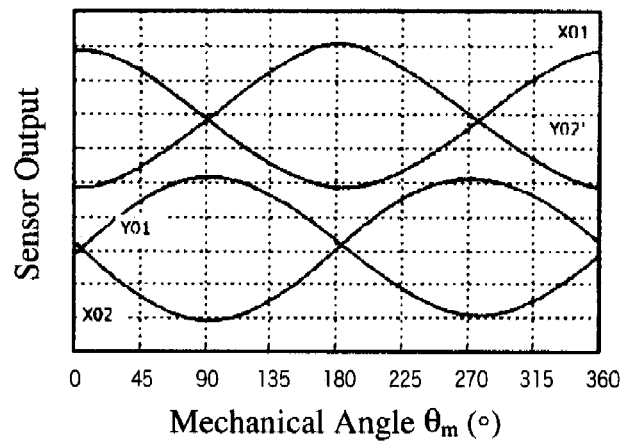
FIG. 16(b) is a graph showing the sensor output of the rotation-angle-detecting apparatus of FIG. 16(a).
Figure 16C:
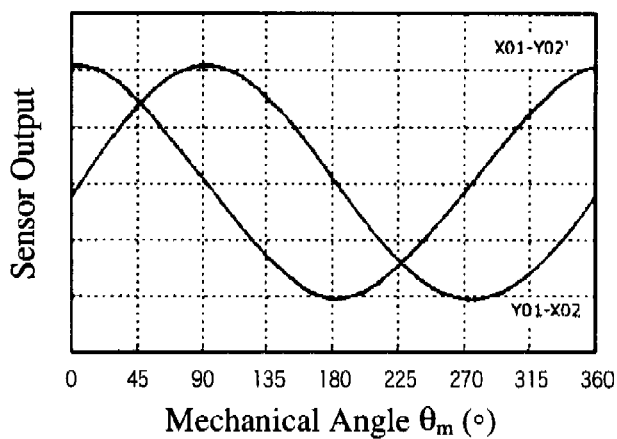
FIG. 16(c) is a graph showing the sensor output of the rotation-angle-detecting apparatus of FIG. 16(a).
Figure 16D:
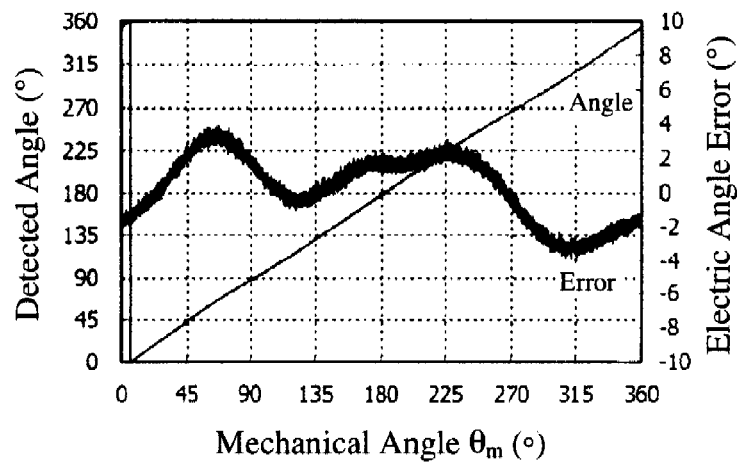
FIG. 16(d) is a graph showing angles detected by the rotation-angle-detecting apparatus of FIG. 16(a) and their errors.

FIG. 16(a) schematically shows a rotation-angle-detecting apparatus, which is the same as shown in FIG. 15(a) except that the first sensor device 12b and the second sensor device 12a were shifted by −15 mm in parallel in a Z-axis direction. Namely, the sensor devices 12a, 12b were arranged at positions of z=−15 mm relative to the magnet rotor. FIGS. 16(b) to 16(d) show the outputs of sensor bridges. Because the sensor devices were disposed to receive magnetic flux having a uniform density amplitude, their outputs had substantially sine waveforms before the synthesis as shown in FIG. 16(b). Accordingly, the angle error was reduced to ±3° as shown in FIGS. 16(c) and 16(d), by removing the influence of the deformation of the magnet rotor and the variations of mounting positions of sensor devices by waveform synthesis. The angle error can be further reduced by additional adjustment, and it was confirmed that only slight change of relative positions of the sensor devices to the magnet rotor further reduced the angle error.

Other Method 1 for Inverting Signal Y02

Figure 17:
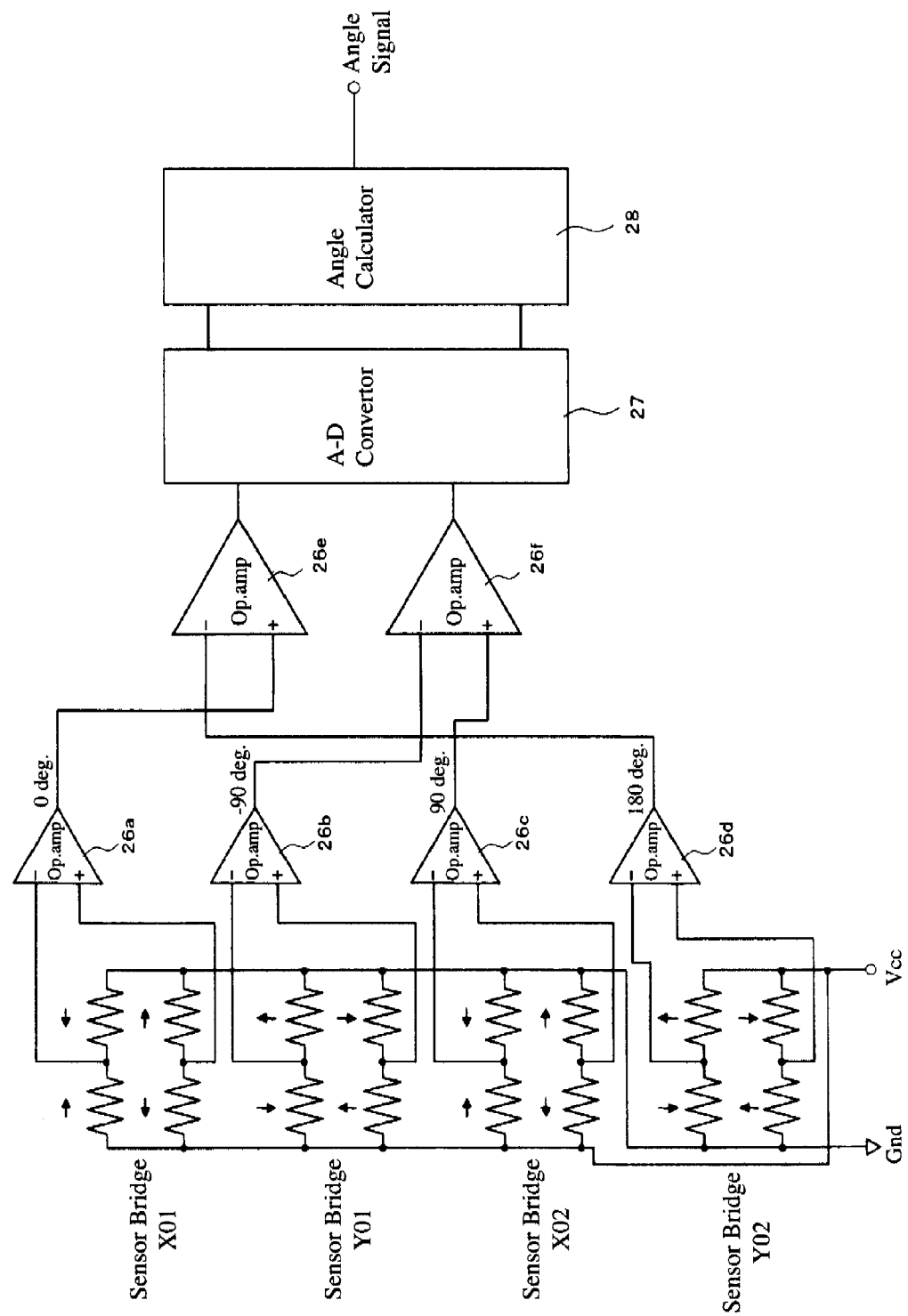
FIG. 17 is a view showing a further example of circuits used in the rotation-angle-detecting apparatus of Example 3.

As described above, an output of the sensor bridge Y02 should be inverted to calculate rotation angle signals. There are several methods for inverting the output of the sensor bridge Y02, in addition to the above method of exchanging differential amplifier input terminals. As shown in FIG. 17, a first method is to invert voltage applied to Y02. With only the connections of a sensor bridge Y02 to a Vcc terminal and a Gnd terminal reversed, the inverted output of Y02 is input to an operational amplifier 26d.

Other Method 2 for Inverting Signal Y02

Figure 18A:
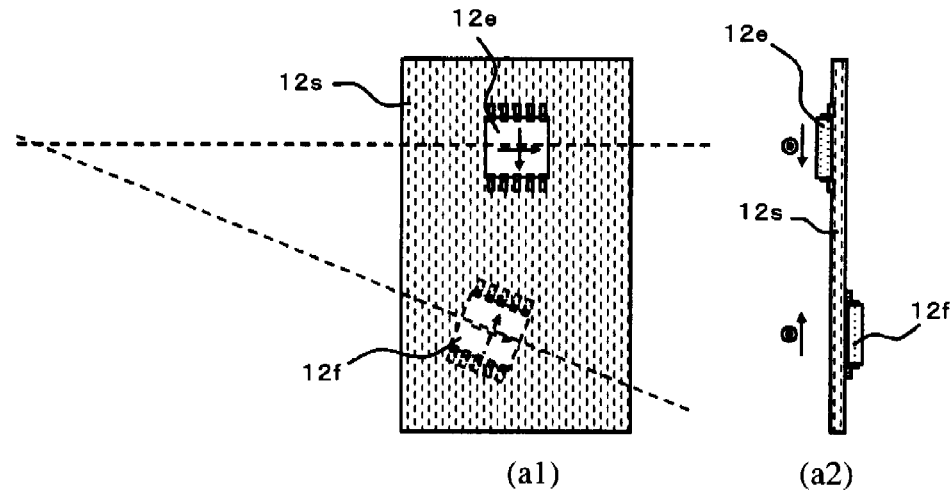
FIG. 18(a) is a schematic view showing a further example of sensor devices used in the rotation-angle-detecting apparatus of Example 3.
Figure 18B:
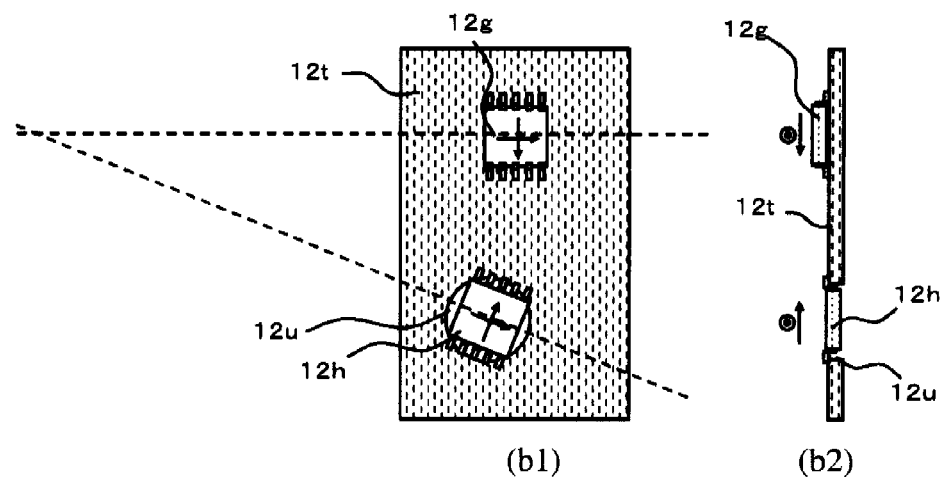
FIG. 18(b) is a schematic view showing a still further example of sensor devices used in the rotation-angle-detecting apparatus of Example 3.
Figure 18C:
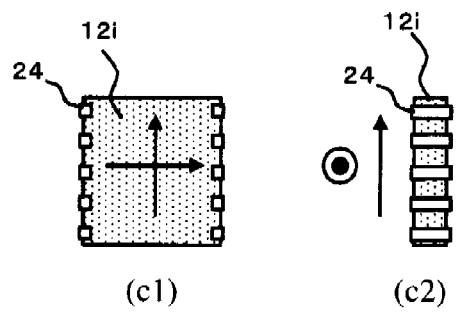
FIG. 18(*c*) is a schematic view showing a still further example of sensor devices used in the rotation-angle-detecting apparatus of Example 3.

FIGS. 18(a) to 18(c) schematically show the other arrangement of sensor devices used in the rotation-angle-detecting apparatus of the present invention. As shown in FIG. 18(a), in which (a1) is a front view, and (a2) is a side view, a circuit board 12s having printed circuits on both surfaces is used with a first sensor device 12e mounted to a top surface of the circuit board 12s, and a second sensor device 12f mounted to a rear surface of the circuit board 12s, to reverse a phase relation between the output of the sensor bridge Y02 and the output of the sensor bridge X01. Thus, inversion is achieved as in the case of mounting the second sensor device on the top surface of the circuit board.

When a circuit board 12t having wiring only on one surface is used, the same inverting effect can be obtained by mounting a first sensor device 12g on a top surface of the circuit board 12t, and by mounting a second sensor device 12h upside down in a through-hole 12u of the board 12t, as shown in FIG. 18 (b), in which (b1) is a front view, and (b2) is a side view. Of course, the same inverting effect can also be obtained by using a sensor device 12i having terminals 24 on the side surfaces, such that it can be mounted on any one of top and rear surfaces of the board, as shown in FIG. 18 (c), in which (c1) is a front view, and (c2) is a side view. Namely, the board of FIG. 18(b) is made free of a through-hole, the sensor device 12g is replaced by the sensor device 12i, and the inverted sensor device 12i is used in place of the sensor device 12h and mounted on the same side as 12i. Such mounting can provide electric signals having a desired phase relation.

Other Examples of Circuit

Figure 19:
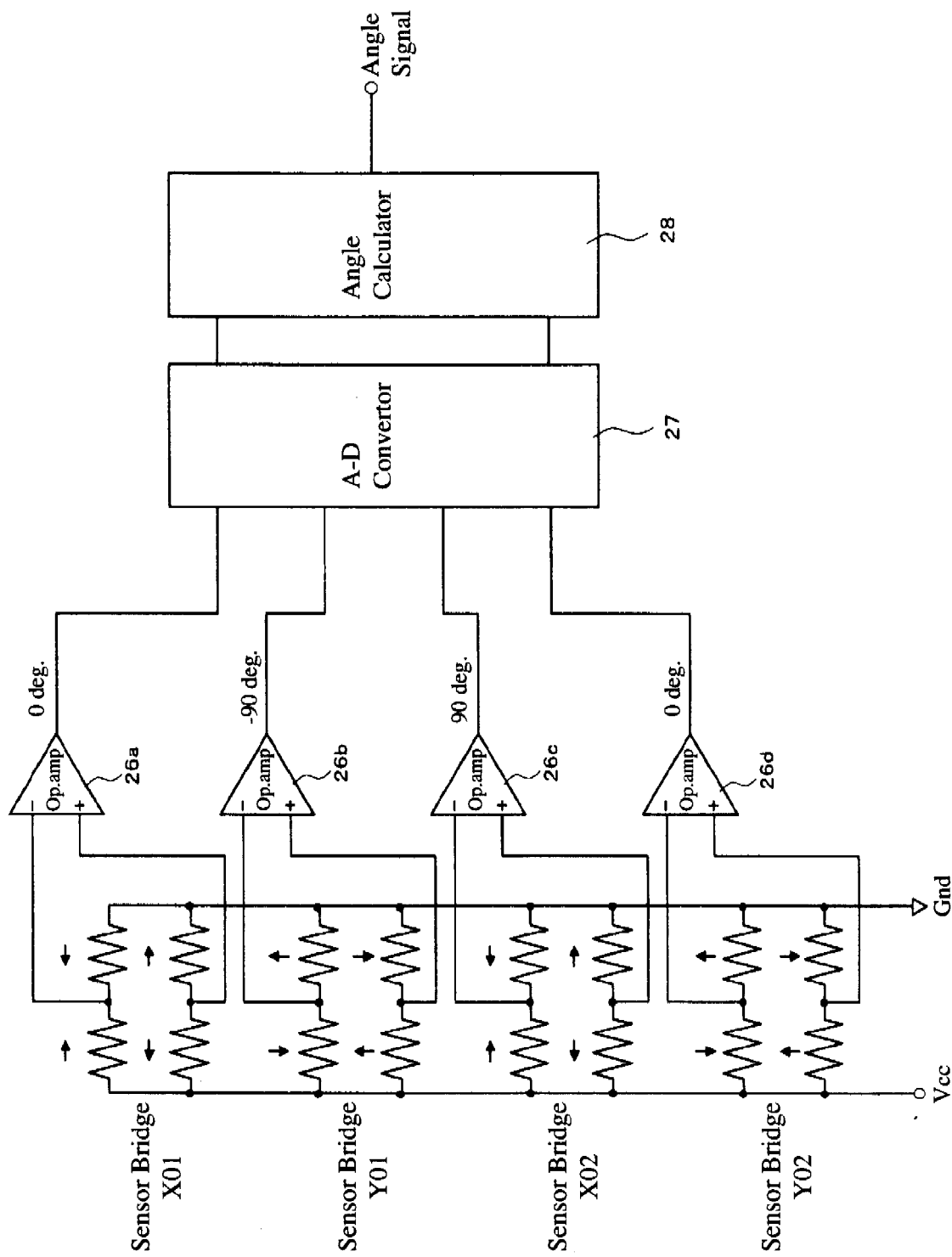
FIG. 19 is a view showing a still further example of circuits used in the rotation-angle-detecting apparatus of Example 3.

A circuit shown in FIG. 19 is the same as the circuit of FIG. 17 in a method of applying voltage to sensor bridges X01, Y01, X02 and Y02 and the polarities of inputs to differential amplifiers, and digital inversion is conducted only to a signal input from Y02 (an output of the operational amplifier 26d) in a downstream analog-digital converter (A-D converter). This circuit directly conducts necessary calculations without analog inversion, as in the above Example.

Formation of Sine Signal and Cosine Signal with Addition Circuit

Figure 20:
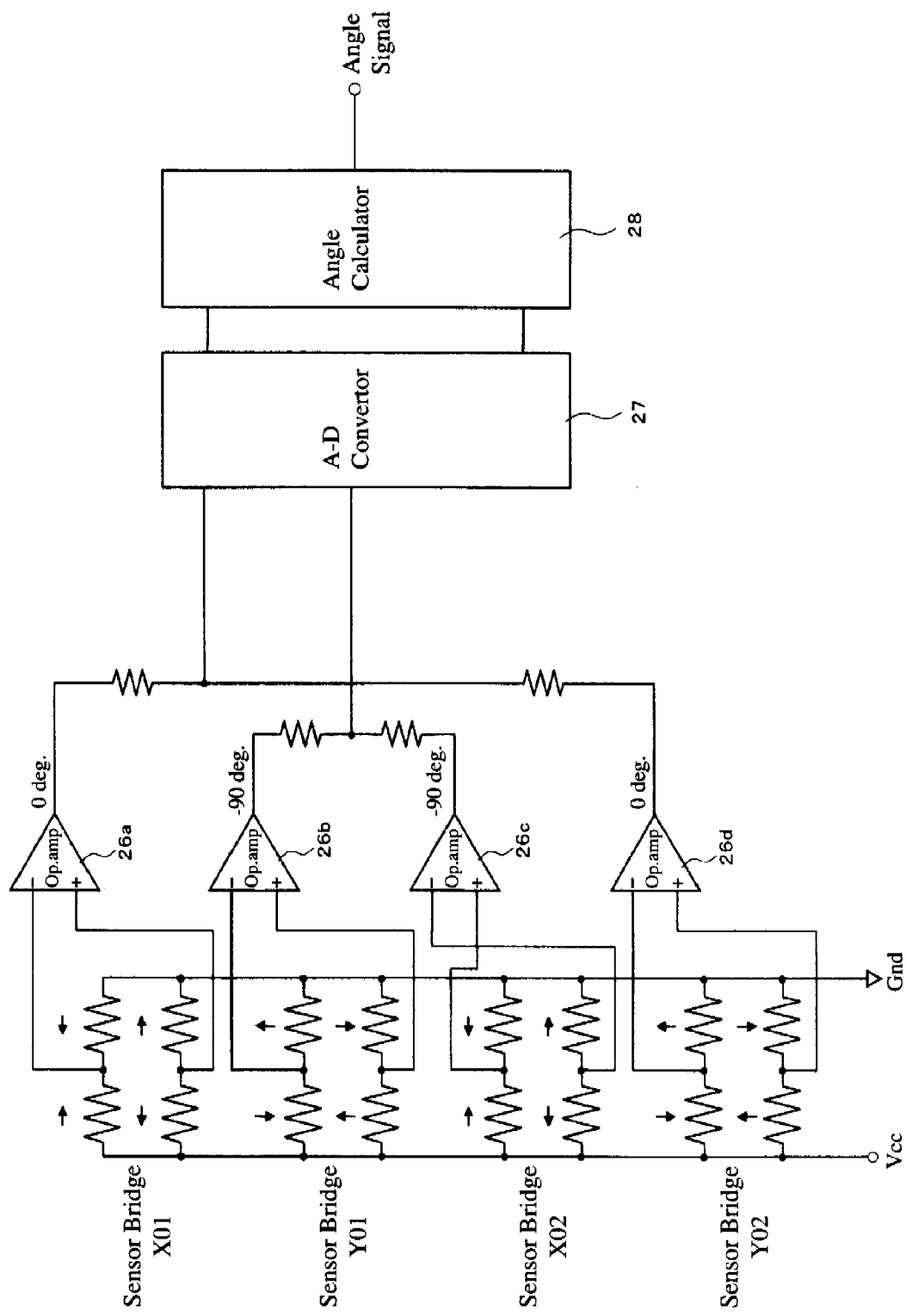
FIG. 20 is a view showing a still further example of circuits used in the rotation-angle-detecting apparatus of Example 3.
Figure 21:
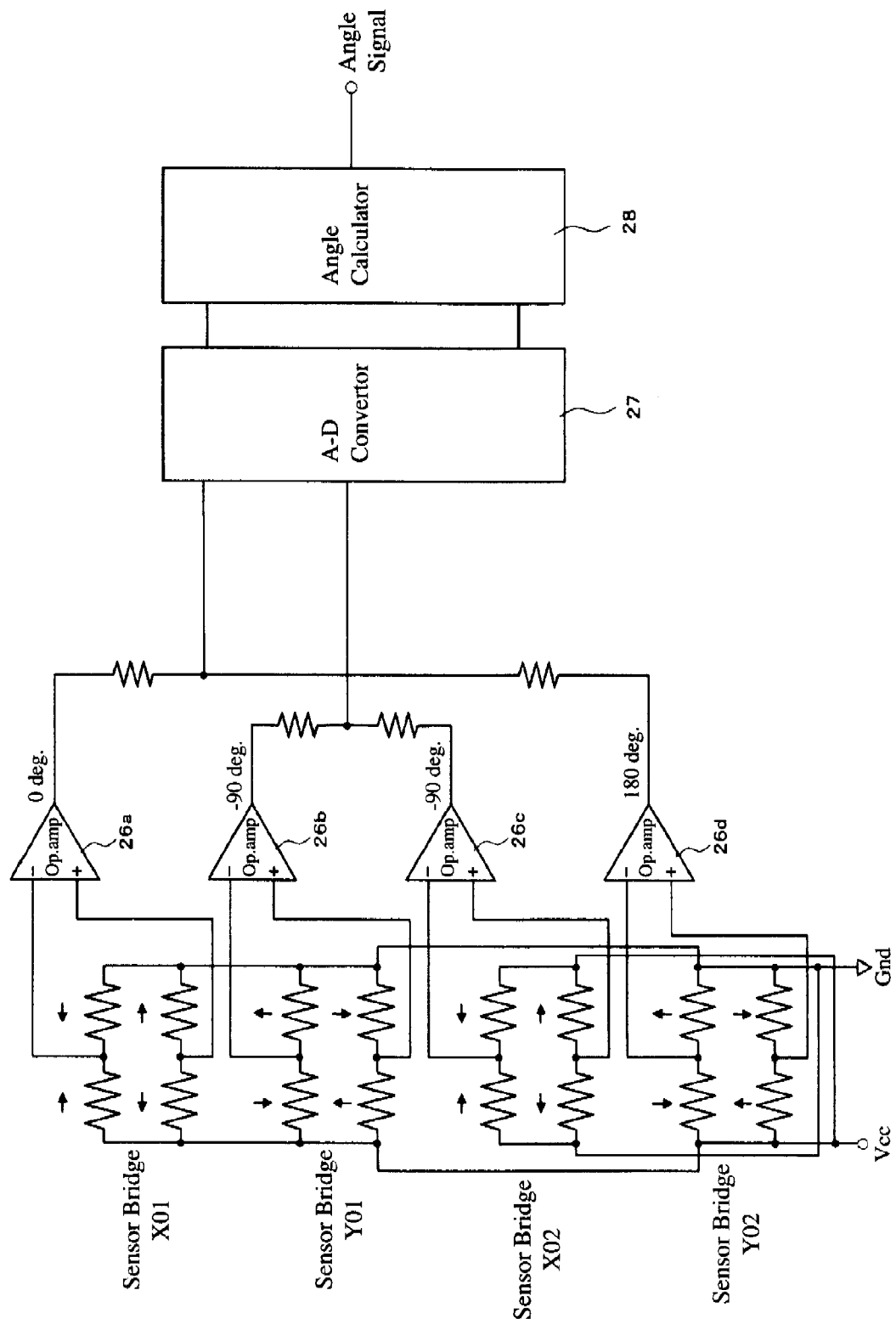
FIG. 21 is a view showing a still further example of circuits used in the rotation-angle-detecting apparatus of Example 3.

In the above examples, two signals with a phase difference of 90° were obtained by a differential treatment of outputs from four sensor bridges. Alternatively, the same two signals can be obtained by the addition of outputs from four sensor bridges. Different from the inversion methods in the above example, this method makes the polarity of the connection of a sensor bridge X02 to a differential amplifier opposite to those of other sensor bridges to differential amplifiers, as shown in FIG. 20. Because fundamental waves from the sensor bridges X01 and Y02 have the same phase as shown by the formulae (10) and (11-1) to (11-3), addition can be conducted to outputs themselves. Resistors between the operational amplifiers and an A-D converter are electric resistors for conducting the addition. On the other hand, because fundamental waves from the sensor bridges Y01 and X02 have opposite phases, simple addition cancels the fundamental waves. Accordingly, an output of the sensor bridge X02 should be inverted (the connection of the sensor bridge X02 to an operational amplifier 26c should be opposite in polarity to those of other sensor bridges to operational amplifiers), and then added to the output of the sensor bridge Y01. Incidentally, the inversion of the output of the sensor bridge X02 can also be conducted by applying DC voltage with opposite polarity to the sensor bridge X02, as in the example shown in FIG. 17. Such circuit is shown in FIG. 21.

Figure 22A:
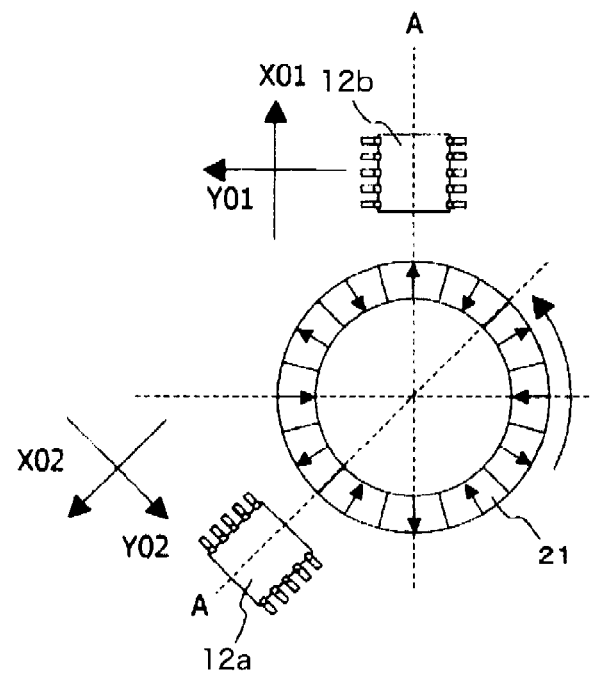
FIG. 22(*a*) is a schematic front view showing a further example of the rotation-angle-detecting apparatuses of Example 3.
Figure 22B:
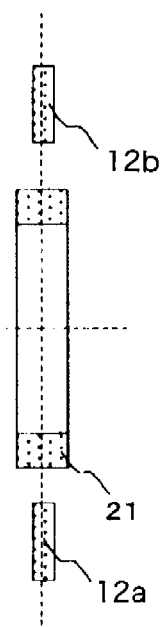
Figure 22C:
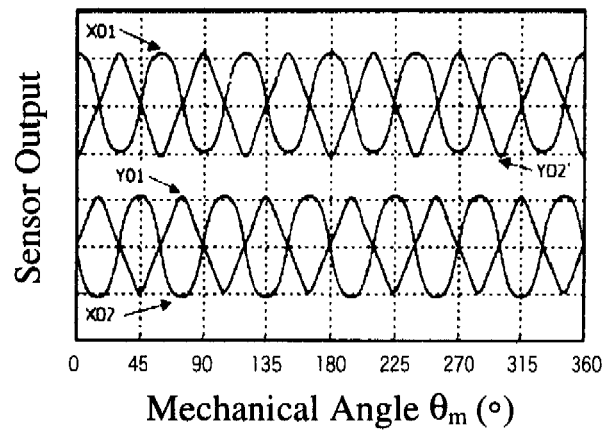
Figure 22D:
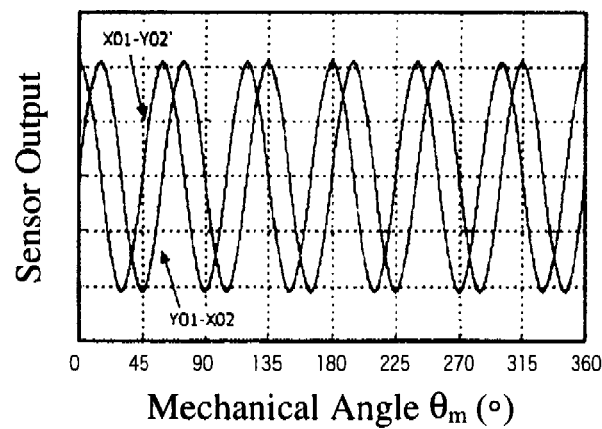

FIGS. 22(a) and 22(b) show a rotation-angle-detecting apparatus comprising a multi-pole magnet rotor 21, a first sensor device 12b, and a second sensor device 12a. The evaluation results (outputs, etc.) of rotation angle characteristics using this apparatus are shown in the graphs of FIGS. 22(c) to 22(f). The distance from a magnet periphery to a center of each sensor device 12a, 12b was about 3 mm, and the sensor devices were arranged with an inclination angle $\chi$ of 0. Because the magnet rotor 21 had 12 magnetic poles, both sensors provided outputs in which a mechanical angle of 360° corresponded to 6 periods. In this case, a mechanical angle of 60° corresponded to a period of an electrical angle. The second sensor device 12a was arranged under the same conditions except for a 90°-phase difference by electrical angle relative to the first sensor device 12b. To conduct a waveform synthesis (differential treatment), the output of the sensor bridge Y02 was inverted to Y02'. As shown in FIGS. 22(c) to 22(d), output components (X01, X02) in the radial direction of the magnet rotor have substantially trapezoidal waveforms, and output components (Y01, Y02') in the rotational direction have substantially triangular waveforms, resulting in waveform deformation after the waveform synthesis.

Figure 22E:
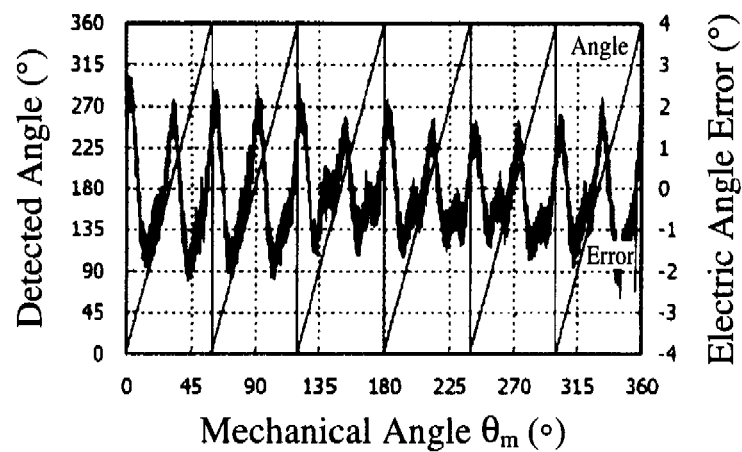
Figure 22F:
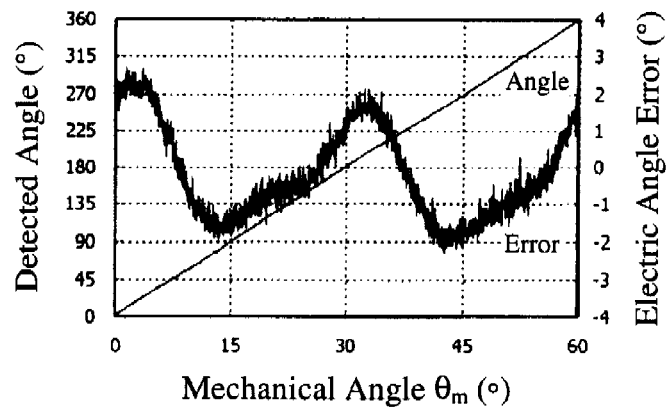
Figure 23A:
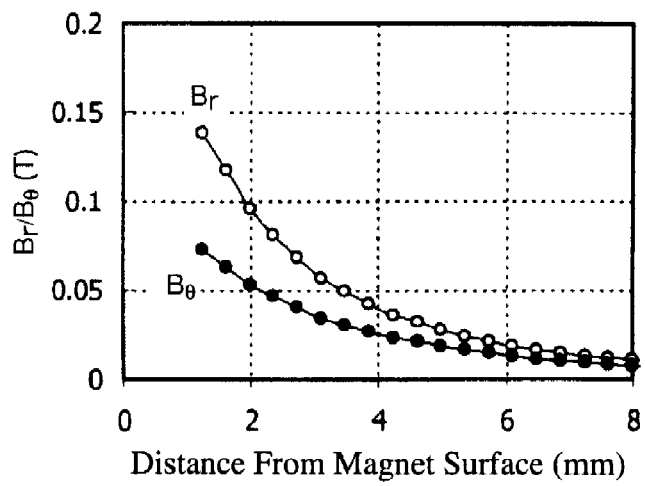
FIG. 23(*a*) is a graph showing the dependence of the magnetic flux density of the magnet rotor on distance.
Figure 23B:
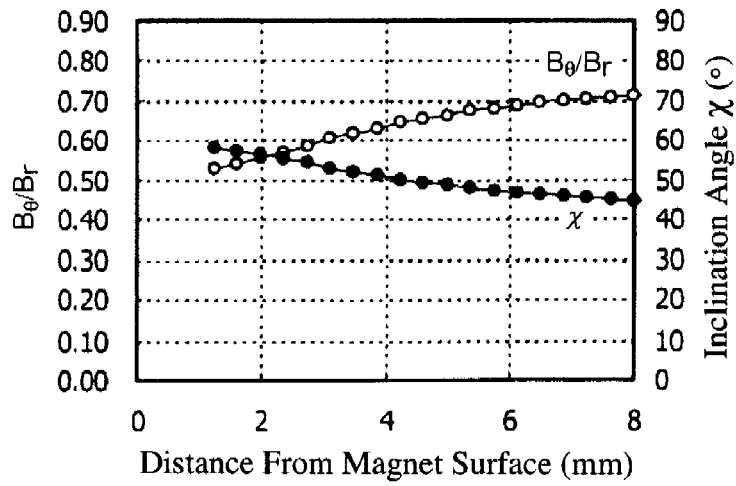

FIG. 23(a) shows the simulation results of the dependence of magnetic flux density on distance, in a magnet rotor with 12 magnetic poles having an inner diameter of 45 mm, an outer diameter of 50 mm and a thickness of 4 mm. FIG. 23(b) shows $|B_\theta|/|B_r|$ determined from FIG. 23(a) and the preferred inclination angle $\chi$ of a sensor device calculated from $|B_\theta|/|B_r|$. It is clear that the magnetic flux density $B_r$ in a radial direction had a larger amplitude than that of the magnetic flux density $B_\theta$ in a rotational direction. The experimental results shown in FIGS. 22(c) and 22(d) suggests that the magnetic flux density has difference in amplitude between a radial direction and a rotational direction ($|B_r|>|B_\theta|$) as shown in FIG. 23(a). As a result, the electrical angle error was ±2° as shown in FIGS. 22(e) and 22 (f).

Figure 24A:
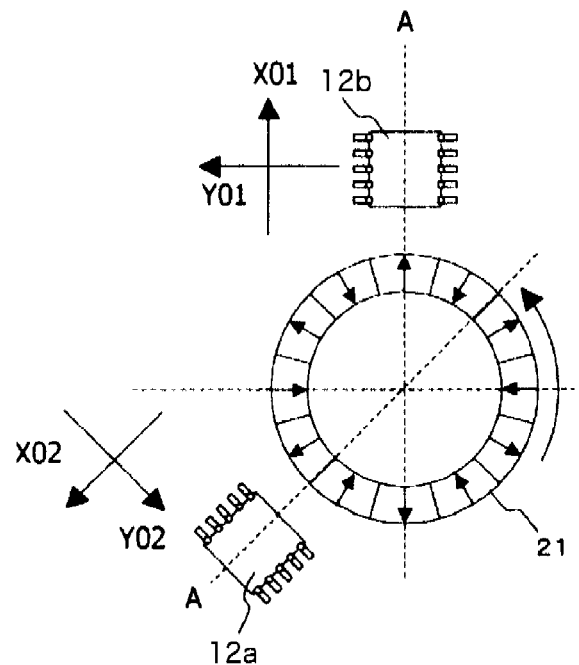
FIG. 24(*a*) is a schematic front view showing a still further example of the rotation-angle-detecting apparatuses of Example 3.
Figure 24B:
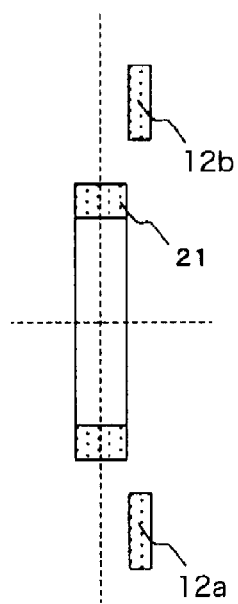
Figure 24C:
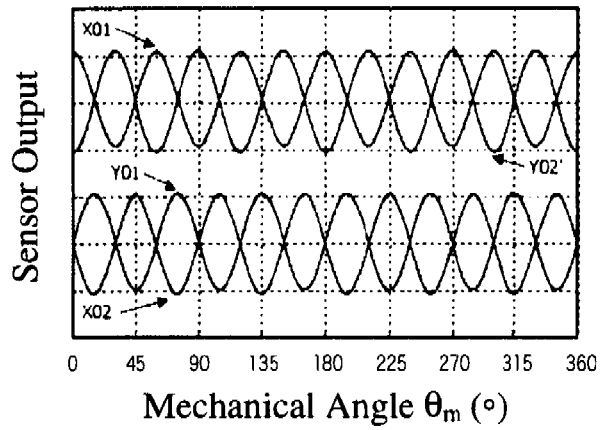
Figure 24D:
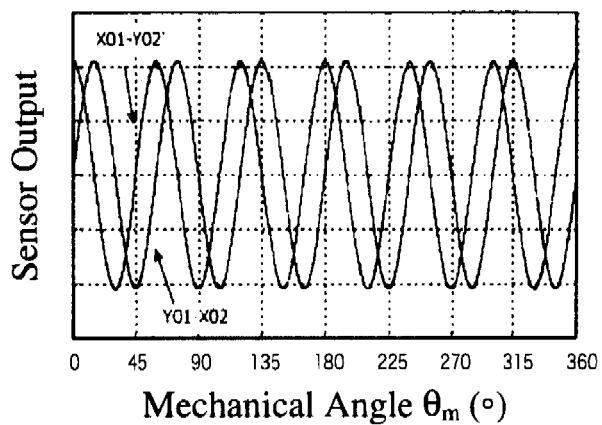
Figure 24E:
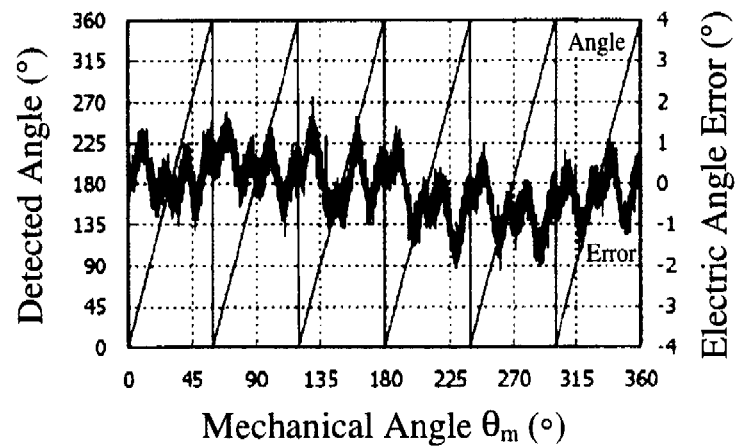
Figure 24F:
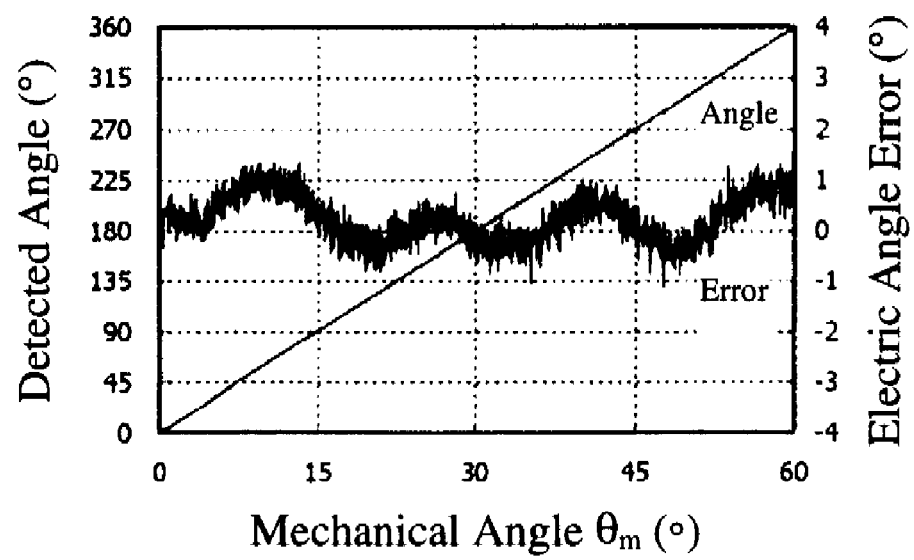

FIGS. 24(a) and 24(b) show a rotation-angle-detecting apparatus, in which the sensor devices 12a and 12b in FIGS. 22(a) and 22(b) are shifted by z in a Z-axis direction. Because the sensor devices 12a, 12b received magnetic flux with a uniform density amplitude, the outputs of X01, X02, Y01 and Y02' did not have strain, and those after the waveform synthesis had substantially sine or cosine waveforms as shown in FIGS. 24(c) and 24(d). As a result, the electrical angle error was ±1° or less as shown in FIGS. 24(e) and 24 (f), indicating that the rotation angle can be measured with remarkable accuracy.

Variations of Sensor Device Positions Around Multi-Pole Magnet Rotor

Figure 25A:
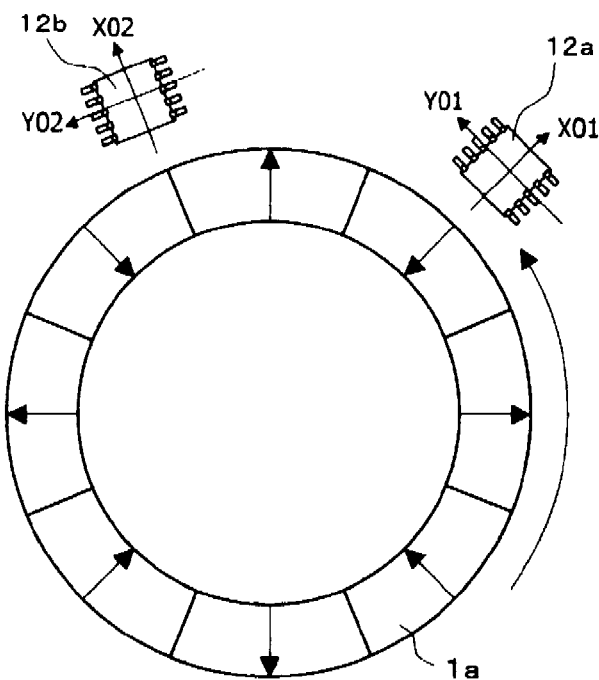
FIG. 25(*a*) is a schematic view showing a still further example of the rotation-angle-detecting apparatuses of Example 3.

In all the above examples, the first and second sensor devices were arranged with a phase difference of 90° by electrical angle. However, the first and second sensor devices need not be arranged with an electrical angle of 90°. For instance, when a second sensor device 12b is separate from a first sensor device 12a by 90°+180° by electrical angle around the magnet rotor 1a as shown in FIG. 25(a), the fundamental waves of their outputs are represented by the formulae (16-1) to (16-4), with the output of the sensor bridge X01 as a reference.

$$X01 = \cos\theta_{el} \tag{16-1},$$

$$Y01 = -\sin\theta_{el} = \cos(\theta_{el}+90°) \tag{16-2},$$

$$X02 = \sin(\theta_{el}+180°) = -\sin\theta_{el} = \cos(\theta_{el}+90°) \tag{16-3 and,}$$

$$Y02 = \cos(\theta_{el}+180°) = -\cos\theta_{el} \tag{16-4}.$$

Figure 25B:
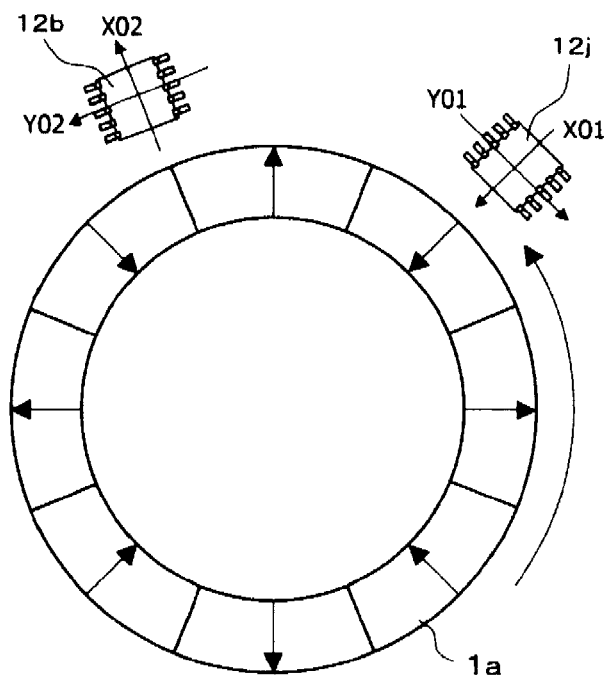

The output X02 should be inverted and subjected to a differential treatment with the output Y01. The outputs X01 and Y02 can be input to a differential amplifier without inversion. Using sensor devices 12j and 12b with changed arrangement and connection without changing their phase relation as shown in FIG. 25(b), the rotation angle can be detected with the same accuracy. Accordingly, the positions of the first and second sensor devices are not restricted to electrical angles of 90° and 90°±360°, but their relative positions may be at any angle of 90°±180n°, wherein n is an integer. With such expansion of a gap between the sensor devices, however, the detection accuracy of a rotation angle may be restricted by assembling accuracy of the rotation-angle-detecting apparatus to a rotation shaft of a motor or a machining apparatus. Accordingly, a smaller gap between the sensor devices is more preferable as shown in FIG. 14.

Substantially Opposite Positioning of Two Sensor Devices

When the positions of the first and second sensor devices are restricted to a mechanical angle close to 180°, the angle error due to the rotation axis deviation of a magnet rotor can be further reduced. In this case, an electrical angle between the first and second sensor devices is ±90+180N°, wherein N is a natural number representing the number of magnetic pole pairs on the magnet rotor. One example of such structure is shown in FIG. 26.

Figure 26:
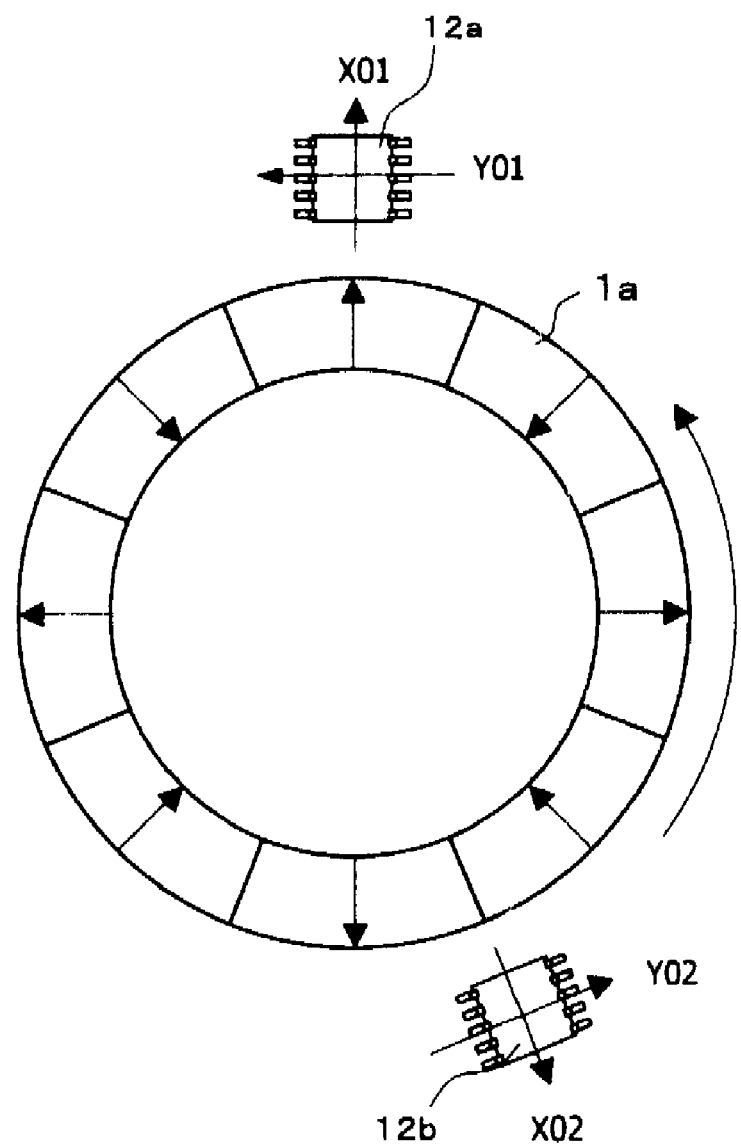
FIG. 26 is a schematic view showing a still further example of the rotation-angle-detecting apparatuses of Example 3.

In the structure shown in FIG. 26, when the rotation center moves toward the sensor device 12a and away from the sensor device 12b, the sensor device 12a receives a stronger magnetic field than the sensor device 12b. However, because signals from sensor bridges contained in the sensor device 12a and signals from sensor bridges contained in the sensor device 12b are synthesized to obtain a set of a sine signal and a cosine signal in the present invention, the influence of the rotation axis deviation of the magnet rotor 1a on a rotation angle signal is reduced, and the apparatus suffers less influence from the displacement of the rotation axis than when the sensor devices are arranged only on one side of the rotation axis (deviations from the rotation center are permitted to some extent, more than permitted for motors). Pluralities of sensor devices thus used are called a sensor device group.

Resistance to Spacing Variation by Using Spin Valve GMR Element

Figure 27A:
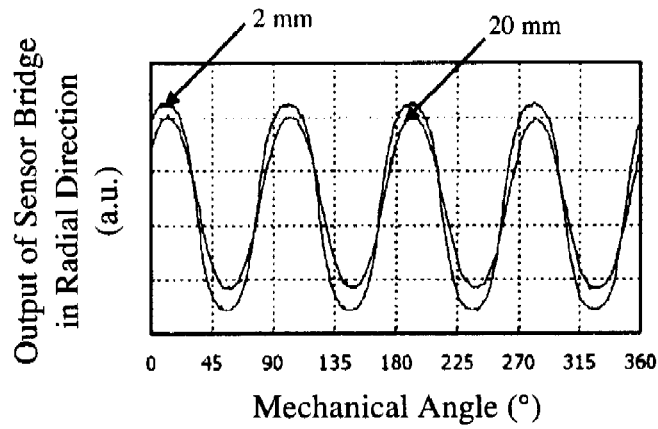
FIG. 27(*a*) is a graph showing the dependence of the output of the sensor bridge of the present invention on a radial distance.
Figure 27B:
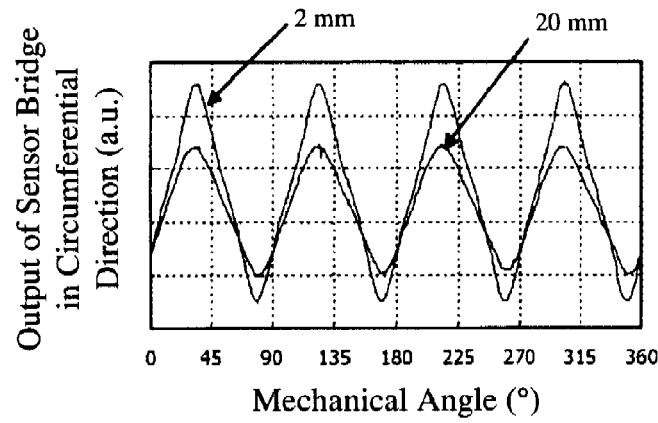

Using a spin-valve, giant-magnetoresistive device as a sensor device element, a stable sensor bridge output can be obtained even with the variations of magnetic field intensity. FIGS. 27(a) and 27(b) show the relations between outputs obtained by using sensor devices comprising spin-valve, giant-magnetoresistive devices and the mechanical angle of a magnet rotor at different distances between the sensor device and the magnet rotor. FIG. 27(a) shows the measurement results when the radial distance was changed, and FIG. 27(b) shows the measurement results when the rotational-direction distance was changed. Numbers of "2 mm" and "20 mm" with thick arrows in the figures show distances between the sensor device and the magnet rotor.

Figure 27C:
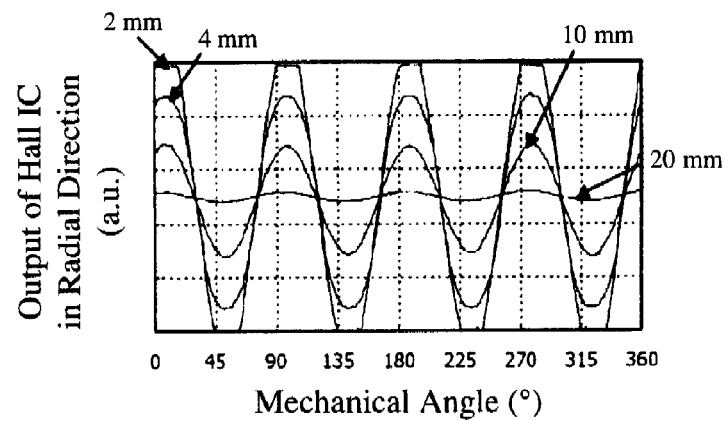
Figure 27D:
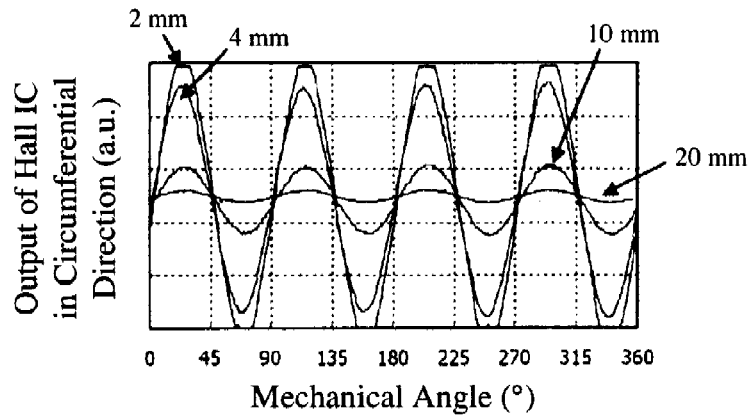

FIGS. 27(c) and 27(d) show the relations between the mechanical angle of a magnet rotor and outputs obtained by using Hall ICs in place of the sensor devices comprising spin-valve, giant-magnetoresistive devices, at different distances between the sensor device and the magnet rotor. FIG. 27(c) shows the measurement results when the radial distance was changed, and FIG. 27(d) shows the measurement results when the rotational-direction distance was changed. Because the Hall IC detects a magnetic field intensity in only one direction, the magnetic-field-sensing direction of the Hall IC was oriented along the radial direction of the magnet rotor to obtain the data shown in FIG. 27(c), and then oriented along the rotational direction (circumferential direction) of the magnet rotor to conduct the second measurement to obtain the data shown in FIG. 27(d). When the distance between the sensor and the magnet rotor was increased from 2 mm to 20 mm, the output change was large in the case of using the Hall IC as shown in FIGS. 27(c) and 27(d), but relatively small in the case of using the sensor devices as shown in FIGS. 27(a) and 27(b).

Figure 27E:
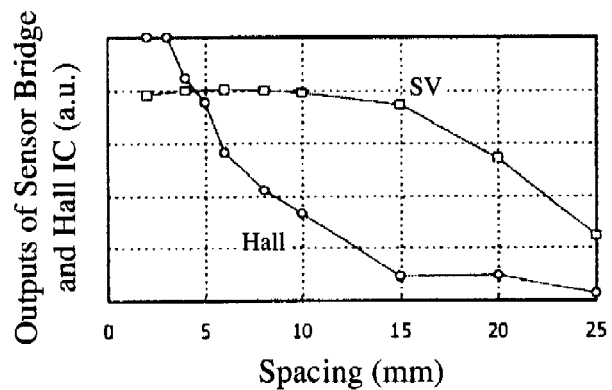
Figure 27F:
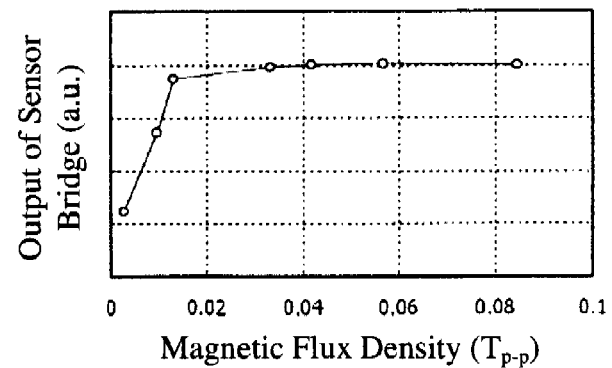

FIG. 27(e) shows the output voltage characteristics of the sensor device and the Hall IC with spacing (distance from the rotor surface, unit: mm) on the abscissa axis. FIG. 27(f) shows the output characteristics of the sensor bridge in the sensor device relative to a magnetic flux density. An 8-pole magnet rotor having a diameter of 32 mm was used. In the case of using the sensor device, even if the distance from the magnet rotor surface to the sensor device exceeds 10 mm, a substantially constant output can be obtained. On the other hand, in the case of using the Hall IC, an output is saturated near the rotor, resulting in the deformation of an output waveform. When the distance from the magnet rotor surface to the Hall IC increases, the density of magnetic flux from the magnet rotor drastically decreases, resulting in the reduction of output voltage. The rotation-angle-detecting apparatus of the present invention using this sensor bridge suffers little output voltage variation, and little output waveform deformation by a magnetic field applied, as described above. These measurement results indicate that the rotation-angle-detecting apparatus of the present invention is highly resistant to characteristic variations due to the rotation axis deviation and temperature change of a magnet rotor, sensor-mounting errors, etc. The rotation-angle-detecting apparatus of the present invention can thus detect an angle signal stably.

Mounting of Pluralities of Sensor Devices

Figure 28:
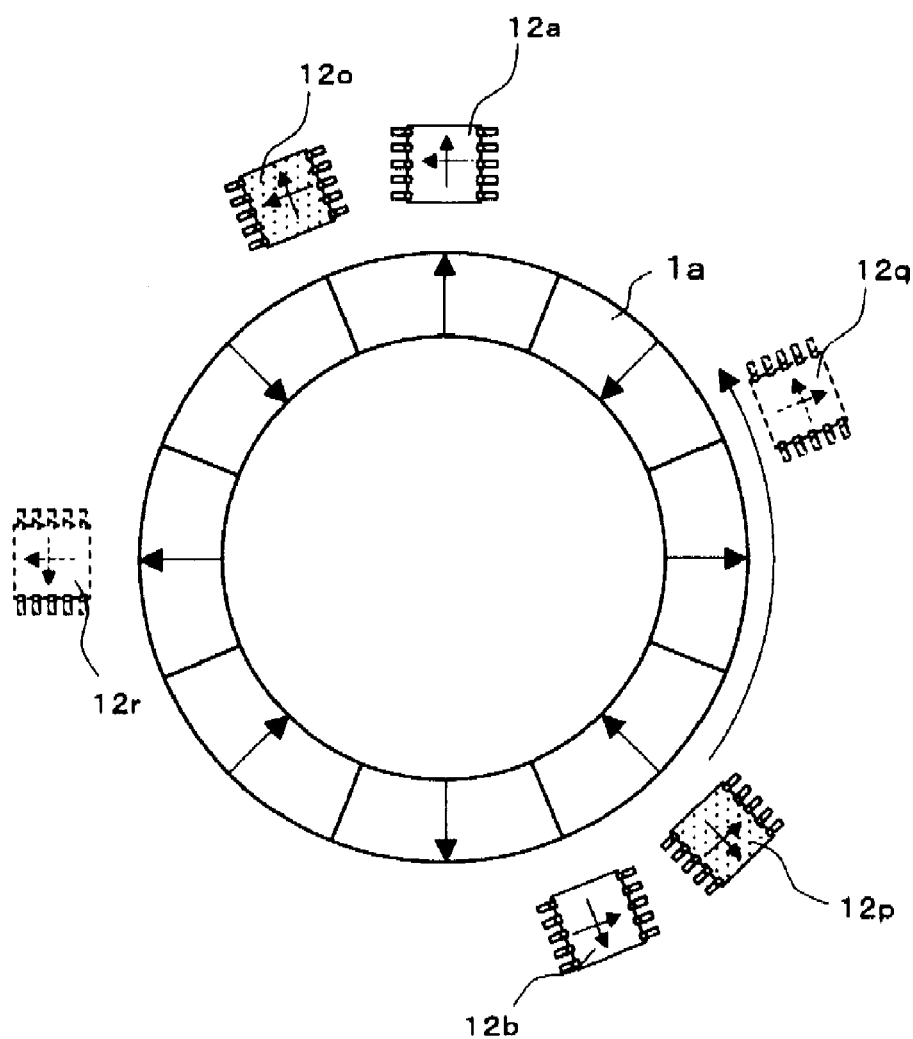
FIG. 28 is a schematic view showing a still further example of the rotation-angle-detecting apparatuses of the present invention.

To enhance resistance to the rotation axis deviation, the rotation-angle-detecting apparatus preferably comprises plural groups of devices shown in FIG. 26. The resistance to the rotation axis deviation means the capability of accurately detecting a rotation angle even if the distance from the magnet rotor to the sensor device changes due to the rotation axis deviation. One example is shown in FIG. 28. A first sensor device group (sensor devices 12a, 12b) is separate from a second sensor device group (sensor devices 12o, 12p) by 90° by electrical angle. Because output signals of these sensor devices are synthesized and input to an analog-digital converter or an angle signal calculator, the output signals are averaged, resulting in a stable rotation angle signal even with the rotation axis deviation. The number of groups of sensor devices disposed may be a divisor of the number of magnetic poles and 2 or more, and the groups of sensor devices are preferably arranged with equal intervals in a rotational direction. For instance, as shown by dotted lines, a third sensor device group (sensor devices 12q, 12r) may be added.

Detection of Disconnection

Figure 29:
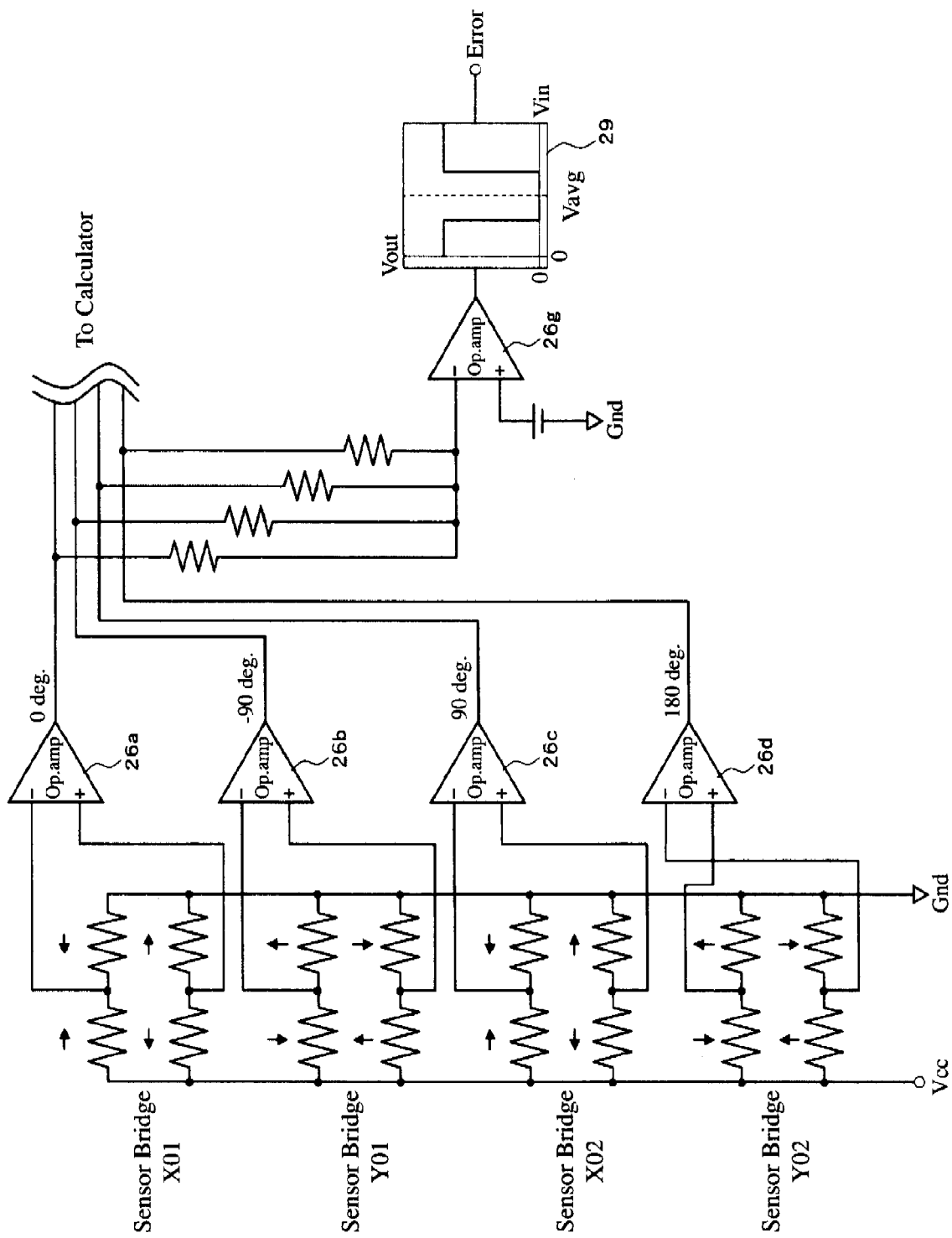
FIG. 29 is a view showing a still further example of circuits used in the rotation-angle-detecting apparatus of the present invention.

FIG. 29 shows an example in which the circuit shown in FIG. 10 is provided with a disconnection-detecting function (a circuit portion on the right side of the operators is not shown). In the rotation-angle-detecting apparatus comprising two sensor devices each containing two sensor bridges, the outputs of four spin-valve, giant-magnetoresistive devices are four sinusoidal signals with each phase difference of 90°. The average of the four signals is always constant at a middle of the normalized maximum value and the normalized minimum value. Accordingly, a constant average signal Vin can always be obtained from the output signals of the sensor bridges X01, Y01, X02 and Y02', by branching the output signals with electric resistors and averaging them by an operational amplifier 26g. If at least one of the output signals were not obtained by disconnection or bridge failure, the above average signal Vin would be different from a normal average signal Vavg. The comparison of this signal Vin with the normal average signal Vavg by a window comparator 29 provides an error signal Vout for notifying malfunction.

Noise Suppression by Differential Operation

In the circuit described above, four signals (±sine signals and ±cosine signals) are transmitted in balance. Because most of external noises have the same phase, the differential amplification of the transmitted signals substantially cancels the noises, so that there is high noise resistance in transmission from the sensor devices to the final calculator.

Figure 30A:
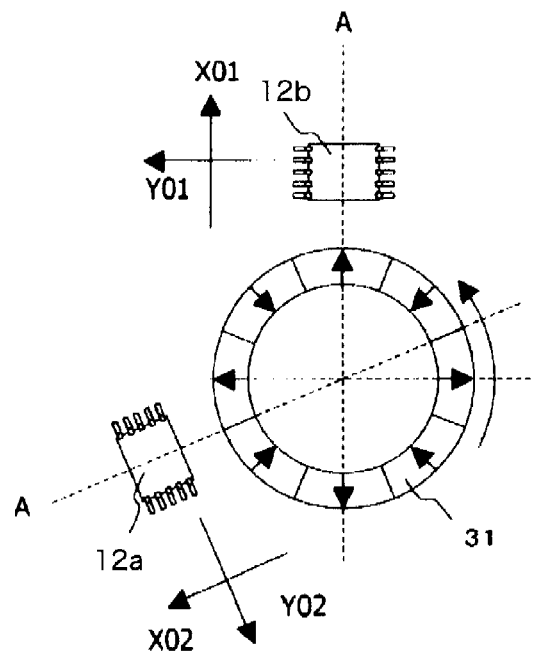
FIG. 30(*a*) is a schematic front view showing a still further example of the rotation-angle-detecting apparatuses of the present invention.
Figure 30B:
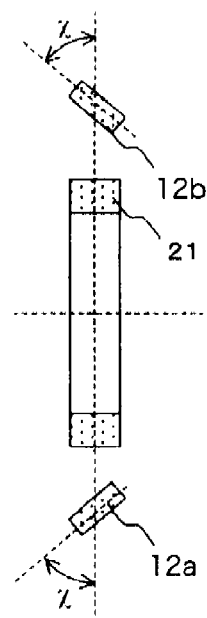

FIGS. 30(a) and 30(b) show the same rotation-angle-detecting apparatus as shown in FIGS. 22(a) and 22(b) except for replacing the magnet rotor with an 8-pole magnet rotor 31, and inclining the sensor devices by $\chi$. The inclination angle $\chi$ suppressed the error of a rotation angle (electrical angle).

EXAMPLE 4

Figure 31A:
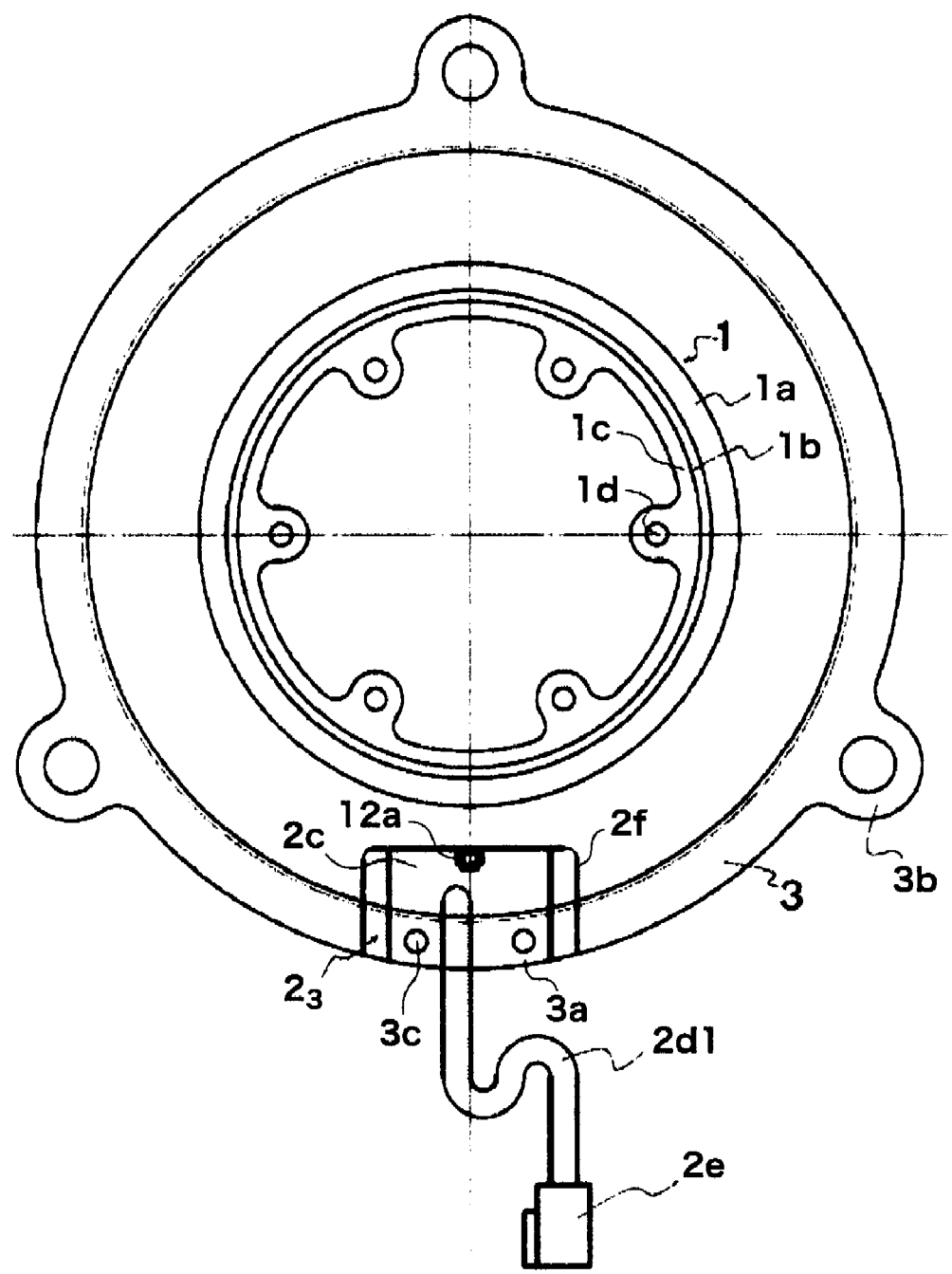
FIG. 31(*a*) is a schematic front view showing a further example of the rotation-angle-detecting apparatuses of Example 4.
Figure 31B:
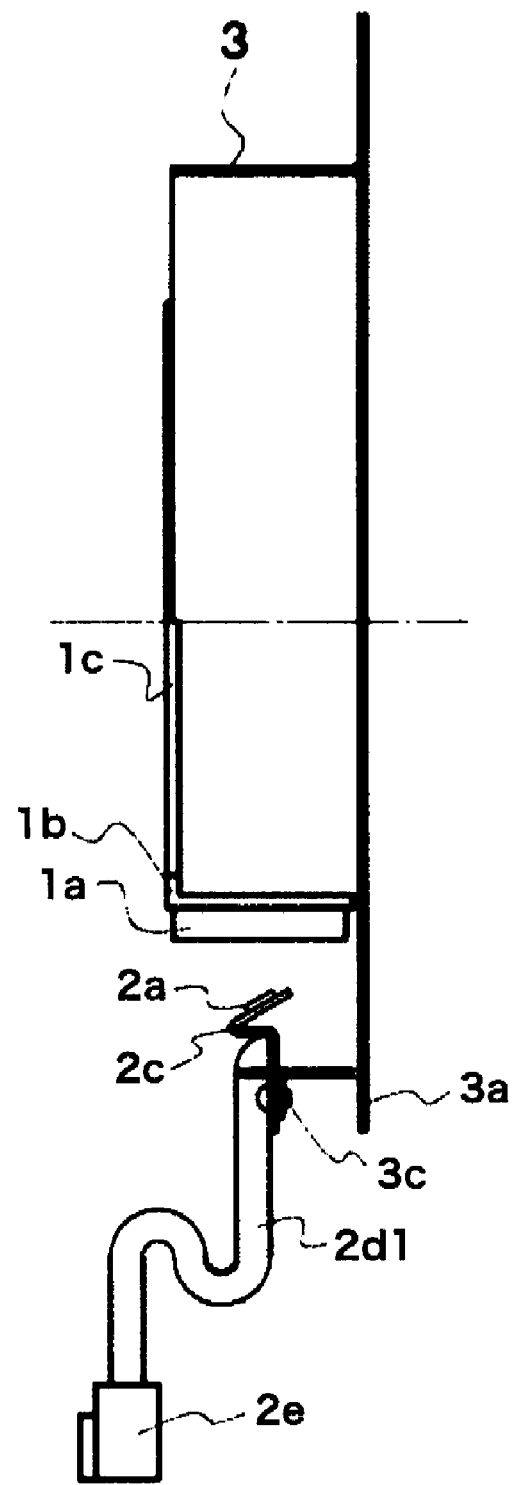

FIGS. 31(a) and 31(b) show a rotation-angle-detecting apparatus comprising a magnet rotor 1 having two magnetic poles on the circumferential surface, and a housing 3 to which a magnetic sensor means $2_3$ supporting a sensor device 12a is fixed. An intersection of chain lines is a rotation axis of the magnet rotor 1. The sensor device 12a having bridge circuits constituted by two spin-valve, giant-magnetoresistive devices whose pinned layers have magnetization directions perpendicular to each other detects a rotation angle of a ring-shaped permanent magnet 1a in the magnet rotor 1.

The magnet rotor 1 comprises a ring-shaped permanent magnet 1a, a soft-magnetic ring 1b integrally formed on an inner surface of the ring-shaped permanent magnet, and a non-magnetic, ring-shaped adaptor 1c supporting the soft-magnetic ring. The magnetic sensor means $2_3$ comprises a planar circuit board 2c having a side surface opposing the magnet rotor 1, a sensor device 12a fixed to a surface of the circuit board 2c, a cable 2d1 and a connector 2e for electrically connecting the sensor device and the circuit board 2c to a control circuit, and a non-magnetic cover 2f for shielding the sensor device. The ring-shaped permanent magnet 1a has two magnetic poles whose magnetization directions are perpendicular to the rotation axis of the magnet rotor. As shown in FIG. 31 (b), the housing 3 has a U-shaped angle 3a and bolts 3c for supporting the circuit board 2c, such that the sensor device 12a opposes the magnet rotor 1 with a predetermined gap. A plane of the circuit board 2c, to which the sensor device is fixed, is inclined from the rotation axis of the magnet rotor. The details of the sensor device, etc. will be explained below.

The rotation-angle-detecting apparatus shown in FIGS. 31(a) and 31(b) had the housing 3 having the magnetic sensor means $2_3$, which was fixed to a cutting machine body with bolting holes 3b, and the magnet rotor 1 concentrically fixed to a shaft (rotation axis) of the cutting machine with bolting holes 1d. The cutting machine is omitted in FIGS. 31(a) and 31(b). When the shaft of the cutting machine was rotated with the magnet rotor 1 opposing the magnetic sensor means $2_3$ as shown in FIG. 31(a), the rotation angle was detected with high accuracy.

Figure 32:
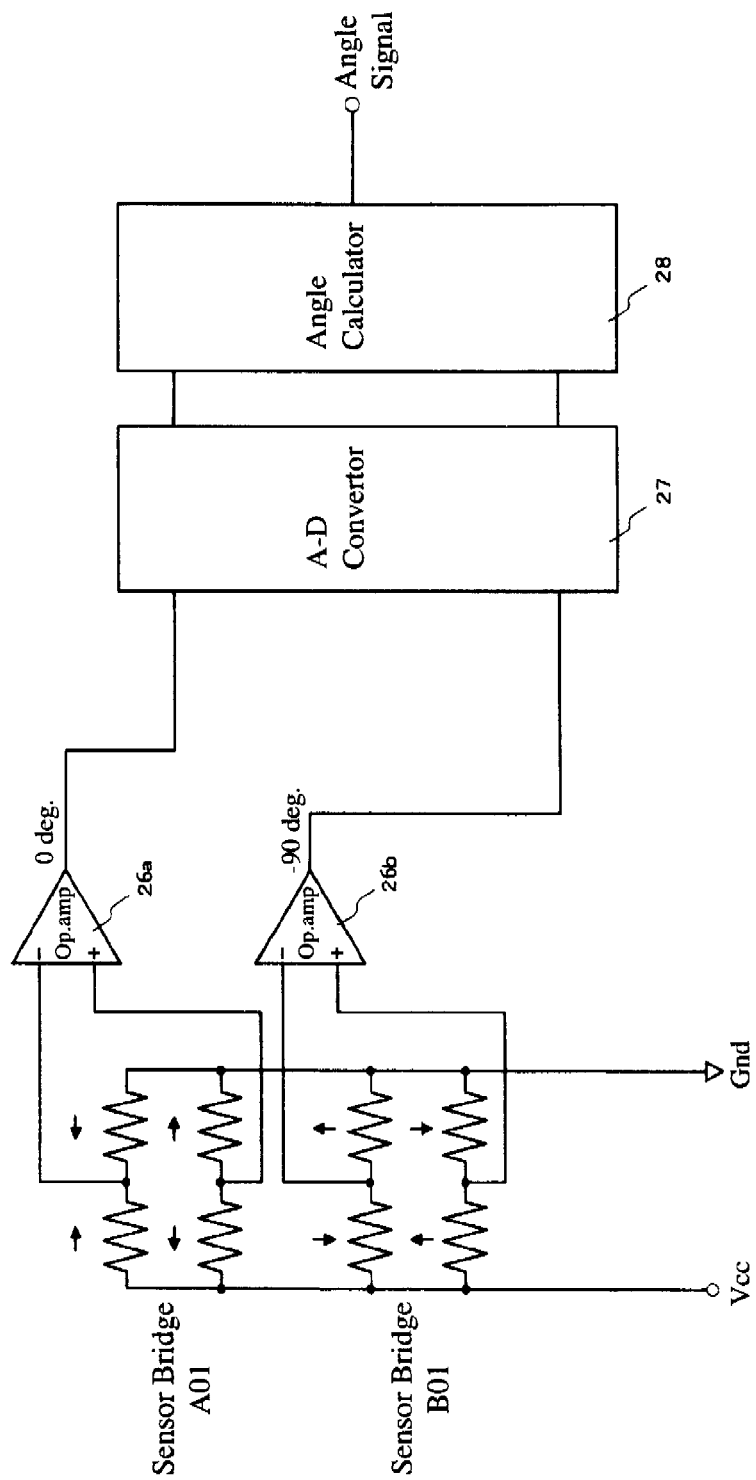
FIG. 32 is a view showing a circuit used in the rotation-angle-detecting apparatus of Example 4.

The magnet rotor 1 is constituted by a ring-shaped permanent magnet 1a formed by a bonded NdFeB magnet, a molded, soft-magnetic ring 1b composed of soft iron powder and a binder, and an S45C-made adaptor 1c for mounting the soft-magnetic ring to the shaft (rotation axis). The sensor device 12a comprised 8 spin-valve, giant-magnetoresistive devices constituting full bridge circuits as shown in FIG. 9(a), and 10 terminals 23 formed from a non-magnetic leadframe, and was resin-molded. The sensor device 12a on the circuit board 2c fixed to the housing 3 was connected to a cable 2d1 connected to a connector 2e, to constitute a circuit shown in FIG. 32. The housing 3 and the U-shaped angle 3a were made of non-magnetic SUS316. The U-shaped angle was shaped by pressing. The magnet rotor 1 had a radius $r_0$ of 40 mm, the distance $r_1$ from the circumferential surface of the magnet rotor 1 to the center of the sensor device was 3.5 mm, the magnet rotor 1 had a thickness t of 25 mm, and the housing 3 had a thickness T of 2 mm (formed from a 2-mm-thick plate by punching and drawing). Even when the distance $r_1$ was increased to 10 mm, the apparatus could be used without trouble. Even when the magnet rotor 1 had a thickness t of 5 mm, the apparatus could also be used without trouble.

This example used the same sensor device 12a as in Example 2. Though not shown, each spin-valve, giant-magnetoresistive device shown in FIG. 9(a) is produced by forming, on a non-magnetic substrate, a patterned laminate of a primer layer (Cr), a pinned layer (Co/Ru/Co), a Cu layer, a free layer (Co/NiFe) and a cap layer (Ta), a conductive electrode layer, and an insulating coating.

As shown in FIGS. 9(a) to 9(c), one sensor device has two bridge circuits. With DC voltage applied between Vcc and Gnd, the sensor devices placed in a magnetic field from the magnet rotor provide differential outputs between Vx1 and Vx2, and between Vy1 and Vy2. The differential outputs from the sensor bridges A01 and B01 are amplified by the differential amplifiers (operational amplifiers 26a, 26b) shown in FIG. 32, and converted to digital signals by an A-D converter 27. An angle calculator 28 calculates the digital signals to output an angle signal (electrical angle). Because the output signal of the sensor bridge A01 and the output signal of the sensor bridge B01 have a phase difference of 90°, when the output signal of A01 is a cosine signal, the output signal of B01 is a sine signal. Thus, the arctangent calculation of these signals provides an angle signal representing the rotation angle (absolute angle) of the magnet rotor in a range from 0° to 360°.

EXAMPLE 5

The above formulae (9-1)-(9-3) show that any effective magnetic flux density amplitude ratio smaller than $K_0$ can be obtained by inclining the sensor device by $\chi$. For instance, when $\chi_0$ is 60°, the effective magnetic flux density amplitude ratio $K_{eff}$ of $B\perp_{eff}$ to $B_{//eff}$ is 1.0. In this case, because the outputs of the sensor bridges A01, B01 in the sensor device are sinusoidal, the arctangent calculation does not generate angle error.

Figure 34A:
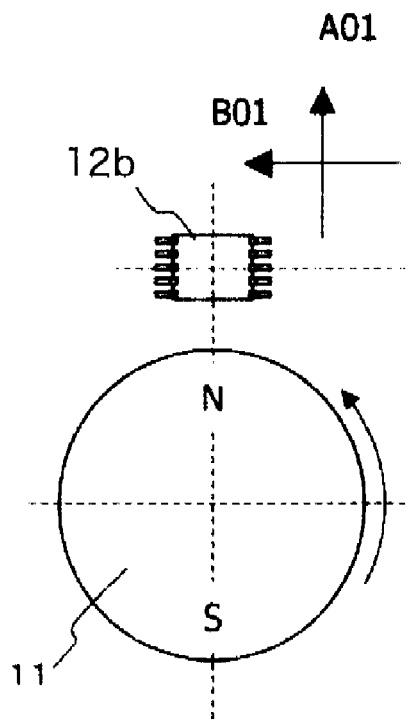
FIG. 34(*a*) is a schematic front view showing a further example of the rotation-angle-detecting apparatuses of Example 5.
Figure 34B:
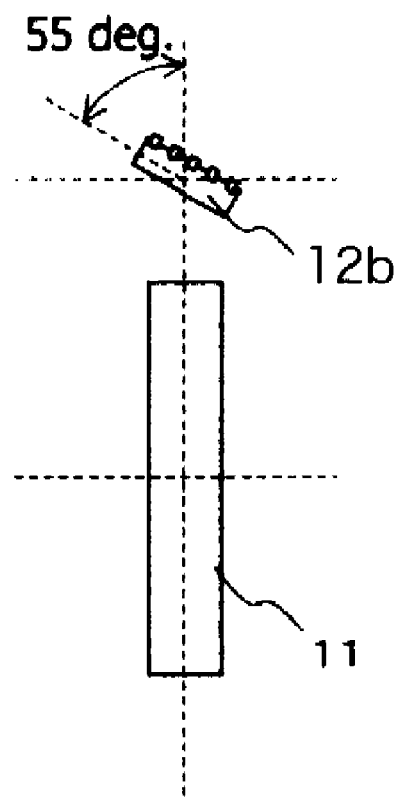
Figure 34C:
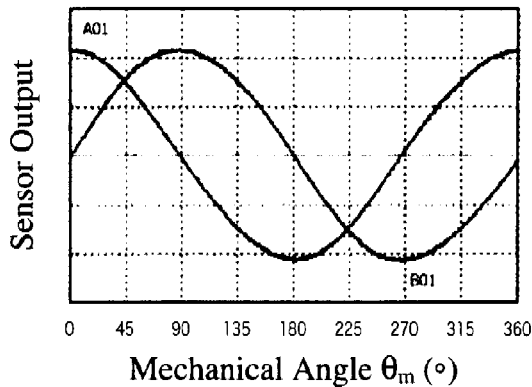
Figure 34D:
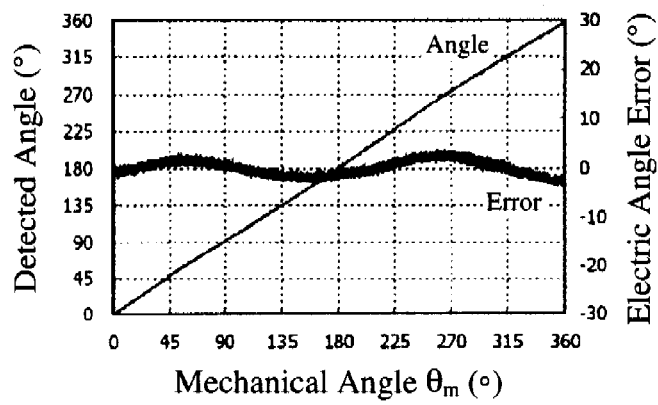

FIGS. 34(a) and 34(b) show a rotation-angle-detecting apparatus comprising a sensor device 12b placed near a circumferential surface of a two-pole magnet rotor 11. A cylindrical coordinate is used with the center and rotation axis of the magnet rotor 11 as an origin and a Z-axis, respectively. The disc-shaped permanent magnet 11 had a diameter $2r_0$ of 26 mm and a thickness (axial thickness) t of 8 mm, and the distance $r_0+r_1$ from the Z-axis to the center of the sensor device 12b was 23 mm. With the sensor device 12b (equivalent to the sensor device 12a) placed at a position of z=0 mm and at $\chi$=55°, the magnet rotor 11 rotatable relative to the sensor device 12b was rotated to obtain the graphs of FIGS. 34(c) and 34(d). In the rotation-angle-detecting apparatus shown in FIGS. 33(a) and 33(b), the output of the sensor bridge X01 had a substantially trapezoidal waveform, and the output of the sensor bridge Y01 had a substantially triangular waveform, as shown in FIG. 33 (c). Under influence by these waveform deformations, the arctangent-operated signal was not a straight line, suffering as large angle error as ±20°, as shown in FIG. 33(d). On the other hand, in the rotation-angle-detecting apparatus shown in FIGS. 34(a) and 34(b), the output of each sensor bridge was substantially a cosine or sine wave as shown in FIG. 34 (c). Its angle error was about ±4°, much improved as compared with the structure shown in FIGS. 33(a) and 33(b). Although FIG. 34(a) does not depict a shaft for supporting the magnet, a shaft was disposed at the same position as the shaft 11c shown in FIG. 33(a) and rotated.

Figure 35:
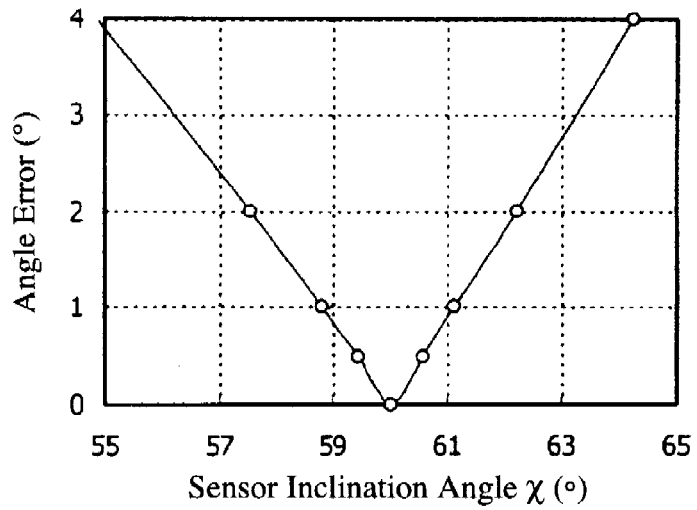
FIG. 35 is a graph showing the relation between a sensor inclination angle $\chi$ and the maximum angle error.

In the structure shown in FIGS. 34(a) and 34(b), in which a sensor device was placed near a circumferential side surface of the permanent magnet ($\phi=0°$), the maximum angle error was measured with the sensor inclination angle $\chi$ changing. The results are shown FIG. 35. In general, an angle error as small as about 1° means an accurate rotation angle measurement. A small angle error was obtained at a sensor inclination angle $\chi$, which was not limited to 60.0°, but as wide as from about 58.8° to 61.1°. It was thus verified that the apparatus permitted a wide variation of the sensor inclination angle $\chi$. Using the rotation-angle-detecting apparatus shown in FIGS. 34(a) and 34(b), the rotation angle of a motor was detected with high accuracy.

EXAMPLE 6

Figure 36A:
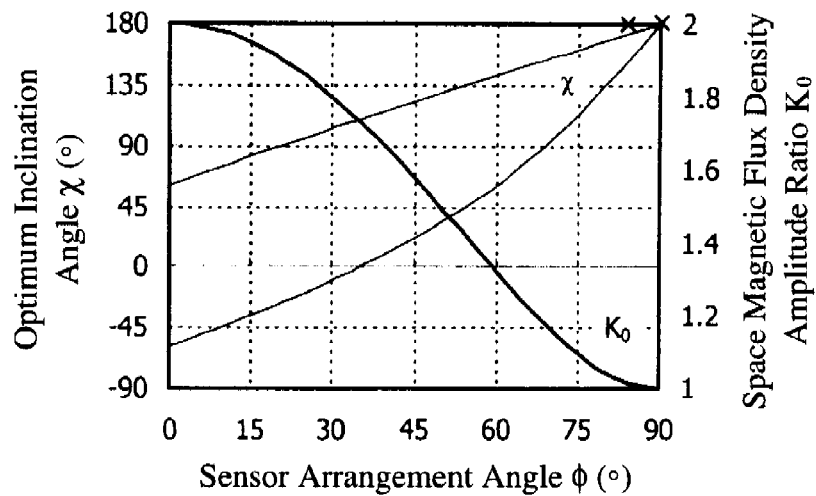
FIG. 36(*a*) is a graph showing the relation between a space magnetic flux density amplitude ratio $K_0$ and an optimum sensor inclination angle $\chi$ at each sensor arrangement angle $\phi$.

Although the sensor arrangement angle $\phi$ was 0° in Example 5, the present invention is not restricted thereto. FIG. 36(a) shows a space magnetic flux density amplitude ratio $K_0$ and the optimum sensor inclination angle $\chi$ at each sensor arrangement angle $\phi$. Why there are two optimum values of $\chi$ at the same $\phi$ is due to the fact that a magnetosensitive surface of a sensor bridge can be inclined positive and negative from an plane. FIG. 36(a) shows that $K_0$ is 1 to 2, not less than 1, at any $\phi$, suggesting that the rotation angle can be detected without error by inclining the sensor device by $\chi$, such that the effective magnetic flux density amplitude ratio $K_{eff}$ is 1. Accordingly, the present invention is free from restriction in the position of the sensor device, unlike the rotation-angle-detecting sensor described in JP 2002-303536 A, which should be opposing the shaft end of a magnet rotor such that a sensor center is positioned on the rotation axis.

A mark x ($\chi=180°$ and $\phi=90°$) at an upper right corner in FIG. 36(a) corresponds to the structure described in JP 2002-303536 A. Because the condition for obtaining this mark x needs a magnet supported in a cantilever manner, the magnet rotor cannot be supported at both ends. When a magnetic sensor is shifted only in a direction L perpendicular to the rotation axis in the structure described in JP 2006-010346 A, $\chi$ does not change, and the mark x shifts in parallel with the direction of $\phi$. Accordingly, a range on the line x-x (line connecting two marks x) is outside the present invention, outside the region shown by FIGS. 36 (b) and 36(c) and the region of Point 6 in FIG. 37 explained later. In a region overlapping the rotation axis of the magnet rotor, the sensor device cannot be arranged in a both-end support manner.

Figure 36B:
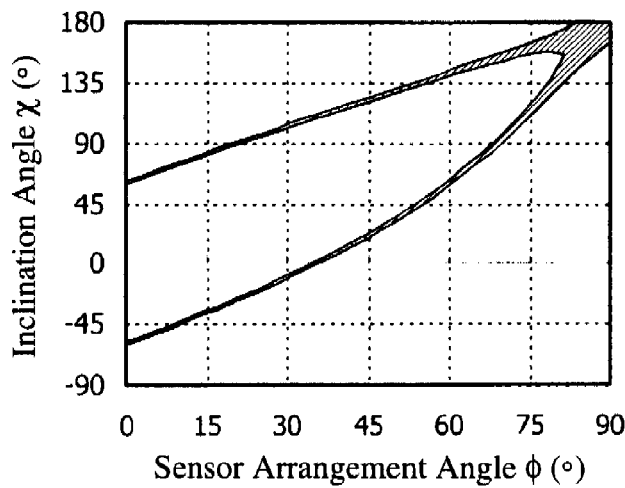
Figure 36C:
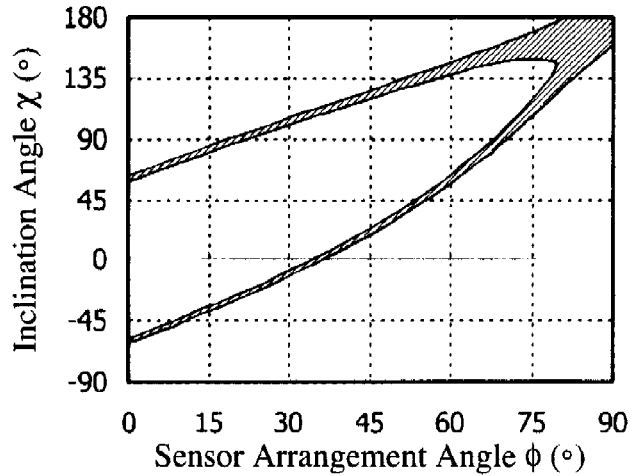

FIG. 36(a) shows the relation between the optimum sensor inclination angle $\chi$ and a sensor arrangement angle $\phi$. A hatched region in FIG. 36(b) shows a range of the sensor inclination angle $\chi$ and the sensor arrangement angle $\phi$ in which the angle error is within 1°. For instance, when the angle error is suppressed to 1° or less, a permissible range of the sensor inclination angle $\chi$ at each point is at least about 2-5°, and when the sensor inclination angle $\chi$ is fixed, a permissible range of the sensor arrangement angle $\phi$ is at least about 1-3°. A hatched region in FIG. 36(c) shows a range of the optimum sensor inclination angle $\chi$ and the sensor arrangement angle $\phi$ in which the angle error is within 2°. The permissible range expanded in a ribbon shape. Because the sensor inclination angle $\chi$ represents the inclination of a magnetosensitive surface relative to an X-Y plane, a sensor device turned upside down with respect to the X-Y plane is equivalent to that before turn (generating the same output). Accordingly, the sensor device at $\chi=0°$ is equivalent to that at $\chi=180°$. Thus, a region repeated every 180° is omitted.

FIG. 37 shows relations among angle errors, the effective magnetic flux density amplitude ratios $K_{eff}$, the optimum sensor inclination angles $\chi$, and the optimum sensor arrangement angles $\phi$ shown in FIGS. 36(a) to 36(c). FIG. 37 shows typical points in FIGS. 36(a) to 36(c), the sensor device being arranged relative to the two-pole magnet in six manners, such as the arrangement on a side surface ($\phi=0°$), the arrangement on an end surface ($\phi=90°$), the arrangement of a magnetosensitive surface in parallel with a rotation surface (X-Y plane) of the magnet, the arrangement of a magnetosensitive surface perpendicular to a rotation surface (X-Y plane) of the magnet, etc. In these arrangements, the sensor device can be easily mounted in the rotation-angle-detecting apparatus. With respect to each point, a point providing the smallest error, an angle range in which the angle error is within 1°, and an angle range in which the angle error is within 2° are shown. A combination of $\phi$ and $\chi$ in the above angle range provided a rotation-angle-detecting apparatus with high accuracy.

EXAMPLE 7

Figure 38A:
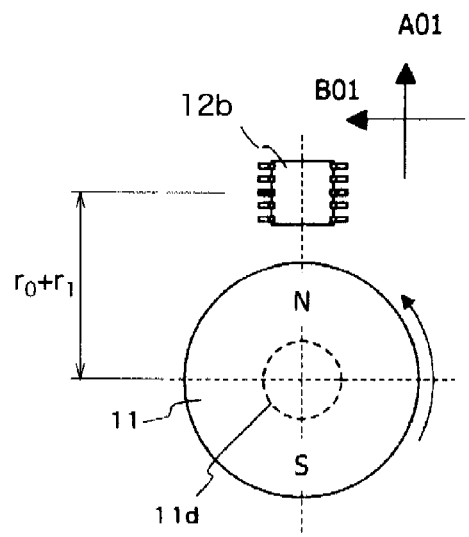
FIG. 38(*a*) is a schematic front view showing a further example of the rotation-angle-detecting apparatuses of Example 7.
Figure 38B:
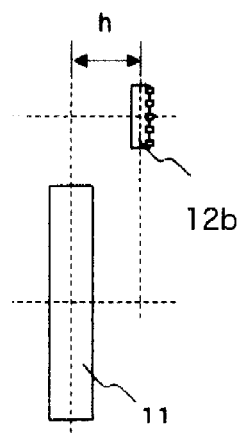
Figure 38C:
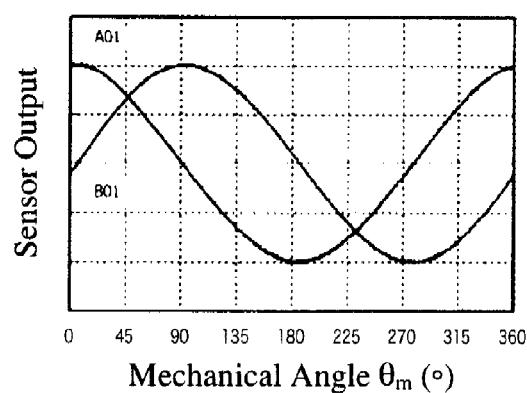
Figure 38D:
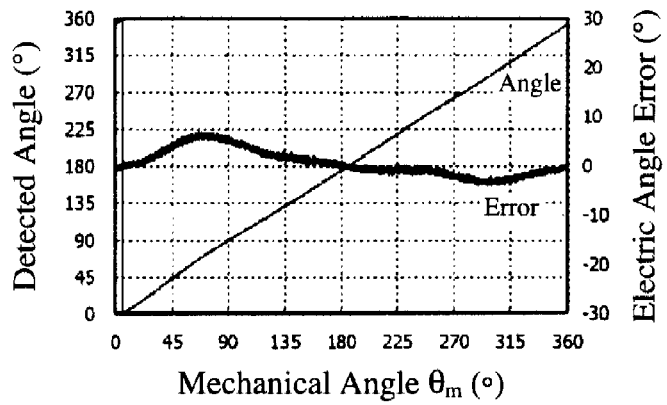

FIGS. 38(a) and 38(b) show a rotation-angle-detecting apparatus, in which a sensor device is arranged at a position of h=15 mm, such that its magnetosensitive surface is in parallel with a rotation surface of the magnet. FIGS. 38(c) and 38(d) show the rotation angle characteristics of this rotation-angle-detecting apparatus. The center-to-center distance $(r_0+r_1)$ between the disc-shaped permanent magnet 11 and the magnetosensitive surface of the sensor device 12b, which was projected onto the X-Y plane, was 23 mm. The disc-shaped magnet 11 was supported by a shaft 11d. A sensor arrangement angle $\phi$ in this rotation-angle-detecting apparatus was about 33°, near Point 3 (the optimum sensor arrangement angle $\phi_{best}=35.3°$, and the optimum sensor inclination angle $\chi_{best}=0°$) in the table of FIG. 37. Because of the deviation of 2° or more from the optimum sensor arrangement angle $\phi_{best}$, this rotation-angle-detecting apparatus suffered slight angle error, which was, however, much smaller than the result shown in FIG. 33(d) ($\phi=0°$, and $\chi=0°$) as shown in FIG. 38(d). Using this rotation-angle-detecting apparatus, the rotation angle of a motor was detected with high accuracy.

EXAMPLE 8

Figure 39A:
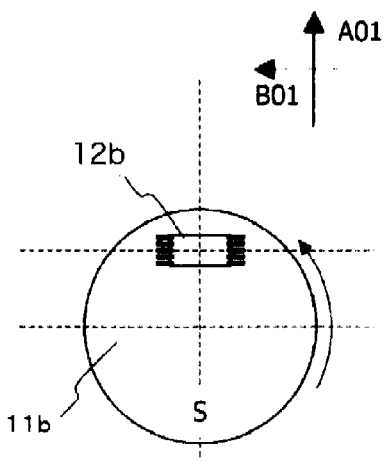
FIG. 39(*a*) is a schematic front view showing a further example of the rotation-angle-detecting apparatuses of Example 8.
FIG. 39(b) is a schematic side view showing a further example of the rotation-angle-detecting apparatuses of Example 8.
Figure 39B:
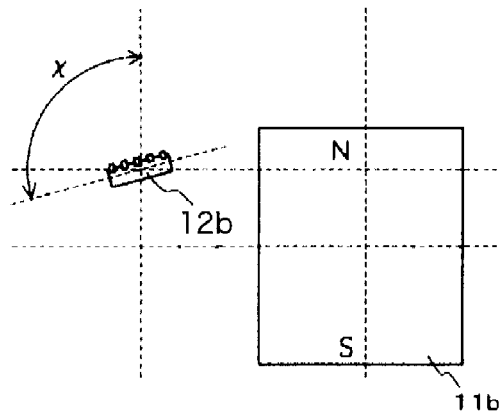

FIGS. 39(a) and 39(b) show a rotation-angle-detecting apparatus in which a sensor device 12b is placed near an end surface of a two-pole, cylindrical permanent magnet 11b. A cylindrical coordinate is used with the center and rotation axis of the cylindrical permanent magnet 11b as an origin and a Z-axis, respectively. The cylindrical permanent magnet 11b had a diameter $2r_0$ of 4 mm and a thickness (axial thickness) t of 4 mm. The distance $r_0+r_1$ from the Z-axis to a sensor device center (magnetosensitive surface center) was 1.5 mm, h was 5 mm, and $\chi$ was 105°. The same shaft as the shaft 11d in FIG. 38(a) was attached to an end surface of the cylindrical permanent magnet 11b to constitute a magnet rotor. Using this rotation-angle-detecting apparatus, the rotation angle of a motor was detected with high accuracy.

Figure 40A:
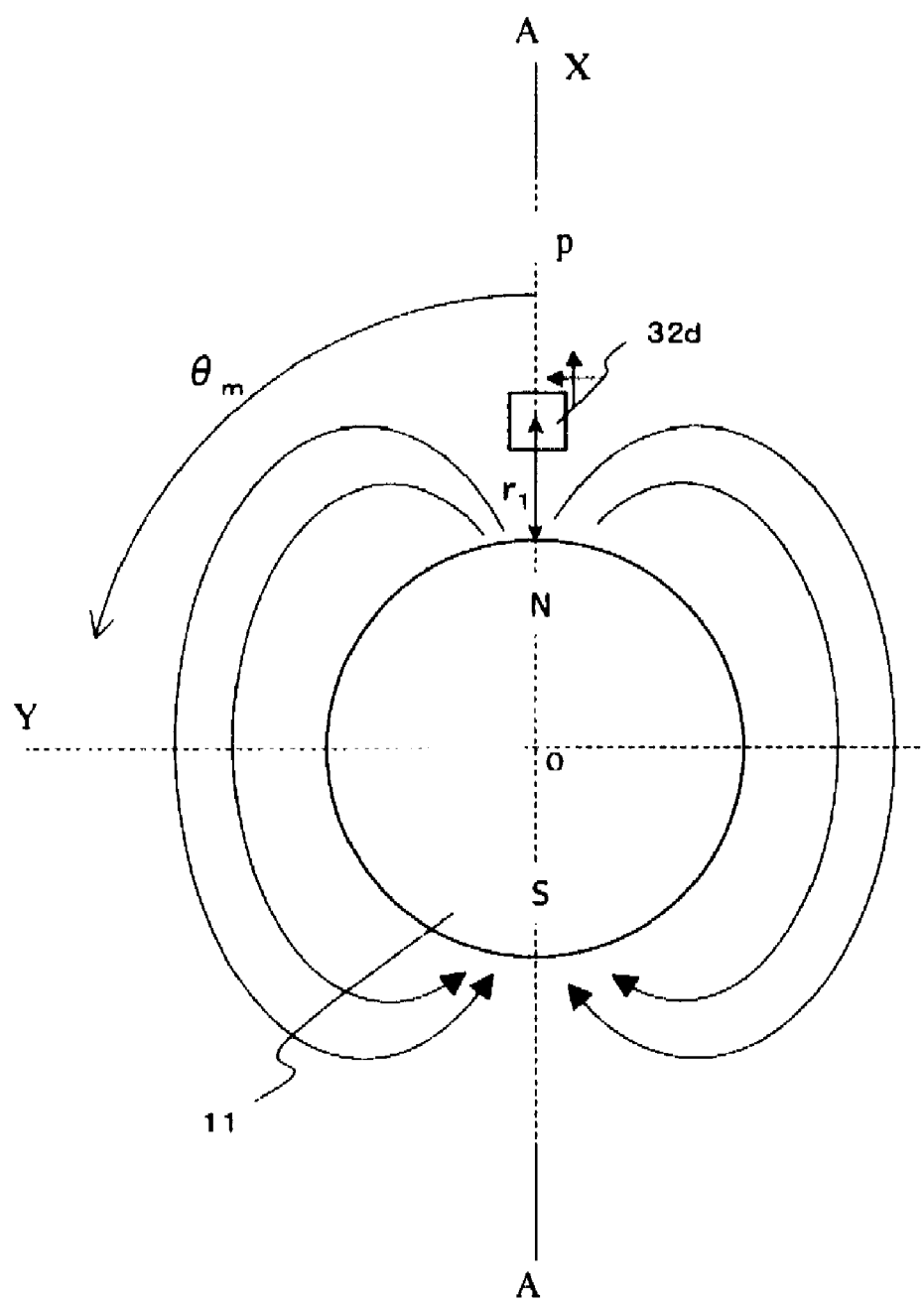
FIG. 40(a) is a schematic view for explaining the relation between a magnetic field generated by a two-pole magnet and the position of a sensor device.
Figure 40B:
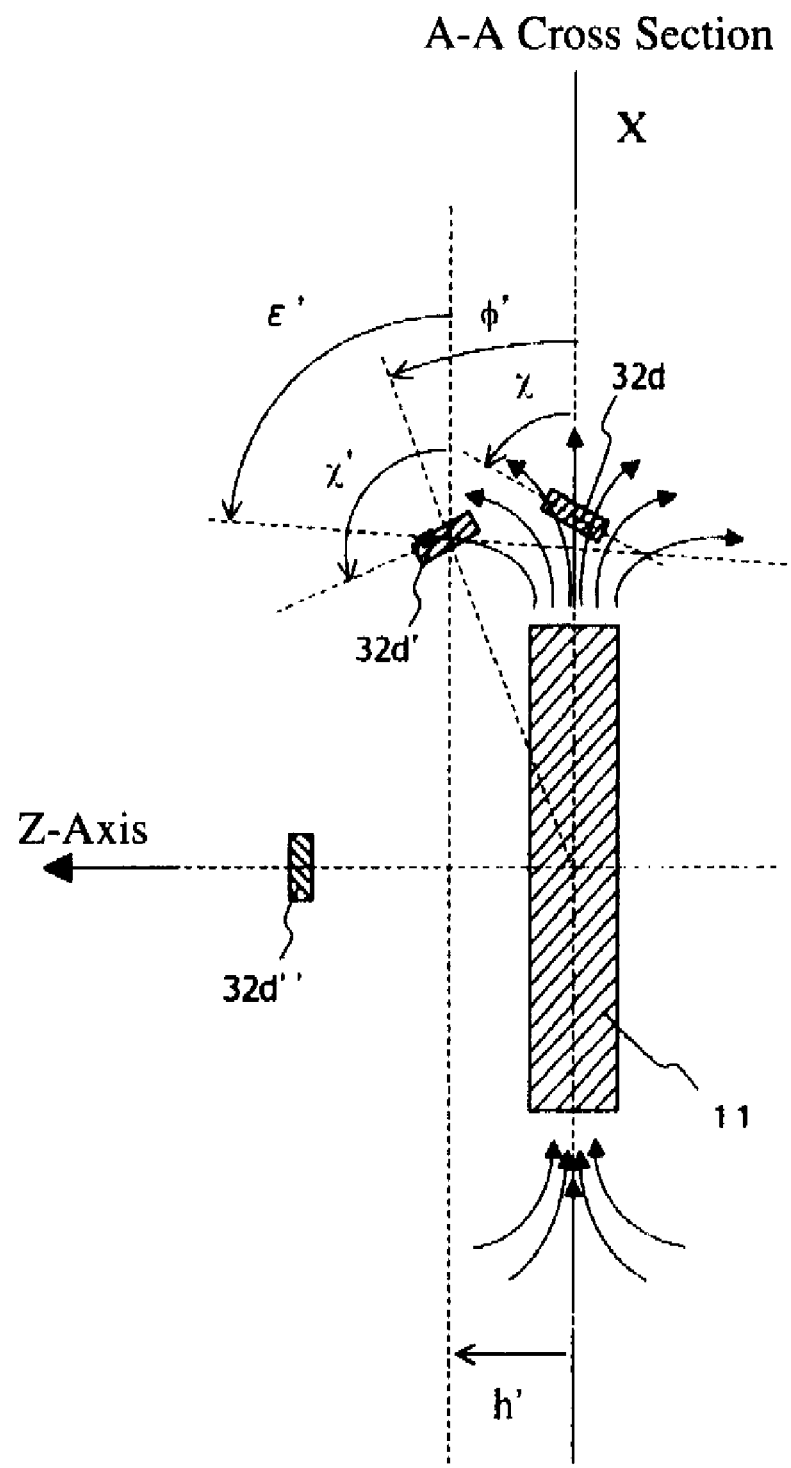
FIG. 40(b) is a cross-sectional view taken along the line A-A in FIG. 40(a).

FIGS. 40(a) and 40(b) show the positional relation between a sensor device and magnetic flux generated from a two-pole magnet in the present invention. In FIG. 40(a), curved arrows indicate magnetic flux lines from magnetic pole surfaces of a two-pole, disc-shaped magnet 11 in the magnet rotor. With the magnetization direction of the magnet aligned with an X-axis, a center of the magnetosensitive surface of the sensor device is separate from the magnet surface by $r_1$ on the X-axis. In this case, the sensor device 32d receives $B\perp$. $\theta_m$ corresponds to the rotation angle of the magnet rotor. For instance, when the disc-shaped magnet 11 in FIG. 40(a) is rotated by $\theta_m$ of 90°, the sensor device 32d receives $B_{//}$. The Z-axis passing through a center O of the disc-shaped magnet 11 perpendicularly to its rotation plane corresponds to the rotation axis of the magnet rotor.

FIG. 40(b) shows three arrangements of a sensor device. The sensor device 32d has a magnetosensitive surface inclined by $\chi$ from the X-Y plane, and the center of the magnetosensitive surface is positioned at Z=0. A sensor device 32d' is positioned at a sensor arrangement angle $\phi'$ and inclined by $\chi'$ from the X-Y plane, and separate from the rotation plane of the disc-shaped magnet by h' in a Z-axis direction. At the position of the sensor device 32d', the direction of magnetic flux is inclined by $\epsilon'$ from the X-axis. A sensor device 32d'' has a center positioned on the rotation axis of the disc-shaped magnet of the magnet rotor ($\phi''$=90°), and a magnetosensitive surface in parallel with the X-Y plane ($\chi''$=180°, and $\epsilon''$=180°). The thickness t of the magnet is measured in a Z-axis direction. The thickness center point of the magnet is an intersection of a center X-Y cross section with a center Z-axis, corresponding to the origin of an XYZ-axis system. Even when the disc-shaped magnet 11 is changed to a cylindrical magnet having a larger thickness t, a ring-shaped magnet having a center through-hole, or a rectangular plate magnet, the above definitions of angle, etc. can be used as long as it is a two-pole magnet.

Figure 41A:
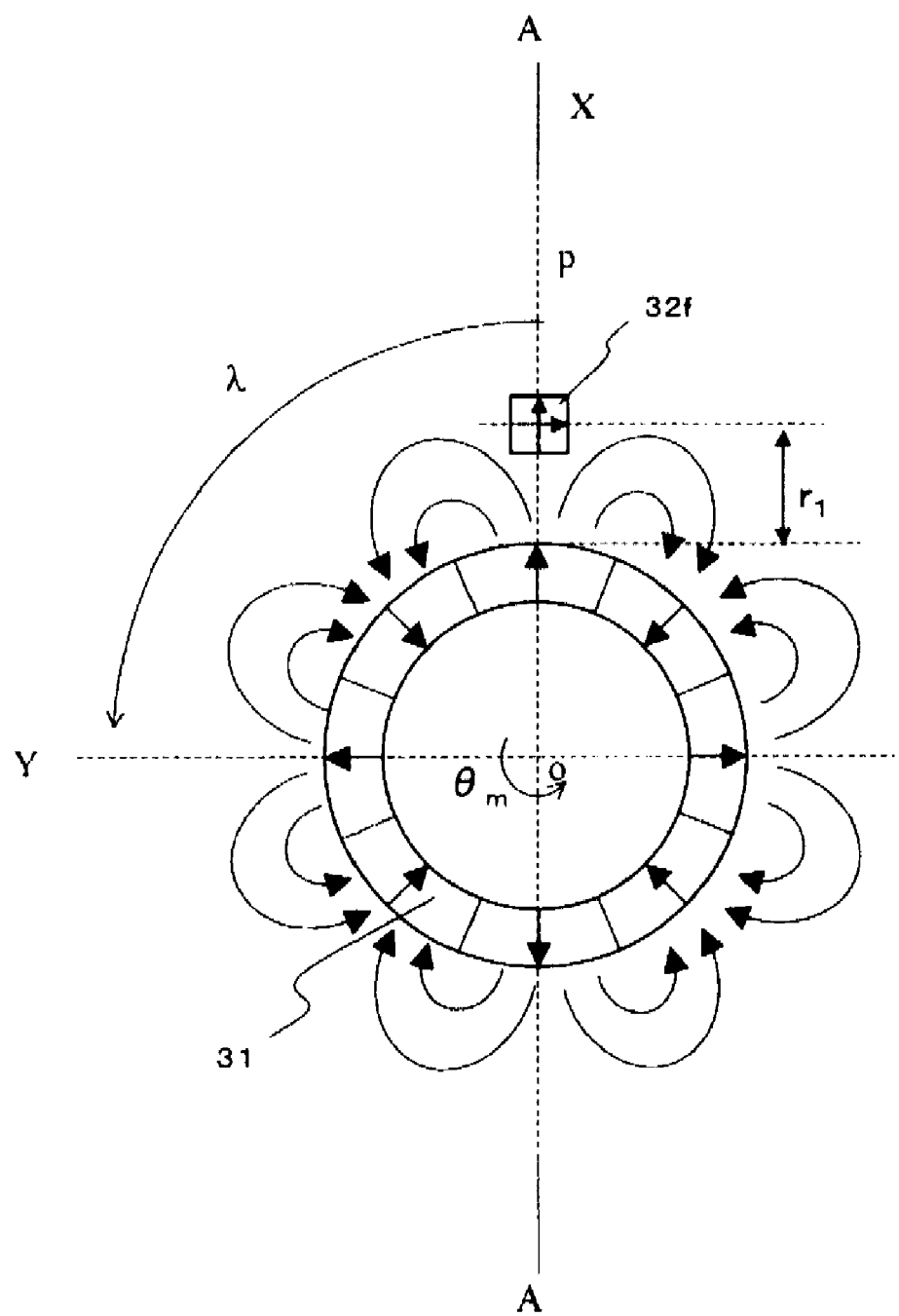
FIG. 41(a) is a schematic view for explaining the relation between a magnetic field generated by a magnet rotor having 4 or more magnetic poles and the position of a sensor device.
Figure 41B:
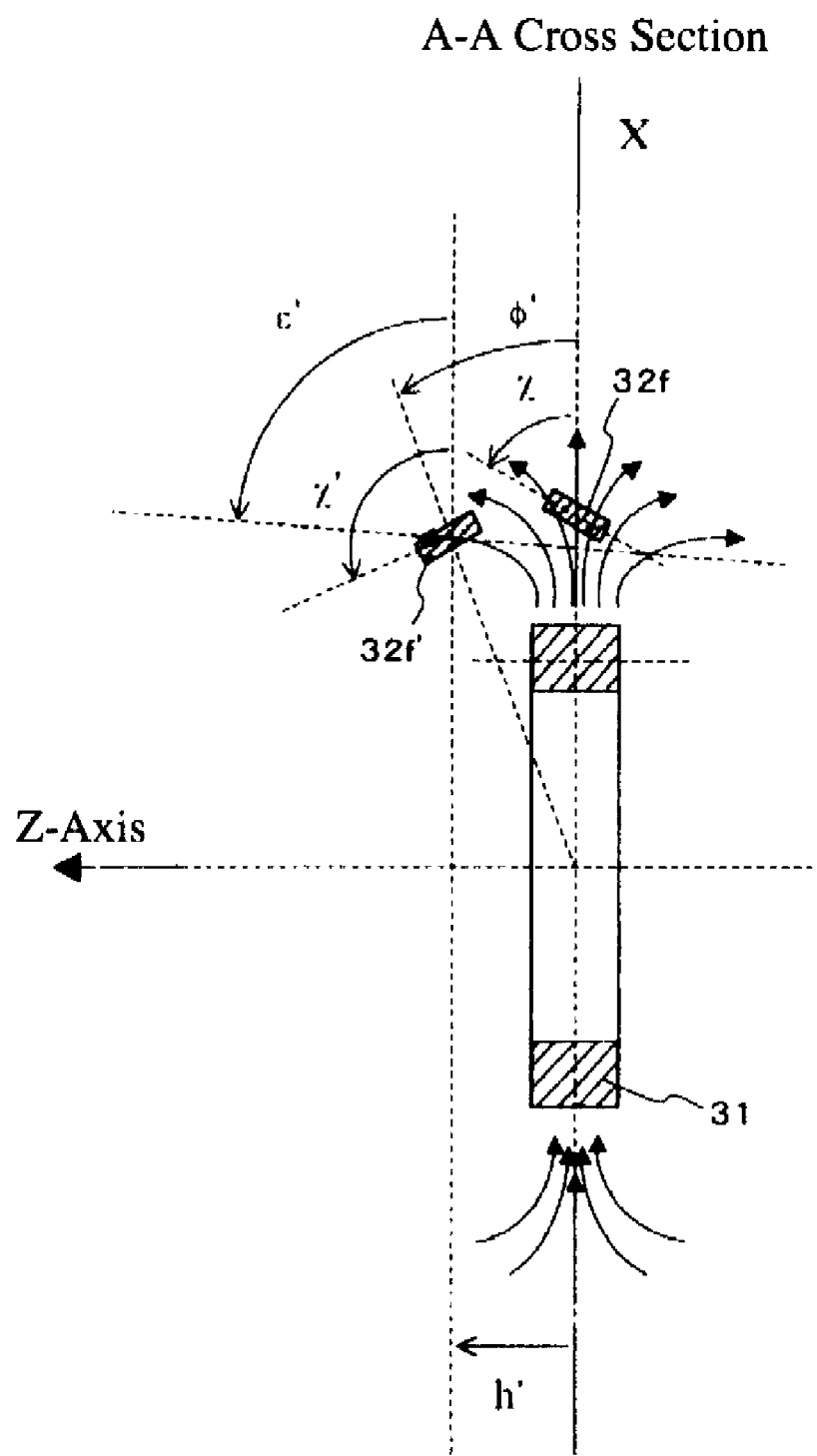
FIG. 41(b) is a cross-sectional view taken along the line A-A in FIG. 41(a).

FIGS. 41(a) and 41(b) show the positional relation of a sensor device and magnetic flux generated from the magnet rotor (having 4 or more poles) of the present invention. In FIG. 41(a), straight thick arrows represent magnetization directions at magnetic poles of a ring-shaped permanent magnet 31 in a magnet rotor, and curved thick arrows represent magnetic flux lines from magnetic pole surfaces. The sensor device 32f receives magnetic flux in an X-axis direction. $\lambda$ represents one wavelength (electrical angle of 360°) of a sine signal when a surface magnetic flux density distribution is measured, corresponding to a circumferential distance between a pair of magnetic pole surfaces on the ring-shaped permanent magnet 31. $r_1$ represents the distance between a center of the magnetosensitive surface of the sensor device 32f and a surface of the ring-shaped permanent magnet 31. In this case, the sensor device 32f receives magnetic flux in an X-axis direction. When the ring-shaped permanent magnet 31 is rotated by 90° by electrical angle in a circumferential direction, the sensor device 32f receives magnetic flux in a Y-axis direction. The Z-axis is an axis passing a center o of a hole of the ring-shaped permanent magnet 31 perpendicularly to the rotation plane of the magnet, corresponding to the rotation axis of the magnet rotor. $\theta_m$ is a mechanical angle representing the mechanical rotation of the magnet rotor.

FIG. 41(b) shows two arrangements of the sensor device (32f and 32f'). The definitions of a sensor inclination angle $\chi$, a sensor arrangement angle $\phi'$, a sensor inclination angle $\chi'$, h' and $\epsilon'$ are the same as shown in FIG. 40(b). The thickness center point of the magnet is an intersection of a center X-Y cross section with a center Z-axis, corresponding to the origin of an XYZ-axis system. A rotation shaft can be fixed to the hole of this ring magnet.

EXAMPLE 9

Figure 42A:
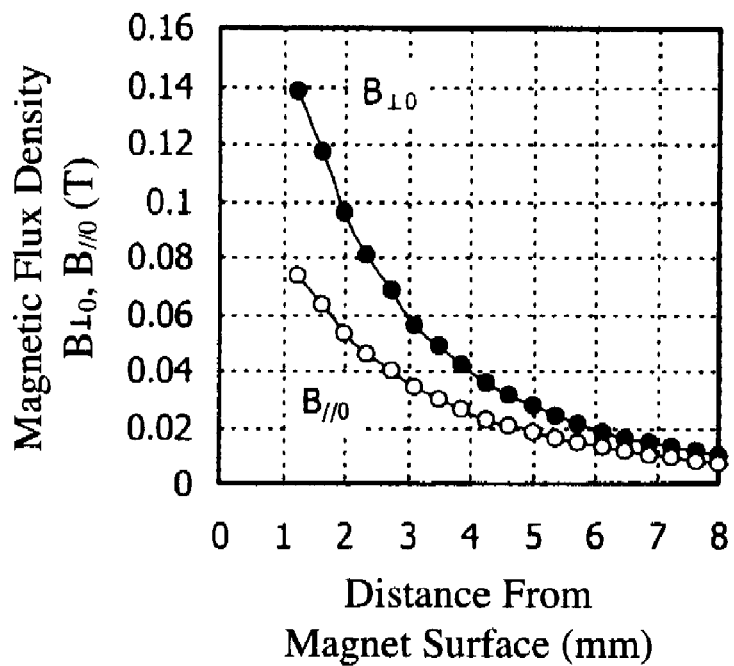
FIG. 42(a) is a graph showing the dependence of the magnetic flux density of a magnet rotor on distance.
Figure 42B:
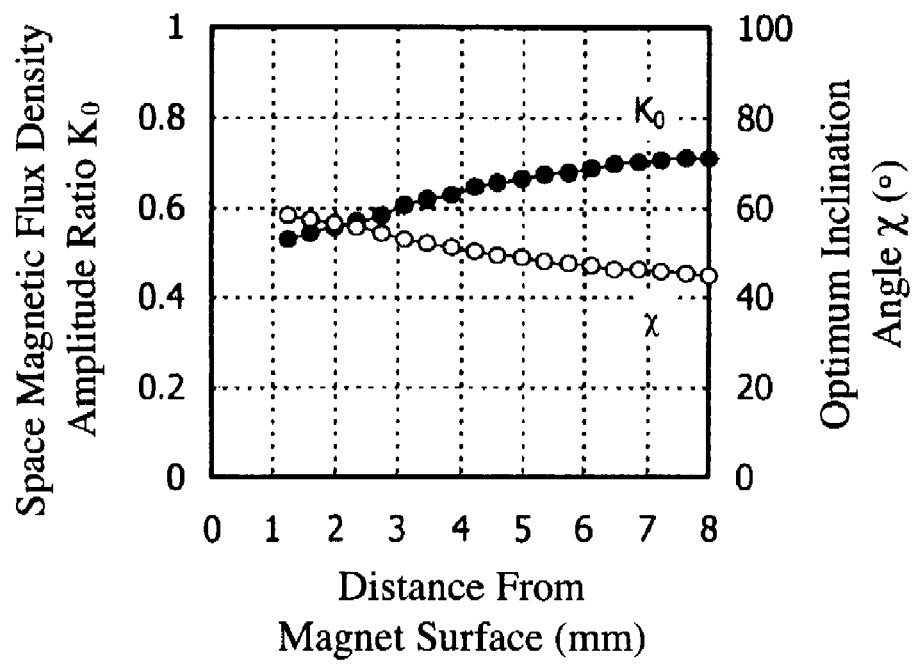
FIG. 42(b) is a graph showing the dependence of the space magnetic flux density amplitude ratio $K_0$ and preferred sensor inclination angle $\chi$ of a magnet rotor on distance.

Even the multi-pole magnet rotor exhibits the same effects as those of the two-pole magnet rotor. Their simulation and experiment will be explained below. FIG. 42(a) shows the dependence of magnetic flux densities $B\perp_0$ and $B_{//0}$ on the distance between a magnet and a sensor device, when a 12-pole magnet rotor having an inner diameter of 45 mm, an outer diameter of 50 mm, and a thickness (axial length) of 4 mm was used. FIG. 42(b) shows a space magnetic flux density amplitude ratio $K_0$ determined from FIG. 42(a), and the optimum inclination angle $\chi$ of the sensor device calculated from $K_0$. Thus obtained are two six-period, sinusoidal signals (with 90°-phase difference by electrical angle) corresponding to 12 magnetic poles. $B\perp_0$ is larger than $B_{//0}$ as in the two-pole magnet rotor. It has thus been found that when the sensor inclination angle is set at about 45-60°, the effective magnetic flux density amplitude ratio $K_{eff}$ can be 1.

Figure 43A:
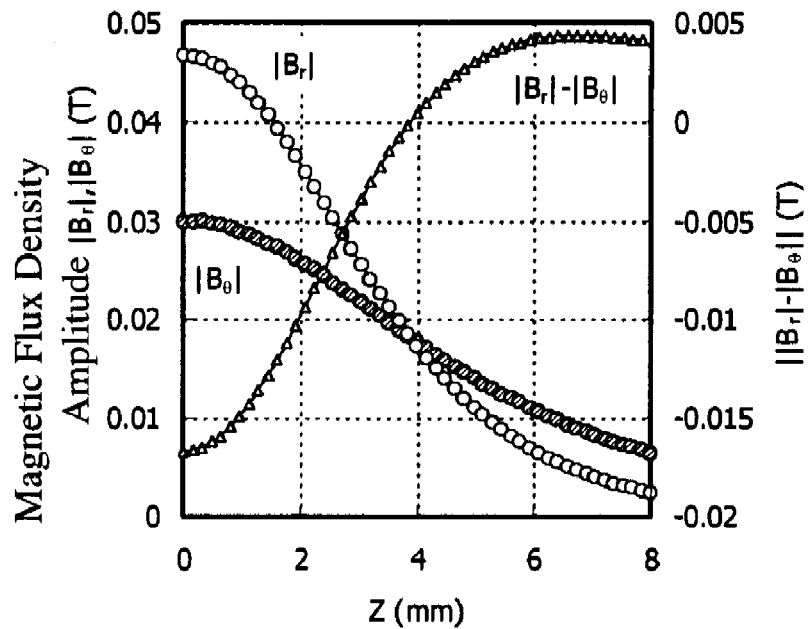
FIG. 43(a) is a graph showing the relation between a Z-direction distance and $|B_r|$ and $|B_\theta|$.
Figure 43B:
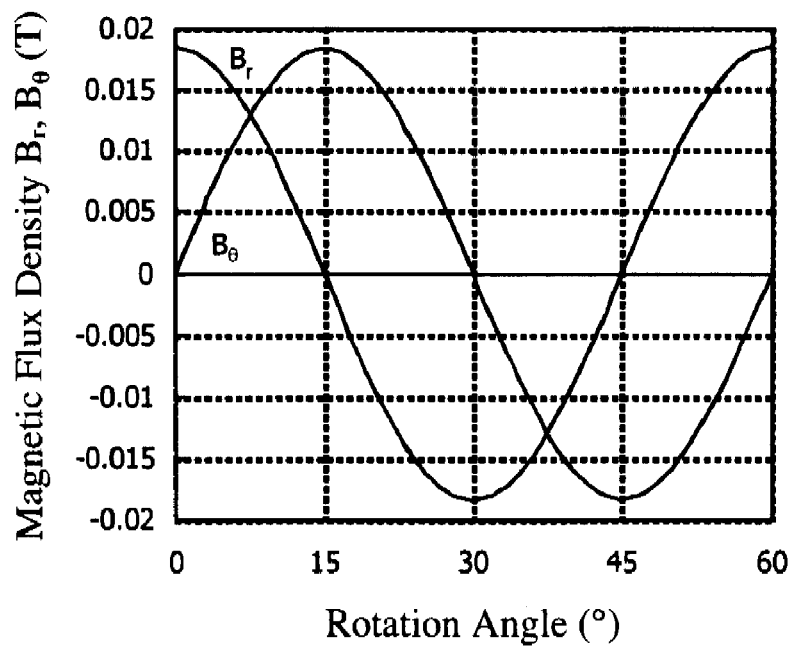
FIG. 43(b) is a graph showing the relation between a rotation angle and $|B_r|$ and $|B_\theta|$.

When the apparatus is used in applications in which the sensor device cannot be inclined, the same effects can be obtained by shifting the sensor device in parallel in a Z-direction. In this case, what is needed is to determine a Z-direction distance Z by simulation on a cylindrical coordinate system, with which the magnet has a magnetic flux density amplitude $|B_r|$ in a radial direction equal to a magnetic flux density amplitude $|B_\theta|$ in a rotational direction. FIG. 43(a) shows the dependence of the magnetic flux density amplitudes $|B_r|$ and $|B_\theta|$ on Z, when measured at a position of r=28 mm (3 mm from the magnet surface), using a magnet having an inner diameter of 45 mm, an outer diameter of 50 mm, and a thickness of 4 mm, and FIG. 43(b) shows the relation between a rotation angle and a magnetic flux density at Z of 3.9 mm. Although $|B_r|>|B_\theta|$ at Z=0, $|B_r|$ drastically decreased as Z increased, became equal to $|B_\theta|$ at Z of around 3.9 mm, and $|B_r|<|B_\theta|$ at Z>3.9. As shown in FIG. 43 (b), magnetic flux densities having the same amplitude in an r–$\theta$ plane and a phase difference of 90° were obtained.

EXAMPLE 10

Figure 44A:
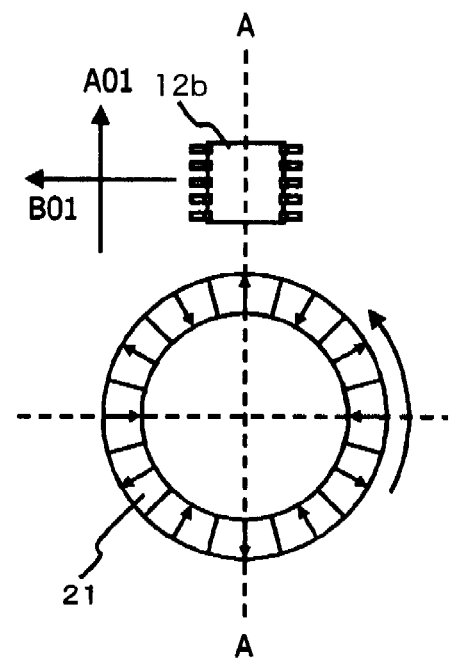
FIG. 44(a) is a schematic front view showing one example of the rotation-angle-detecting apparatuses of Example 10.
Figure 44B:
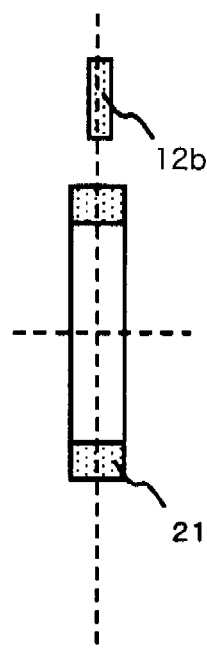
FIG. 44(b) is a cross-sectional view taken along the line A-A in FIG. 44(a).
Figure 44C:
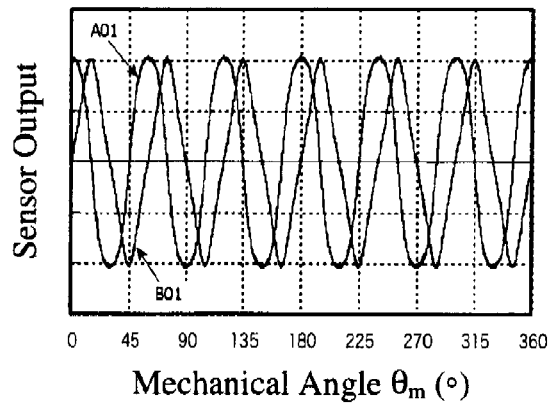
FIG. 44(c) is a graph showing the sensor output of the rotation-angle-detecting apparatus of FIG. 44(a).
Figure 44D:
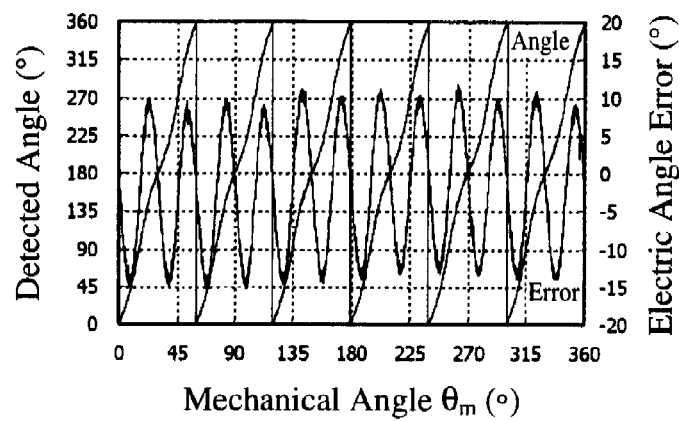
FIG. 44(d) is a graph showing angles detected by the rotation-angle-detecting apparatus of FIG. 44(a) and their errors.
Figure 44E:
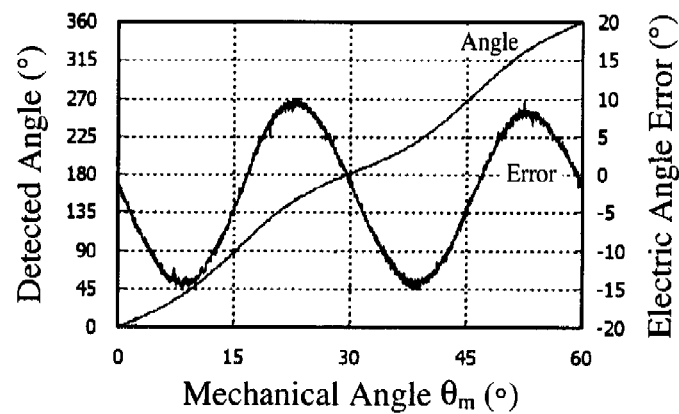
FIG. 44(e) is a graph showing angles detected by the rotation-angle-detecting apparatus of FIG. 44(a) and their errors in an enlarged manner.
Figure 45A:
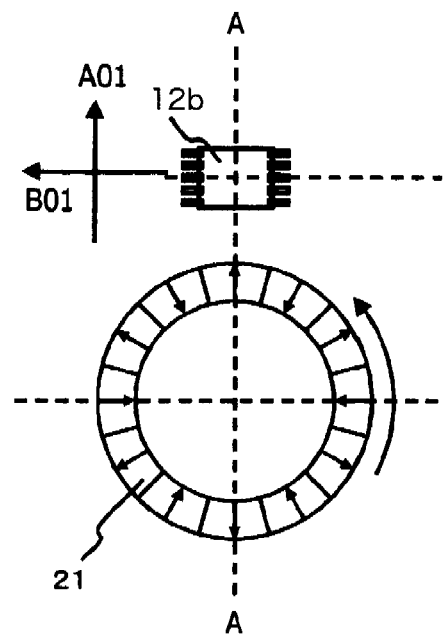
FIG. 45(a) is a schematic front view showing a further example of the rotation-angle-detecting apparatuses of Example 10.
Figure 45B:
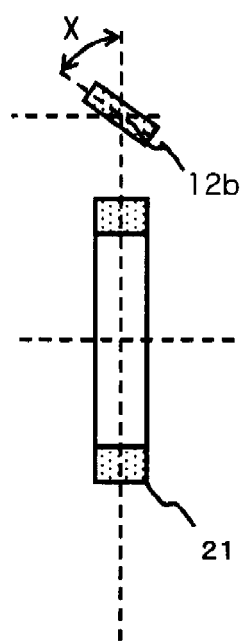
FIG. 45(b) is a cross-sectional view taken along the line A-A in FIG. 45(a).
Figure 45C:
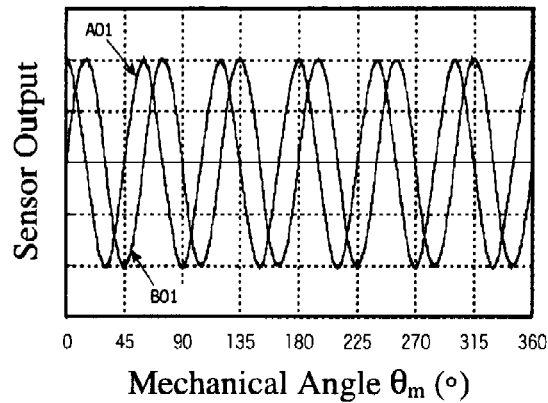
FIG. 45(c) is a graph showing the sensor output of the rotation-angle-detecting apparatus of FIG. 45(a).
Figure 45D:
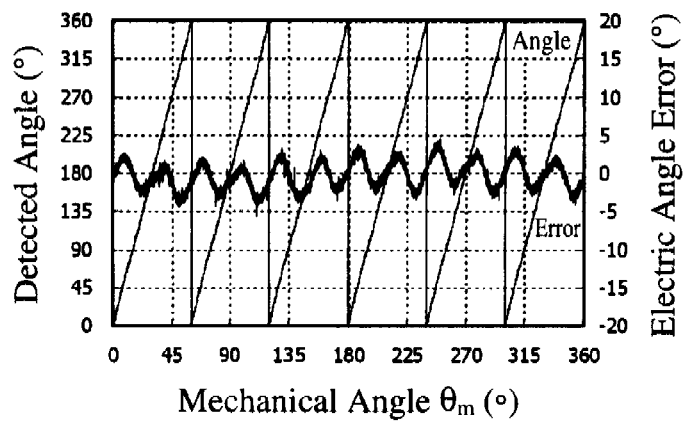
FIG. 45(d) is a graph showing angles detected by the rotation-angle-detecting apparatus of FIG. 45(a) and their errors.
Figure 45E:
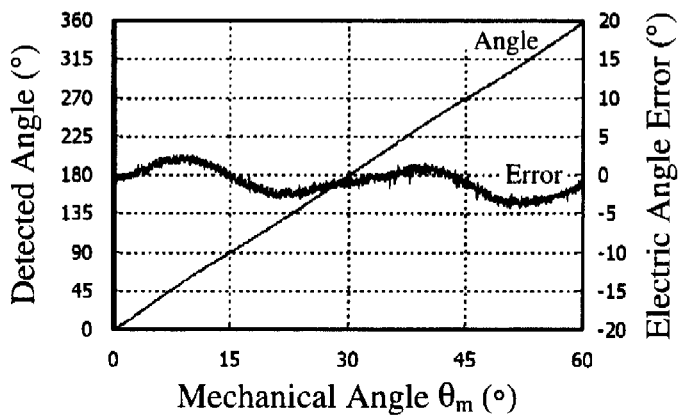
FIG. 45(e) is a graph showing angles detected by the rotation-angle-detecting apparatus of FIG. 45(a) and their errors in an enlarged manner.

FIGS. 44(a) and 44(b) show a still further example of rotation-angle-detecting apparatuses comprising a multi-pole magnet rotor 21 and a sensor device 12b. FIG. 44(b) is a cross-sectional view taken along the line A-A in FIG. 44(a). A shaft fixed to an inner surface of the magnet rotor 21 is not shown in the figure. The distance from an outer surface of the magnet rotor to a center of the sensor device was about 3 mm, and the sensor device was arranged at a sensor inclination angle $\chi$=0. The rotation-angle-detecting apparatus shown in FIGS. 45(a) and 45(b) is the same as shown in FIGS. 44(a) and 44(b), except that a sensor device was arranged at a sensor inclination angle $\chi$=55°.

Having 12 magnetic poles, the magnet rotor 21 generated an output of 6 periods when rotated by 360° (mechanical angle) in both apparatuses. In this case, the mechanical angle of 60° corresponds to one period of the electrical angle. In the rotation-angle-detecting apparatus ($\chi$=0°) shown in FIGS. 44(a) and 44(b), a sensor bridge A01 generated a trapezoidal wave, and a sensor bridge B01 generated a triangular wave, as in the rotation-angle-detecting apparatus shown in FIGS. 33(a) and 33(b), though different in the degree of deformation. As a result, the angle error in one period of an electrical angle was as extremely large as ±10° or more. In the rotation-angle-detecting apparatus ($\chi$=55°) shown in FIGS. 45(a) and 45(b), on the other hand, outputs from the sensor bridges were substantially a sine wave and a cosine wave, respectively, resulting in much improved electrical angle error of about ±3°. Using this rotation-angle-detecting apparatus, the rotation angle of a motor was detected with high accuracy.

Example 11

Figure 46A:
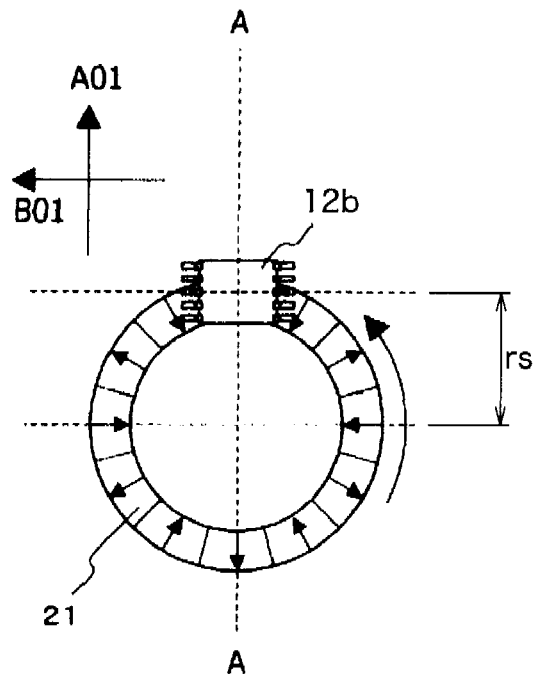
FIG. 46(a) is a schematic front view showing the rotation-angle-detecting apparatus of Example 11.
Figure 46B:
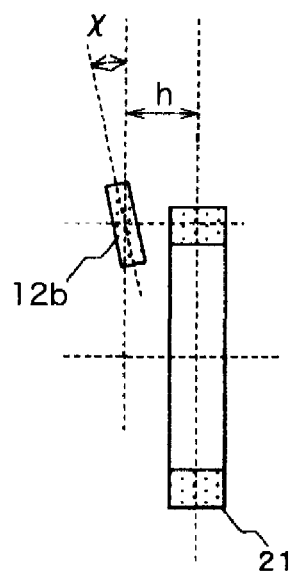
FIG. 46(b) is a cross-sectional view taken along the line A-A in FIG. 46(a).

FIGS. 46(a) and 46(b) show a still further example of rotation-angle-detecting apparatuses comprising a multi-pole magnet rotor 21 and a sensor device 12b. FIG. 46(b) is a cross-sectional view taken along the line A-A in FIG. 46(a). The magnet rotor 21 was a ring magnet having 12 magnetic poles on the circumferential surface, which had an inner diameter of 22.5 mm, an outer diameter of 25 mm, and a thickness t of 4 mm. Though not shown, a ring-shaped, soft-magnetic yoke as shown in FIG. 33(a) was fixed to an inner surface of the magnet rotor 21, and a shaft was fixed to a through-hole of the yoke. The distance rs from the rotation axis of the ring magnet to the center of the sensor device 12b (center of a magnetosensitive surface) was 24 mm, h was 4 mm, and $\chi$ was 24.6°. Using this rotation-angle-detecting apparatus, the rotation angle of a motor was detected with high accuracy.

EXAMPLE 12

Figure 47A:
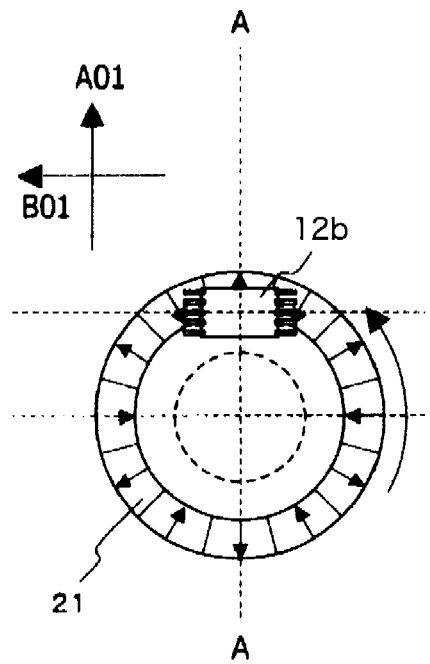
FIG. 47(a) is a schematic front view showing the rotation-angle-detecting apparatus Example 12.
Figure 47B:
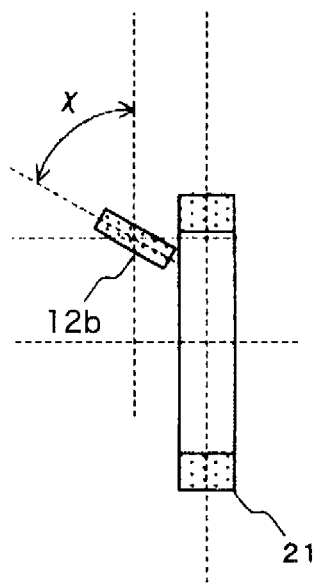
FIG. 47(b) is a cross-sectional view taken along the line A-A in FIG. 47(a).

FIGS. 47(a) and 47(b) show a still further example of rotation-angle-detecting apparatuses comprising a multi-pole magnet rotor 21 and a sensor device 12b. The distance from the rotation axis of the ring magnet to the center of the sensor device 12b (center of a magnetosensitive surface) was 22 mm, h was 4 mm, and $\chi$ was 61.6°. Using this rotation-angle-detecting apparatus, the rotation angle of a motor was detected with high accuracy.

Table 1 shows the optimum combination examples of the number of poles and shape of a magnet rotor, the distance from a magnet surface to a sensor device, an inclination angle $\chi$, an axis shift z, and a sensor arrangement angle $\phi$ determined from the z. These combinations provide the minimum angle error. Even when the inclination angle $\chi$ was changed from these arrangements by ±3°, high accuracy was kept with an angle error of 1° or less. Also, even when the sensor arrangement angle $\phi$ was changed by ±3°, high accuracy was kept with an angle error of 1° or less. Although Table shows cases where both inclination angle $\chi$ and sensor arrangement angle $\phi$ are plus, the same results were obtained when they were minus with the same absolute values. Namely, the same accuracy was obtained with suppressed angle error in the arrangements of $\chi$=−60° and $\chi$=−60°. The same relation was also achieved in the sensor arrangement angles of $\phi$=15° and $\phi$=−15°.

TABLE 1

| | Magnet | | Distance | Inclina- | | Sensor Arrange- |
|---|---|---|---|---|---|---|
| Number of Poles | Outer diameter (mm) | Thick-ness (mm) | (mm) From Magnet Surface | tion Angle $\chi$ (°) | Axis Shift (mm) | ment Angle $\phi$ (°) |
| 4 | 32 | 6 | 3 | 60 | 4.9 | 15 |
| 4 | 32 | 6 | 5 | 58 | 6.6 | 17 |
| 4 | 20 | 5 | 3 | 50 | 6.2 | 25 |
| 4 | 20 | 5 | 5 | 49 | 7 | 25 |
| 8 | 32 | 6 | 3 | 50 | 4.2 | 13 |
| 8 | 32 | 6 | 5 | 47 | 5.5 | 15 |
| 8 | 32 | 10 | 3 | 40 | 5.8 | 17 |
| 8 | 32 | 10 | 5 | 42 | 6.3 | 17 |
| 12 | 50 | 4 | 3 | 54 | 3.5 | 7 |
| 12 | 50 | 4 | 5 | 48 | 4.5 | 8.4 |
| 12 | 50 | 8 | 3 | 43 | 4.8 | 9.6 |
| 12 | 50 | 8 | 5 | 45 | 5.7 | 10.6 |
| 16 | 116 | 6 | 3 | 57 | 4.8 | 4.5 |
| 16 | 116 | 6 | 6 | 53 | 6.8 | 6 |

Figure 48:
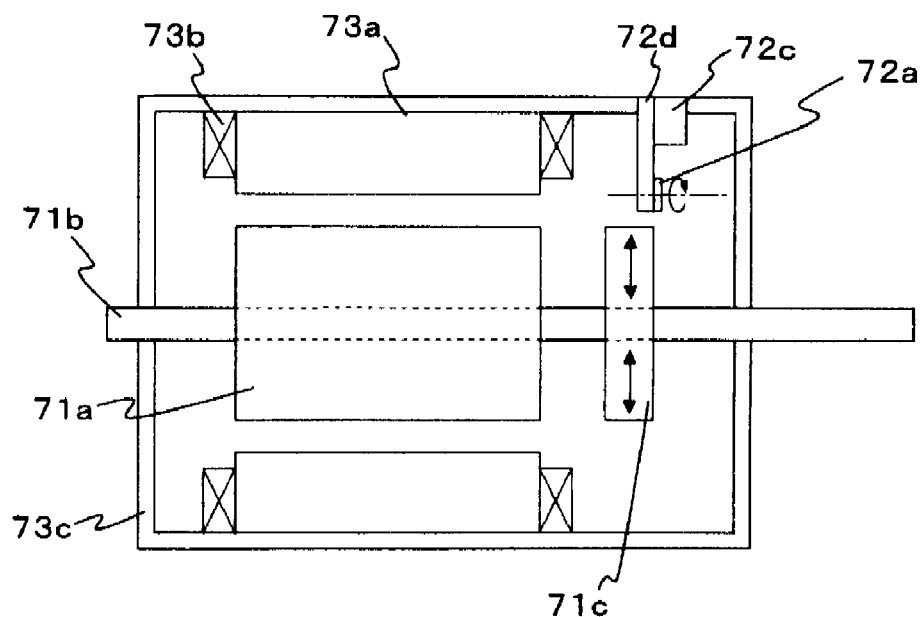
FIG. 48 is a schematic cross-sectional view showing a still further example of the rotating machines of the present invention.

FIG. 48 schematically shows a rotating machine comprising the rotation-angle-detecting apparatus of the present invention. A sensor device 72a was shifted in a Z-axis direction. This rotating machine is a motor comprising a frame 73c, a 12-pole permanent magent rotor 71a having a shaft 71b as a center axis, and a stator 73a fixed to an inner surface of the frame 73c and having a stator coil 73b. The shaft 71b are rotatably supported by the frame 73c via bearings (not shown). A magnet rotor 71c was concentrically fixed to the shaft 71b adjacent to the rotor 71a. The sensor device 72a was fixed to the frame 73c via a support 72d. The sensor device 72a detected the direction of magnetic flux from the magnet rotor 71c, and its output was treated in a calculation circuit 72c to output the rotation angle of the magnet rotor 71c.

Figure 49:
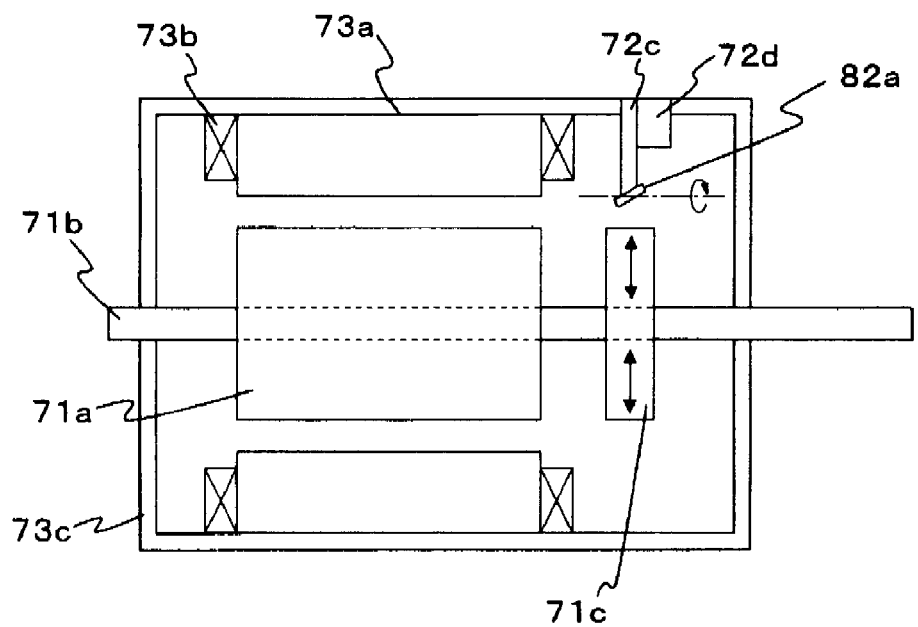
FIG. 49 is a schematic cross-sectional view showing a still further example of the rotating machines of the present invention.

FIG. 49 schematically shows another rotating machine Comprising the rotation-angle-detecting apparatus of the present invention. This rotating machine is the same as shown in FIG. 48 except that the sensor Device 82a was inclined by $\chi$ at z=0.

EFFECT OF THE INVENTION

The rotation-angle-detecting appartus of the present invention has high accuracy in decting a rotaion angle, suitable for rotating machines that should be made smaller, such as driving motors used in hybrid vehicles, etc.

What is claimed is:

1. A rotation-angle-detecting apparatus comprising a magnet rotor having 4 or more magnetic poles on the surface, and first and second sensor devices for detecting the direction of magnetic flux from said magnet rotor;
   said first sensor device containing sensor bridges X01 and Y01, in which the magnetization directions of pinned layers are perpendicular to each other;
   said second sensor device containing sensor bridges X02 and Y02, in which the magnetization directions of pinned layers are perpendicular to each other;
   each sensor bridge X01, Y01, X02, Y02 being a full bridge of spin-valve, giant-magnetoresistive devices each having a pinned layer and a free layer, the magnetization direction of said pinned layer being fixed, and the magnetization direction of said free layer rotating depending on a magnetic field direction;
   adjacent spin-valve, giant-magnetoresistive devices in said full bridge having pinned layers whose magnetization directions are antiparallel;
   said sensor bridges Y01 and Y02 being arranged such that the magnetization directions of their pinned layers are along the circumferential direction of said magnet rotor;
   said sensor bridges X01 and X02 being arranged such that the magnetization directions of their pinned layers have a phase difference of 90° or 90° ±180n° by electric angle, wherein n is an integer; and
   voltage being applied to said full bridges to obtain differential outputs each corresponding to an angle between the magnetization direction of said pinned layer and the magnetization direction of said free layer, and an angle signal being obtained based on said differential outputs.

2. The rotation-angle-detecting apparatus according to claim 1, which comprises a first sensor device group comprising said first and second sensor devices, and a second sensor device group comprising other sensor devices each having the same structure as that of the sensor device in said first sensor device group, the relative arrangement of the other sensor devices being the same as in said first sensor device group; and said first sensor device group and said second sensor device group being separate from each other by 180n° by electrical angle, wherein n is an integer.

3. The rotation-angle-detecting apparatus according to claim 1, wherein signals from said sensor bridges X01, Y01, X02 and Y02 are input to separate differential amplifiers to obtain four signals, which are calculated to output an error detection signal.

4. The rotation-angle-detecting apparatus according to claim 1, wherein signals from said sensor bridges X01, Y01, X02 and Y02 are input to separate differential amplifiers to obtain four signals, which are averaged to obtain a fifth signal, which is compared with a predetermined DC voltage to determine their difference, based on which an error detection signal is output.

5. A rotating machine comprising the rotation-angle-detecting apparatus recited in claim 1.

6. A rotation-angle-detecting apparatus comprising a magnet rotor having 2 or more magnetic poles on the surface, and first and second sensor devices for detecting the direction of magnetic flux from said magnet rotor;
the distance between the center of said first sensor device and the rotation axis of said magnet rotor being larger than the radius of said magnet rotor;
the distance between the center of said second sensor device and the rotation axis of said magnet rotor being larger than the radius of said magnet rotor;
said first sensor device containing sensor bridges X01 and Y01, in which the magnetization directions of pinned layers are perpendicular to each other;
said second sensor device containing sensor bridges X02 and Y02, in which the magnetization directions of pinned layers are perpendicular to each other;
each sensor bridge X01, Y01, X02, Y02 being a bridge circuit of spin-valve, giant-magnetoresistive devices each having a pinned layer and a free layer, the magnetization direction of said pinned layer being fixed, and the magnetization direction of said free layer rotating depending on a magnetic field direction;
the magnetization directions of pinned layers in electrically adjacent spin-valve, giant-magnetoresistive devices in said sensor bridges X01, Y01, X02 and Y02 being antiparallel;
a plane including the magnetization direction of the pinned layer in each sensor bridge X01, Y01, X02, Y02 being inclined from the rotation axis of said magnet rotor; and
voltage being applied to said sensor bridges X01, Y01, X02 and Y02 to obtain outputs each corresponding to an angle between the magnetization direction of said pinned layer and the magnetization direction of said free layer, and an angle signal being obtained based on said outputs.

7. A rotation-angle-detecting apparatus comprising a magnet rotor having 2 or more magnetic poles on the surface, and first and second sensor devices for detecting the direction of magnetic flux from said magnet rotor;
the distance between the center of said first sensor device and the rotation axis of said magnet rotor being larger than the radius of said magnet rotor;
the distance between the center of said second sensor device and the rotation axis of said magnet rotor being larger than the radius of said magnet rotor;
said first sensor device containing sensor bridges X01 and Y01, in which the magnetization directions of pinned layers are perpendicular to each other;
said second sensor device containing sensor bridges X02 and Y02, in which the magnetization directions of pinned layers are perpendicular to each other;
each sensor bridge X01, Y01, X02, Y02 being a bridge circuit of spin-valve, giant-magnetoresistive devices each having a pinned layer and a free layer, the magnetization direction of said pinned layer being fixed, and the magnetization direction of said free layer rotating depending on a magnetic field direction;
the magnetization directions of pinned layers in electrically adjacent spin-valve, giant-magnetoresistive devices in said sensor bridges X01, Y01, X02 and Y02 being antiparallel;
the centers of said first and second sensor devices being separate from a plane passing the thickness center position of said magnet rotor and perpendicular to the rotation axis of said magnet rotor in a rotation axis direction; and
voltage being applied to said sensor bridges X01, Y01, X02 and Y02 to obtain outputs each corresponding to an angle between the magnetization direction of said pinned layer and the magnetization direction of said free layer, and an angle signal being obtained based on said outputs.

8. A rotation-angle-detecting apparatus comprising a magnet rotor having two magnetic poles, and a sensor device for detecting the direction of magnetic flux from said magnet rotor;
said sensor device having a magnetosensitive surface comprising pluralities of spin-valve, giant-magnetoresistive devices each having a pinned layer and a free layer, the magnetization direction of said pinned layer being fixed, and the magnetization direction of said free layer rotating depending on a magnetic field direction; and
said sensor device being arranged relative to said magnet rotor to cause the magnetic flux to cross said magnetosensitive surface, such that magnetic flux density components perpendicular to each other on said magnetosensitive surface have the same amplitude.

9. The rotation-angle-detecting apparatus according to claim 8,
said sensor device being arranged, such that $\phi$ and $\chi$ are in a range that:
(a) $\phi$ is $-1.6°$ to $1.5°$, and $\chi$ is $-57.6°$ to $-62.2°$,
(b) $\phi$ is $-1.5°$ to $1.6°$, and $\chi$ is $57.6°$ to $62.2°$,
(c) $\phi$ is $33.8°$ to $36.6°$, and $\chi$ is $-2.7°$ to $3.1°$,
(d) $\phi$ is $19.2°$ to $22.8°$, and $\chi$ is $87.4°$ to $92.4°$,
(e) $\phi$ is $67.1°$ to $70.8°$, and $\chi$ is $84.2°$ to $97.7°$, or
(f) $\phi$ is $81.4°$ to $98.7°$, and $\chi$ is $158.6°$ to $201.2°$,
wherein $\phi$ is a sensor arrangement angle between a line connecting the thickness center point of said magnet rotor and the center of the magnetosensitive surface of said sensor device, and a plane passing the thickness center point of said magnet rotor and perpendicular to the rotation axis, and $\chi$ is a sensor inclination angle between a plane passing the thickness center point of said magnet rotor and perpendicular to the rotation axis and said magnetosensitive surface;
said sensor device containing sensor bridges A01 and B01, in which the magnetization directions of pinned layers are perpendicular to each other;
each sensor bridge A01, B01 being a bridge circuit of said spin-valve, giant-magnetoresistive devices;
the magnetization directions of pinned layers in electrically adjacent spin-valve, giant-magnetoresistive devices in said bridge circuit being antiparallel; and
voltage being applied to said sensor bridges A01 and B01 to obtain outputs each corresponding to an angle between the magnetization direction of said pinned layer and the magnetization direction of said free layer, and an angle signal being obtained based on said outputs.

10. A rotation-angle-detecting apparatus comprising a magnet rotor having two magnetic poles, and a sensor device for detecting the direction of magnetic flux from said magnet rotor;

said sensor device having a magnetosensitive surface comprising pluralities of spin-valve, giant-magnetoresistive devices each having a pinned layer and a free layer, the magnetization direction of said pinned layer being fixed, and the magnetization direction of said free layer rotating depending on a magnetic field direction; and said sensor device being arranged relative to said magnet rotor, such that the amplitude ratio ($K_{eff}=B\perp_{eff0}/B_{//eff0}$) of effective magnetic flux density components perpendicular to each other on said magnetosensitive surface is 1 at a position meeting the condition of a space magnetic flux density amplitude ratio $K_0=B\perp_0/B_{//0}\neq 1$.

11. A rotation-angle-detecting apparatus comprising a magnet rotor having 4 or more magnetic poles, and a sensor device for detecting the direction of magnetic flux from said magnet rotor;

said sensor device having a magnetosensitive surface comprising pluralities of spin-valve, giant-magnetoresistive devices each having a pinned layer and a free layer, the magnetization direction of said pinned layer being fixed, and the magnetization direction of said free layer rotating depending on a magnetic field direction; and said sensor device being arranged relative to said magnet rotor to cause the magnetic flux to cross said magnetosensitive surface, such that magnetic flux density components perpendicular to each other on said magnetosensitive surface have the same amplitude.

12. A rotation-angle-detecting apparatus comprising a magnet rotor having 4 or more magnetic poles, and a sensor device for detecting the direction of magnetic flux from said magnet rotor;

said sensor device having a magnetosensitive surface comprising pluralities of spin-valve, giant-magnetoresistive devices each having a pinned layer and a free layer, the magnetization direction of said pinned layer being fixed, and the magnetization direction of said free layer rotating depending on a magnetic field direction; and said sensor device being arranged relative to said magnet rotor, such that the amplitude ratio ($K_{eff}=B\perp_{eff0}/B_{//eff0}$) of effective magnetic flux density components perpendicular to each other on said magnetosensitive surface is 1 at a position meeting the condition of a space magnetic flux density amplitude ratio $K_0=B\perp_0/B_{//0}\neq 1$.

13. A rotation-angle-detecting apparatus comprising a magnet rotor having 4 or more magnetic poles, and a sensor device for detecting the direction of magnetic flux from said magnet rotor;

said sensor device having a magnetosensitive surface comprising pluralities of spin-valve, giant-magnetoresistive devices each having a pinned layer and a free layer, the magnetization direction of said pinned layer being fixed, and the magnetization direction of said free layer rotating depending on a magnetic field direction;

said sensor device being arranged such that $\phi$ and $\chi$ are in a range of $z\neq 0$, $\chi=0$, and $\chi=4.5°$ to $25°$, or in a range of $z=0$, $\phi=0$, and $\chi=40°$ to $60°$, wherein $\phi$ is a sensor arrangement angle between a line connecting the thickness center point of said magnet rotor and the center of the magnetosensitive surface of said sensor device, and a plane passing the thickness center point of said magnet rotor and perpendicular to the rotation axis, and $\chi$ is a sensor inclination angle between a plane passing the thickness center point of said magnet rotor and perpendicular to the rotation axis and said magnetosensitive surface;

said sensor device containing sensor bridges A01 and 801, in which the magnetization directions of pinned layers are perpendicular to each other;

each sensor bridge A01, B01 being a bridge circuit of said spin-valve, giant-magnetoresistive devices;

the magnetization directions of pinned layers in electrically adjacent spin-valve,giant-magnetoresistive devices in said bridge circuit being antiparallel; and voltage being applied to said sensor bridges A01 and B01 to obtain outputs each corresponding to an angle between the magnetization direction of said pinned layer and the magnetization direction of said free layer, and an angle signal being obtained based on said outputs.

* * * * *